US012767446B2

(12) United States Patent
Chen et al.

(10) Patent No.: US 12,767,446 B2
(45) Date of Patent: Oct. 20, 2026

(54) HANDLING ROBOT

(71) Applicant: HAI ROBOTICS CO., LTD., Shenzhen (CN)

(72) Inventors: Yuqi Chen, Shenzhen (CN); Zhe Kong, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 244 days.

(21) Appl. No.: 18/645,963

(22) Filed: Apr. 25, 2024

(65) Prior Publication Data

US 2024/0270497 A1 Aug. 15, 2024

Related U.S. Application Data

(63) Continuation of application No. 17/464,584, filed on Sep. 1, 2021, now Pat. No. 12,017,854, which is a (Continued)

(30) Foreign Application Priority Data

Sep. 30, 2019 (CN) ......................... 201910944200.5
Sep. 30, 2019 (CN) ......................... 201910945610.1
(Continued)

(51) Int. Cl.
*B65G 1/137* (2006.01)
*B25J 9/16* (2006.01)

(52) U.S. Cl.
CPC .......... *B65G 1/1375* (2013.01); *B25J 9/1653* (2013.01); *B25J 9/1664* (2013.01); *B25J 9/1697* (2013.01);
(Continued)

(58) Field of Classification Search
CPC .......... B65G 1/1375; B65G 2203/0233; B65G 2203/0241; B65G 2203/0258;
(Continued)

(56) References Cited

U.S. PATENT DOCUMENTS

2008/0023293 A1* 1/2008 Uratani .................... B25J 9/104 198/346.2
2015/0032252 A1 1/2015 Galluzzo et al.
(Continued)

FOREIGN PATENT DOCUMENTS

CN 1733579 A 2/2006
CN 205397169 U 7/2016
(Continued)

OTHER PUBLICATIONS

International Search Report for PCT/CN2020/118580; mailed Dec. 30, 2020.

*Primary Examiner* — Basil T. Jos
(74) *Attorney, Agent, or Firm* — Ladas & Parry, LLP

(57) ABSTRACT

A handling robot includes a chassis, a vertical bracket arranged on the chassis, a handling assembly slidably connected to the vertical bracket, a holder connected to the vertical bracket and a transfer component connected to the vertical bracket. The handling assembly is configured to retrieve or place a first container from or to a warehouse shelf. The holder is configured to hold a second container. The transfer component is configured to transfer an item between the first container on the handling assembly and the second container held by the holder. the vertical bracket is arranged between the handling assembly and the holder.

20 Claims, 27 Drawing Sheets

Related U.S. Application Data continuation of application No. PCT/CN2020/118580, filed on Sep. 28, 2020.

(30) Foreign Application Priority Data

Sep. 30, 2019 (CN) ......................... 201910945617.3
Sep. 30, 2019 (CN) ......................... 201921666196.2
Sep. 30, 2019 (CN) ......................... 201921673112.8

(52) U.S. Cl.
CPC ................ *B65G 2203/0233* (2013.01); *B65G 2203/0241* (2013.01); *B65G 2203/0258* (2013.01); *B65G 2203/041* (2013.01)

(58) Field of Classification Search
CPC ............ B65G 2203/041; B65G 1/0435; B65G 1/0492; B65G 2201/0258; B25J 9/1653; B25J 9/1664; B25J 9/1697; B25J 9/1679; G05B 2219/45056; G06Q 10/06; G06Q 10/08
See application file for complete search history.

(56) References Cited

U.S. PATENT DOCUMENTS

| | | | |
|---|---|---|---|
| 2017/0174431 | A1 | 6/2017 | Borders et al. |
| 2017/0334645 | A1 | 11/2017 | Otto et al. |
| 2018/0127212 | A1 | 5/2018 | Jarvis et al. |
| 2019/0307077 | A1 * | 10/2019 | Lert, Jr. ............... A01G 31/042 |
| 2019/0352092 | A1 | 11/2019 | Zheng et al. |

FOREIGN PATENT DOCUMENTS

| | | | |
|---|---|---|---|
| CN | 106379681 | A | 2/2017 |
| CN | 206569571 | U | 10/2017 |
| CN | 108726062 | A | 11/2018 |
| CN | 108945912 | A | 12/2018 |
| CN | 109415194 | A | 3/2019 |
| CN | 208603140 | U | 3/2019 |
| CN | 208616889 | U | 3/2019 |
| CN | 109573449 | A | 4/2019 |
| CN | 109677826 | A | 4/2019 |
| CN | 109927012 | A | 6/2019 |
| CN | 209023571 | U | 6/2019 |
| CN | 110040412 | A | 7/2019 |
| CN | 110186459 | A | 8/2019 |
| CN | 110239868 | A | 9/2019 |
| CN | 210794517 | U | 6/2020 |
| CN | 210883786 | U | 6/2020 |
| JP | 2001019129 | A | 1/2001 |
| JP | 2017141102 | A | 8/2017 |
| JP | 2019025566 | A | 2/2019 |
| KR | 1020170107065 | A | 9/2017 |
| WO | WO2016014917 | A1 | 1/2016 |
| WO | WO2019011276 | A1 | 1/2019 |
| WO | WO2019095803 | A1 | 5/2019 |

* cited by examiner

HANDLING ROBOT

CROSS-REFERENCE TO RELATED APPLICATIONS

This application is a continuation application of U.S. application Ser. No. 17/464,584, which is a continuation of International Application No. PCT/CN2020/118580, filed on Sep. 28, 2020. The international Application No. PCT/CN2020/118580 claims priority to Chinese Patent Application No. 201910944200.5, filed on Sep. 30, 2019, Chinese Patent Application No. 201910945610.1, filed on Sep. 30, 2019, Chinese Patent Application No. 201910945617.3, filed on Sep. 30, 2019, Chinese Patent Application No. 201921666196.2, filed on Sep. 30, 2019, and Chinese Patent Application No. 201921673112.8, filed on Sep. 30, 2019. All of the aforementioned patent applications are hereby incorporated by reference in their entireties.

TECHNICAL FIELD

The present application relates to the field of intelligent warehousing, and more specifically, to a handling robot.

BACKGROUND

Intelligent warehousing is a link in the logistics process. The application of intelligent warehousing ensures the speed and accuracy of data input in each link of material warehouse management, and ensures that a company timely and accurately grasps the real data of the inventories and reasonably maintains and controls the company's inventory. Through scientific coding, the batch, shelf life and the like of inventory materials may also be expediently managed. Using the location management function of a SNHGES system, it is more possible to grasp the current location of all inventory materials in time, which is beneficial to improve the efficiency of warehouse management.

A handling robot plays an important role in intelligent warehousing. The handling robot can accept an instruction to a designated location to fetch and place, and transport a material, which improves the efficiency of material transportation in the warehouse.

However, in a first prior art, the current handling robot can only fetch material by full-box fetching. When there is material that does not need to be fetched out from the material box, the full-box fetching has a low efficiency.

With the rise and development of e-commerce and online shopping, they have brought a huge development opportunity to the intellectualization of material warehousing and logistics. In recent years, the technology of material handling based on a handling robot is becoming more and more mature.

In a second prior art, a handling robot may transport material boxes on a shelf to a material sorting station through its material fetching device, so as to sort materials on the material sorting station.

In a process of implementing the present application, the inventor found that the relevant technology has the following defects: the material fetching device performs fetching and placing operations on a material box, but cannot realize the fetching and placing operations on materials in the material box. The automation degree of material sorting is low, which affects material-fetching efficiency.

In a third prior art, a handling robot may transport a material box carrying a replenishment or return material to a shelf through the material fetching device thereof, to replenish or return material.

In a process of implementing the present application, the inventor found that the relevant technology has the following defects: the material fetching device performs material replenishment or return operation on the material box, but cannot realize the fetching and placing operations of the replenishment or return material in the material box. It is insufficient in flexibility of material replenishment or return, which affects the efficiency of material replenishment or return.

SUMMARY

In order to solve the above-mentioned technical problem in the first prior art, an embodiment of the present application provides a handling robot with high material fetching efficiency.

In order to solve the above technical problem, an embodiment of the present application provides the following technical solution:

There is provided a handling robot, including: a vertical bracket; a pallet for storing a material box; and a handling system installed to the vertical bracket, where the pallet is installed to the handling system, and the handling system is configured to fetch out a material box from one of a warehouse shelf and the pallet and store it onto the other, and/or configured to fetch out a material from the material box stored on the pallet.

Optionally, the handling robot further includes a storage shelf;

- the storage shelf is configured to store a material box; and
- the handling system is further configured to fetch out a material box from one of the storage shelf and the pallet and store it onto the other, and/or is further configured to fetch out a material from a material box stored on the storage shelf and store it into a material box stored on the pallet, and/or further configured to store a material fetched out from a material box stored on the pallet into a material box stored on the storage shelf.

Optionally, the handling system includes a handling assembly and a material transfer component, where the handling assembly is supported by the vertical bracket, the pallet is installed to the handling assembly, and the handling assembly is configured to fetch out a material box from one of the warehouse shelf and the pallet and store it onto the other, and/or configured to fetch out a material box from one of the storage shelf and the pallet and store it onto the other; the material transfer component is installed to the handling assembly, and the material transfer component is configured to fetch out a material from one of a material box stored on the pallet and a material box stored on the storage shelf, and store it into the other; and the handling assembly includes an installation platform, and both the pallet and the material transfer component are installed to the installation platform.

Optionally, the handling system includes a handling assembly and a material transfer component, where the handling assembly is supported by the vertical bracket, the pallet is installed to the handling assembly, and the handling assembly is configured to fetch out a material box from one of the warehouse shelf and the pallet and store it onto the other, and/or configured to fetch out a material box from one of the storage shelf and the pallet and store it onto the other; the material transfer component is installed to the vertical bracket, the material transfer component is configured to fetch out a material from one of a material box stored on the pallet and a material box stored on the storage shelf, and store it into the other; and the handling assembly includes an installation platform, and the pallet is installed to the installation platform.

Optionally, the vertical bracket includes a lift platform. The lift platform is moveable in a vertical direction, and the lift platform is installed with the material transfer component.

Optionally, the material transfer component includes a multidimensional mechanical joint and a terminal actuator. The terminal actuator is installed to the multidimensional mechanical joint, and the multidimensional mechanical joint is configured to drive the terminal actuator to rotate in multiple angles and move in multiple directions. The terminal actuator is configured to grab a material.

Optionally, the terminal actuator is a sucker device for adsorbing a material.

Optionally, the handling robot further includes a second material identification device; the second material identification device is installed to the multidimensional mechanical joint and is configured to identify a material in a material box stored on the storage shelf or the pallet and/or a material fetched out by the material transfer component; and the multidimensional mechanical joint is configured to drive the second material identification device and the terminal actuator to move together in multiple angles and in multiple directions together.

Optionally, the handling robot further includes a material box identification component. The material box identification component is installed to the installation platform and configured to identify a material box.

Optionally, the material box identification component includes a camera device.

Optionally, the handling assembly includes a telescopic arm, an immobile pusher, and a mobile pusher; the telescopic arm may extend out in a horizontal direction, the immobile pusher and the mobile pusher are both installed to the telescopic arm, and when the telescopic arm is extended out, the immobile pusher and the mobile pusher are extended out together; the immobile pusher is configured to push a material box when the telescopic arm is extended out; and the mobile pusher may be retracted into the telescopic arm, and the mobile pusher is configured to pull a material box when the telescopic arm is retracted.

Optionally, the handling system includes a material transfer component and an installation platform; where the installation platform is supported by the vertical bracket, and the installation platform is installed with the material transfer component and the pallet; and the material transfer component is configured to fetch out a material box from one of the warehouse shelf and the pallet and store it onto the other, and/or configured to fetch out a material from one of a material box stored on the pallet and a material box stored on the storage shelf and store it in the other.

Optionally, the material transfer component includes a multidimensional mechanical joint and a terminal actuator. The terminal actuator is installed to the multidimensional mechanical joint, and the multidimensional mechanical joint is configured to drive the terminal actuator to rotate in multiple angles and move in multiple directions; and the terminal actuator is configured to grab a material or a material box.

Optionally, the terminal actuator includes a first terminal actuator and a second terminal actuator; the first terminal actuator and the second terminal actuator are interchangeably connected to the multidimensional mechanical joint; the first terminal actuator is configured to grab a material or a material box; and the second terminal actuator is configured to grab a material or a material box.

Optionally, the first terminal actuator includes a sucker device for adsorbing a material or a material box; and the second terminal actuator includes a mechanical claw for gripping a material or a material box.

Optionally, the installation platform is provided with a first storage bracket and a second storage bracket; the first storage bracket is configured to store the first terminal actuator or the second terminal actuator; and the second storage bracket is configured to store the first terminal actuator or the second terminal actuator.

Optionally, the handling robot further includes a second material identification device; the second material identification device is installed to the material transfer component and is configured to identify a material in a material box stored on the storage shelf or the pallet and/or a material fetched out by the material transfer component, and/or to identify a material box; and the multidimensional mechanical joint is configured to drive the second material identification device and the terminal actuator to rotate in multiple angles and move in multiple directions together.

Optionally, the second material identification device includes a second camera.

Optionally, the handling robot further includes a first material identification device; and the first material identification device is installed to the installation platform and is configured to identify a material in a material box stored on the pallet.

Optionally, the handling robot further includes a third material identification device; and the third material identification device is installed to the storage shelf and is configured to identify a material in a material box stored on the storage shelf.

Optionally, the handling system further includes an installation base and a rotation driving device, where the installation base is installed to the vertical bracket, and the installation platform is installed to the installation base; and the rotation driving device is installed to the installation base and connected to the installation platform and is configured to drive the installation platform to rotate around a vertical direction relative to the installation base.

Optionally, the installation base may move in a vertical direction relative to the vertical bracket; the handling system further includes a lift driving device; the lift driving device is installed to the vertical bracket and connected to the installation base; and the lift driving device is configured to drive the installation base to move in the vertical direction relative to the vertical bracket.

Optionally, the storage shelf includes a layered plate; and a plurality of layered plates is distributed in a vertical direction, and each layered plate is configured to support a material box.

Optionally, the handling robot further includes a plurality of first material identification devices; and the plurality of the first material identification devices are installed to the vertical bracket in a vertical direction, and each first material identification device is configured to obtain a material in a material box stored on a corresponding layered plate.

Optionally, the first material identification device includes a first camera.

Optionally, the handling robot further includes a mobile component; and the mobile component supports the vertical bracket and is configured to move on a floor of a warehouse.

Compared with the prior art, in the handling robot provided in the embodiment of the present application, by configuring the handling system, it is possible to fetch out the material from the material box stored on the pallet and return the material box to the warehouse shelf after the material is fetched out. This material fetching manner is flexible and has a relatively higher efficiency.

In order to solve the above-mentioned technical problem in the first prior art, an embodiment of the present application provides a handling robot with higher material fetching efficiency.

In order to solve the above technical problem, an embodiment of the present application provides the following technical solution:

There is provided a handling robot, including: a vertical bracket; a pallet for storing a material box; a material box handling component that is installed to the vertical bracket and includes a handling assembly where the pallet is installed to the handling assembly and the handling assembly is configured to fetch out a material box from one of the warehouse shelf and the pallet and store it onto the other; and a material transfer component, which is configured to fetch out a material from a material box stored on the pallet.

Optionally, the material transfer component is installed to the handling assembly or the vertical bracket.

Optionally, the material transfer component includes a multidimensional mechanical joint and a terminal actuator, where the multidimensional mechanical joint is installed to the handling assembly, and the terminal actuator is installed to the multidimensional mechanical joint; the multidimensional mechanical joint is configured to drive the terminal actuator to rotate in multiple angles and move in multiple directions; and the terminal actuator is configured to grab a material.

Optionally, the handling robot further includes a second material identification device; and the second material identification device is installed to the material transfer component, and the second material identification device is configured to identify a material in a material box stored on the pallet.

Optionally, the second material identification device includes a second camera, the second camera is installed to the multidimensional mechanical joint, and the multidimensional mechanical joint is further configured to drive the second camera to rotate in multiple angles and move in multiple directions.

Optionally, when the material transfer component is installed to the vertical bracket, the vertical bracket includes a lift platform, and the lift platform may move in a vertical direction, and the material transfer component is installed to the lift platform.

Optionally, the terminal actuator is a sucker device for adsorbing a material.

Optionally, the handling robot further includes a first material identification device; the first material identification device is installed to the handling assembly and is configured to identify a material in a material box stored on the pallet.

Optionally, the first material identification device includes a first camera and a camera holder; one end of the camera holder is installed to the handling assembly, and the other end of the camera holder is installed to the first camera; and the first camera is configured to acquire image information inside a material box stored on the pallet.

Optionally, the material box handling component further includes a rotation driving device and an installation base, where the installation base is installed to the vertical bracket, and the handling assembly is installed to the installation base; the rotation driving device is installed to the installation base and connected to the handling assembly and is configured to drive the handling assembly to rotate around a vertical direction.

Optionally, the handling robot further includes a storage shelf, which is installed to the vertical bracket; the material transfer component is further configured to fetch out a material from a material box stored on the storage shelf and store it in a material box stored on the pallet, and/or is further configured to store a material fetched out from a material box stored on the pallet into a material box stored on the storage shelf; and/or the handling assembly is further configured to fetch out a material box from one of the storage shelf and the pallet, and store it onto the other.

Optionally, the handling robot further includes a lift driving device; and the lift driving device is installed to the vertical bracket, connected to the installation base, and is configured to drive the material box handling component to move in a vertical direction.

Optionally, the storage shelf includes a layered plate, and a plurality of layered plates are distributed in a vertical direction; the material transfer component is further configured to fetch out a material from any material box stored on the layered plate, and store it in the material box stored on the pallet, and/or is further configured to store a material fetched out from a material box stored on the pallet into a material box stored on any one layered plate; and/or the handling assembly is further configured to fetch out a material box from one of any one layered plate and the pallet, and store it onto the other.

Optionally, the handling robot further includes a third material identification device; and the third material identification device is installed to the storage shelf and is configured to identify a material stored on the storage shelf.

Optionally, the storage shelf includes a layered plate, and a plurality of layered plates are distributed in a vertical direction; the material transfer component is further configured to store a fetched material onto any one layered plate; a plurality of third material identifications are installed distributedly to the vertical bracket in a vertical direction, and each third material identification device is configured to acquire image information inside a material box stored on a corresponding layered plate.

Optionally, the handling robot further includes a first material identification device; and the first material identification device is installed to the handling assembly and is configured to identify a material in a material box stored on the pallet.

Optionally, the handling assembly includes a telescopic arm device; and the telescopic arm device is configured to pull a material box onto the pallet or push out a material box stored on the pallet.

Optionally, the telescopic arm device includes a telescopic arm, an immobile pusher, and a mobile pusher; where the telescopic arm may be extended out in a horizontal direction, both the immobile pusher and the mobile pusher are installed to the telescopic arm, and when the telescopic arm is extended out, the immobile pusher and the mobile pusher are extended out together; the immobile pusher is configured to push a material box when the telescopic arm is extended out; and the mobile pusher may be retracted into the telescopic arm and is configured to pull a material box when the telescopic arm is retracted.

Optionally, when the mobile pusher protrudes from the telescopic arm, the mobile pusher is spaced apart from the immobile pusher, and the mobile pusher is located in the front of the immobile pusher in an extension direction of the telescopic arm. Optionally, two sets of telescopic arm devices are symmetrically provided on both sides of the pallet.

Optionally, the handling robot further includes a material box identification component, which is installed to the handling assembly and is configured to identify a material box.

Optionally, the material box identification component includes a camera device, which is configured to acquire image information of a material box so as to identify the material box.

Optionally, the handling robot further includes a mobile component; and the mobile component carries the vertical bracket and is configured to move on a floor of a warehouse.

Compared with the prior art, in the handling robot provided in the embodiment of the present application, by configuring the material transfer component, it is possible to fetch out a material from a material box stored on the pallet, and the material fetching manner is flexible and has a higher efficiency.

In order to solve the above-mentioned technical problem in the first prior art, an embodiment of the present application provides a handling robot with higher material fetching efficiency.

In order to solve the above technical problem, an embodiment of the present application provides the following technical solution:

There is provided a handling robot, including: a vertical bracket; an installation platform, which is supported by the vertical bracket; a pallet, which is installed to the installation platform and is configured to store a material box; and a material transfer component, which is installed to the installation platform and is configured to fetch out a material box from one of a warehouse shelf and the pallet and store it onto the other, and/or fetch out a material from a material box stored on the pallet.

Optionally, the material transfer component includes a multidimensional mechanical joint and a terminal actuator, where one end of the multidimensional mechanical joint is installed to the installation base, and the other end of the multidimensional mechanical joint may rotate in multiple angles and move in multiple directions relative to the installation base; and the terminal actuator is installed at the other end of the multidimensional mechanical joint and is configured to grab a material or a material box.

Optionally, the terminal actuator includes a first terminal actuator and a second terminal actuator; and the first terminal actuator and the second terminal actuator are interchangeably connected to the other end of the multidimensional mechanical joint, the first terminal actuator is configured to grab a material or a material box, and the second terminal actuator is configured to grab a material or a material box.

Optionally, the first terminal actuator is a sucker device for adsorbing a material or material box; and the second terminal actuator is a mechanical claw for gripping a material or a material box.

Optionally, the installation platform is provided with a first storage bracket and a second storage bracket, where the first storage bracket is configured to store the first terminal actuator or the second terminal actuator, and the second storage bracket is configured to store the first terminal actuator or the second terminal actuator.

Optionally, the handling robot further includes a second material identification device; and the second material identification device is installed to the material transfer component and is configured to identify a material box and/or a material in a material box stored on the pallet.

Optionally, the second material identification component includes a second camera; the second camera is installed at the other end of the multi-dimensional robotic arm and the second camera is configured to acquire image information on a material box and/or image information inside a material box stored on the pallet.

Optionally, the handling robot includes a first material identification device; and the first material identification device is installed to the installation platform and is configured to identify a material in a material box stored on the pallet.

Optionally, the first material identification device includes a first camera and a camera holder; one end of the camera holder is installed to the installation platform, and the other end of the camera holder is installed to the first camera; and the first camera is configured to acquire the image information inside the material box stored on the pallet.

Optionally, the handling robot further includes a rotation driving device and an installation base; the installation base is installed to the vertical bracket, the installation platform is installed to the installation base; the rotation driving device is installed to the installation base and connected to the installation platform; and the rotation driving device is configured to drive the installation platform to rotate around a vertical direction.

Optionally, the handling robot further includes a storage shelf, the storage shelf is installed to the vertical bracket; and the material transfer component is further configured to store a material fetched out from a material box stored on the pallet into a material box stored on the storage shelf, and/or fetch out a material box from one of the pallet and the storage shelf, and store it onto the other.

Optionally, the handling robot further includes a lift driving device; and the lift driving device is installed to the vertical bracket, connected to the installation base and is configured to drive the installation base to move in a vertical direction.

Optionally, the storage shelf includes a layered plate, and a plurality of layered plates are distributed in a vertical direction; and the material transfer component is further configured to store a material fetched out from a material box stored on the pallet to any one layered plate, and/or further configured to fetch out a material from a material box stored on any one layered plate and store it into a material box stored on the pallet, and/or further configured to fetch out a material box from one of any one layered plate and the pallet and store it onto the other.

Optionally, the handling robot further includes a third material identification device; and the third material identification device is installed to the storage shelf and is configured to identify a material in a material box stored on the storage shelf.

Optionally, the storage shelf includes a layered plate, and a plurality of layered plates are distributed in a vertical direction; the material transfer component is further configured to store a material fetched out from a material box stored on the pallet to any one layered plate, and/or further configured to fetch out a material from a material box stored on any one layered plate and store it into a material box stored on the pallet, and/or further configured to fetch out a material box from one of any one layered plate and the pallet and store it onto the other; a plurality of third material identification devices are installed distributedly to the vertical bracket in a vertical direction; and each third material identification device is configured to acquire image information inside a material box stored on a corresponding layered plate.

Optionally, the handling robot further includes a first material identification device; and the first material identification device is installed to the installation platform and is configured to identify a material in s material box stored on the pallet.

Optionally, the handling robot further includes a mobile component; and the mobile component carries the vertical bracket and is configured to move on the floor of a warehouse.

Compared with the prior art, in the handling robot provided in the embodiment of the present application, by configuring the material transfer component, it is possible to fetch out a material from a material box stored on the pallet, and the material fetching manner is flexible and has a higher efficiency.

In order to solve the technical problem in the second prior art, an embodiment of the present application provides a material fetching method, which implements a material fetching operation through a material transfer component, thereby improving material fetching efficiency and increasing a degree of automation of material sorting.

The present application provides a material fetching method, which is applied to a handling robot, the handling robot including a material transfer component, and the method includes:

- receiving a material fetching instruction, where the material fetching instruction includes position information of material fetching, type information of material to be fetched, and/or material information of material to be fetched, and
- instructing the material transfer component to perform fetching and placing operations on a material and/or a first material box according to the material fetching instruction.

Optionally, the handling robot further includes a vertical bracket and a handling assembly, the handling assembly is slidably connected to the vertical bracket, and the material transfer component is slidably connected to the handling assembly, and the method further includes:

- instructing the handling assembly to move to a first position according to the position information of material fetching, and
- instructing the handling assembly or the material transfer component to move a first material box carrying a material to be fetched from a second position to the first position.

Optionally, the handling robot further includes a vertical bracket and a handling assembly, the handling assembly is slidably connected to the vertical bracket, and at least one material transfer component is slidably connected to the vertical bracket; and the method further includes:

The method further includes:

- instructing the handling assembly to move to a first position according to the position information of material fetching,
- instructing the handling assembly to move a first material box carrying a material to be fetched from a second position to the first position, or
- instructing the material transfer component to move to the first position, and moving the first material box carrying the material to be fetched from the second position to the first position.

Optionally, the handling robot further includes a vertical bracket and an installation platform, the installation platform is slidably connected to the vertical bracket, and the material transfer component is slidably connected to the installation platform, and the method further includes:

- instructing the installation platform to move to the first position according to the position information of material fetching, and
- instructing the material transfer component to move a first material box carrying a material to be fetched from a second position to the first position.

Optionally, the handling robot further includes a vertical bracket and an installation platform, the installation platform is slidably connected to the vertical bracket, and at least one material transfer component is slidably connected to the vertical bracket, and the method further includes:

- instructing the installation platform to move to a first position according to the position information of material fetching, and
- instructing the material transfer component to move to the first position, and moving a first material box carrying a material to be fetched from a second position to the first position.

Optionally, the handling robot further includes at least one storage shelf, the handling assembly or the installation platform further includes a rotation driving device, and the rotation driving device is configured to drive the handling assembly or the installation platform to rotate around a vertical direction, and the method further includes:

- instructing the handling assembly or the material transfer component to move the first material box from the first position to a corresponding storage shelf.

Optionally, the handling robot further includes at least one storage shelf, the handling assembly or the installation platform further includes a rotation driving device, and the rotation driving device is configured to drive the handling assembly or the installation platform to rotate around a vertical direction, and the method further includes:

- instructing the handling assembly or the material transfer component to move the first material box from the first position to a third position corresponding to the storage shelf.

Optionally, the type information of material to be fetched includes stock keeping unit information, and when materials to be fetched in the first material box have the same stock keeping unit information,

- instructing the material transfer component to perform fetching and placing operations on a material according to the material fetching instruction, including:
- instructing the material transfer component to fetch out the material to be fetched from the first material box and place it onto a corresponding storage shelf or into a pre-placed second material box of the storage shelf.

Optionally, a material identification device is installed to the handling assembly, the installation platform or the material transfer component, and the method further includes:

- acquiring image information, which is captured by the material identification device, of the material to be fetched in the first material box,
- the instructing the material transfer component to fetch out the material to be fetched from the first material box and place it onto the corresponding storage shelf or into the pre-placed second material box of the storage shelf, specifically includes:
- according to the image information, instructing the material transfer component to fetch out the material to be fetched from the first material box, and place the fetched material onto the corresponding storage shelf or into the second material box.

Optionally, the image information includes: position information of a material to be fetched in a material box, stock keeping unit information of a material to be fetched, shape of a material to be fetched, and image feature point of a material to be fetched, color information of a material to be fetched and/or volume information of a material to be fetched.

Optionally, the method further includes:

after the material transfer component completes the preset number of fetching and placing operations of materials to be fetched of the first material box, instructing the handling assembly or the material transfer component to place the first material box back to its original position or place it in other position.

Optionally, the type information of the material to be fetched includes stock keeping unit information, and when materials to be fetched in the first material box have different stock keeping unit information, the method further includes:

acquiring image information the material to be fetched in the first material box;

instructing the material transfer component to perform the fetching and placing operations on the material according to the material fetching instruction, including:

according to the image information of the material to be fetched in the first material box, determining a material that is consistent with the stock keeping unit information in the material fetching instruction, and instructing the material transfer component to fetch out the material from the first material box, and place it into the second material box.

Optionally, the image information includes: position information of material to be fetched in a material box, stock keeping unit information of material to be fetched, shape of material to be fetched, and image feature point of material to be fetched, and color information of a material to be fetched and/or volume information of a material to be fetched.

Optionally, the material transfer component is installed with a material identification device, or the handling assembly is installed with a material identification device, or the installation platform is installed with a material identification device, or the material transfer component and the handling assembly are installed with a material identification device, or the material transfer component and the installation platform are installed with a material identification device; and the acquiring the image information of the material to be fetched in the first material box includes:

acquiring the image information, which is captured by the material identification device of the material transfer component, the handling assembly or the installation platform, respectively, of the material to be fetched in the first material box;

or, acquiring the image information, which is captured by material identification devices of the handling assembly and the material transfer component, of the material to be fetched in the first material box, or, acquiring the image information, which is captured by material identification devices of the installation platform and the material transfer component, of the material to be fetched in the first material box.

Optionally, the material information includes shape, volume, image feature point, color and/or weight information of material to be fetched, and the storage shelf includes an order material storage shelf and a temporary material storage shelf, the order material storage shelf is pre-placed with a second material box, and the determining, according to the stock keeping unit information of the material to be fetched, that the material to be fetched is placed onto the corresponding storage shelf or into the pre-placed second material box of the storage shelf, includes:

when the material that is consistent with the stock keeping unit information and/or the material information in the material fetching instruction cannot be determined by the image information acquired through the material identification device installed to the material transfer component, the installation platform or the handling assembly respectively, instructing the material transfer component to obtain a material from the first material box;

continuing to acquire the image information through the material identification device located in the material transfer component, the material identification device located in the handling assembly, or the material identification device located in the installation platform; and when it is determined through the image information that the material obtained by the material transfer component is a material that is inconsistent with the stock keeping unit information and/or the material information in the material fetching instruction, placing the material obtained by the material transfer component onto the temporary material storage shelf or into a third material box pre-placed on the temporary material storage shelf, and otherwise placing it into a corresponding second material box.

Optionally, the method further includes:

after the material transfer component completes the preset number of fetching and placing operations of materials to be fetched of the first material box, instructing the material transfer component to return the material of the temporary material storage shelf or the third material box to the corresponding first material box, and instructing the handling assembly or the material transfer component to place the first material box back to its original position or place it in other position.

Optionally, the position information of material fetching includes position information of a plurality of first material boxes, and materials to be fetched are stored in the plurality of first material boxes, and the method further includes:

after a current first material box is placed back to its original position or placed in other position, reaching positions of materials to be fetched in sequence according to position information of other first material boxes, so as to complete fetching and placing operations of all materials to be fetched.

Optionally, when the number of all materials to be fetched in a current first material box exceeds storage capacity of one storage shelf or one second material box, the method further includes:

acquiring a total volume or a total weight of materials that have been placed onto a current storage shelf or into a current second material box, and if the total volume exceeds a preset volume threshold of the storage shelf or the second material box, or the total weight exceeds a preset load threshold of the storage shelf or the second material box, then instructing the material transfer component to place the materials to be fetched to other storage shelf or other second material box, until the fetching and placing operations of all materials to be fetched are completed.

An embodiment of the present application provide a material fetching method applied to a processing terminal, the processing terminal being communicatively connected with a handling robot, and the method includes:

- sending a material fetching instruction so that the handling robot executes the method described above according to the material fetching instruction.

An embodiment of the present application provide a handling robot, including:

- at least one processor; and
- a memory communicatively connected with the at least one processor; where
- the memory stores instructions executable by the at least one processor, and the instructions, when executed by the at least one processor, enable the at least one processor to execute the material fetching method for a handling robot as described above.

An embodiment of the present application provides a processing terminal, including:

- at least one processor; and
- a memory communicatively connected with the at least one processor; where
- the memory stores instructions executable by the at least one processor, and the instructions, when executed by the at least one processor, enable the at least one processor to execute the material fetching method for a processing terminal as described above.

An embodiment of the present application provides an intelligent warehousing system, including the handling robot as above-mentioned and the processing terminal as above-mentioned.

An embodiment of the present application provides a non-transitory computer-readable storage medium which stores computer-executable instructions, which enable a computer to execute the material fetching method as described above.

An embodiment of the present application also provide a computer program product, including a computer program stored on a non-transitory computer-readable storage medium, where the computer program includes program instructions that, when executed by a computer, enable the computer to execute the material fetching method as described above.

The material fetching method provided in the embodiments of the present application is applied to a handling robot, the handling robot including a material transfer component, and the method includes: receiving a material fetching instruction, where the material fetching instruction includes position information of material fetching, type information of material to be fetched and material information of material to be fetched; and instructing the material transfer component to perform fetching and placing operations on a material according to the material fetching instruction. The technical solution of the present application performs fetching and placing operations on a material through the material transfer component, which improves the efficiency of material fetching and enhances the degree of automation of material sorting.

In order to solve the technical problem in the third prior art, an embodiment of the present application provides a material replenishing or returning method, which uses a material transfer component to perform fetching and placing operations on a replenishment or return material, thereby improving the flexibility of material replenishment or return, and enhancing the efficiency of material replenishment or return.

The present application provides a material replenishing or returning method, which is applied to a handling robot, where the handling robot includes a material transfer component, and the method includes:

- receiving a material replenishment or return instruction, where the material replenishment or return instruction includes position information of material replenishment or return, type information of a replenishment or return material, and/or material information of a replenishment or return material,
- instructing, according to the material replenishment or return instruction, the material transfer component to perform fetching and placing operations on a replenishment or return material and/or a first material box.

Optionally, the handling robot further includes a vertical bracket and a handling assembly, where the handling assembly is slidably connected to the vertical bracket, and the material transfer component is installed to the handling assembly or slidably connected to the vertical bracket, and the method further includes:

- instructing the handling assembly or the material transfer component to place the first material box on a fixed shelf in an empty position for placing a material box.

Optionally, the handling robot further includes a vertical bracket and a handling assembly, where the handling assembly is slidably connected to the vertical bracket, and the material transfer component is installed to the handling assembly, and the method further includes:

- instructing the handling assembly to move to a first position according to the position information of material replenishment or return, and
- instructing the handling assembly or the material transfer component to move a second material box from a second position to the first position.

Optionally, the handling robot further includes a vertical bracket and a handling assembly, where the handling assembly is slidably connected to the vertical bracket, and at least one material transfer component is slidably connected to the vertical bracket, and the method further includes:

The method further includes:

- instructing the handling assembly to move to a first position according to the position information of material replenishment or return, and
- instructing the handling assembly to move a second material box from the second position to the first position, or
- instructing the material transfer component to move to the first position, and moving the second material box from the second position to the first position.

Optionally, the handling robot further includes a vertical bracket and an installation platform, where the installation platform is slidably connected to the vertical bracket, and the material transfer component is installed to the installation platform, and the method further includes:

- instructing the installation platform to move to a first position according to the position information of material replenishment or return, and
- instructing the material transfer component to move a second material box from the second position to the first position.

Optionally, the handling robot further includes a vertical bracket and an installation platform, where the installation platform is slidably connected to the vertical bracket, and at least one material transfer component is slidably connected to the vertical bracket, and the method further includes:

The method further includes:

- instructing the installation platform to move to a first position according to the position information of material replenishment or return, and instructing the material transfer component to move to the first position, and moving a second material box from a second position to the first position.

Optionally, the handling robot further includes at least one storage shelf.

When the handling robot includes one storage shelf, the method further includes:

instructing, according to the material replenishment or return instruction, the material transfer component to perform the fetching and placing operations on a replenishment or return material, including:

instructing the material transfer component to fetch out a material on the storage shelf or in a first material box pre-placed on the storage shelf and place it into a second material box;

when the handling robot includes a plurality of storage shelves, the handling robot further includes a rotation driving device, where the rotation driving device is configured to drive the handling assembly or the installation platform to rotate around a vertical direction, and the plurality of storage shelves are provided on the vertical bracket in layers, and the storage shelves include a temporary material storage shelf and a replenishment-or-return material storage shelf, and the method further includes:

instructing the handling assembly or the material transfer component to move the second material box from the first position to the temporary material storage shelf, and instructing the handling assembly or the material transfer component to move the first material box to an original position of the second material box, or instructing the material transfer component to fetch out a material on the storage shelf or in a first material box pre-placed on the storage shelf and place it into the second material box.

Optionally, the handling assembly or the installation platform further includes a rotation driving device, where the rotation driving device is configured to drive the handling assembly or the installation platform to rotate around a vertical direction, and the handling robot further includes a plurality of storage shelves that are provided on the vertical bracket in layers, and the storage shelves include a temporary material storage shelf and a replenishment-or-return material storage shelf, and the method further includes:

instructing the handling assembly or the material transfer component to move the second material box from the first position to a temporary material storage shelf, and instructing the handling assembly, the installation platform or the material transfer component to move the first material box to a third position corresponding to the temporary material storage shelf;

or before the handling assembly or the material transfer component moves to the first position, firstly instructing the handling assembly, the installation platform or the material transfer component to move the first material box to a temporary material storage shelf at a topmost position; and after the handling assembly or the material transfer component moves the second material box from the second position to the first position, instructing again the handling assembly or the installation platform and the material transfer component to move the second material box from the first position to the third position corresponding to the temporary material storage shelf.

Optionally, the type information of a replenishment or return material includes stock keeping unit information; and when replenishment or return materials in the first material box have the same stock keeping unit information, the instructing, according to the material replenishment or return instruction, the material transfer component to perform fetching and placing operations on a replenishment or return material, includes:

instructing the material transfer component to fetch out a material from the first material box and place it into the second material box.

Optionally, a material identification device is installed to the handling assembly, the installation platform, or the material transfer component, and the method further includes:

acquiring image information, which is captured by the material identification device, of a material in the first material box, the instructing the material transfer component to fetch out the material from the first material box and place it into the second material box, specifically includes:

instructing, according to the image information of the material in the first material box, the material transfer component to fetch out the material from the first material box and place the material into the second material box.

Optionally, the method further includes:

after the material transfer component completes the preset number of fetching and placing operations for replenishment or return materials of the first material box, instructing the handling assembly or the material transfer component to place the second material box back to its original position or other position; and instructing the handling assembly or the material transfer component to place the first material box back to its original position or other position.

Optionally, the type information of a replenishment or return material includes stock keeping unit information; and when replenishment or return materials in the first material box have different stock keeping unit information, the method further includes:

acquiring image information of the replenishment or return materials in the first material box;

the instructing, according to the material replenishment or return instruction, the material transfer component to perform fetching and placing operations on replenishment or return materials, includes:

determining, according to the image information of the replenishment or return materials in the first material box, a material that is consistent with the stock keeping unit information in the material replenishment or return instruction, and instructing the material transfer component to fetch out the material from the first material box and place it into the second material box.

Optionally, the material transfer component is installed with a camera device, or the handling assembly is installed with a material identification device, or the installation platform is installed with a material identification device, or both the material transfer component and the handling assembly are installed with a material identification device, or both the material transfer component and the installation platform are installed with a material identification device, and the acquiring the image information of the replenishment or return materials in the first material box includes:

acquiring the image information, which is captured by the material identification device of the material transfer component, the handling assembly or the installation platform, respectively, of the replenishment or return materials in the first material box;

or, acquiring the image information, which is captured by material identification devices of the handling assembly and the material transfer component, of the replenishment or return materials in the first material box, or, acquiring the image information, which is captured by material identification devices of the installation platform and the material transfer component, of the replenishment or return materials in the first material box.

Optionally, the image information includes at least one of position information of replenishment or return material in a first material box, stock keeping unit information of replenishment or return material, shape information of replenishment or return material, image feature point, color information, and volume information.

Optionally, the material information includes shape, volume, image feature point, color and/or weight information, of the material to be fetched, and the storage shelves include a replenishment-or-return material storage shelf and a temporary material storage shelf, and a third material box is pre-placed on the temporary material storage shelf, and the method further includes:

when a material that is consistent with the stock keeping unit information and/or material information in the material replenishment or return instruction cannot be determined by the image information acquired through a material identification device that is installed to the material transfer component, the installation platform or the handling assembly, respectively, instructing the material transfer component to obtain the material from the first material box;

continuing to acquire image information through the material identification device located in the material transfer component, the material identification device located in the handling assembly, or the material identification device located in the installation platform; and when it is determined through the image information that the material obtained by the material transfer component is inconsistent with the stock keeping unit information and/or the material information in the material replenishment or return instruction, placing the material obtained by the material transfer component onto a temporary material storage shelf or into a third material box pre-placed on a temporary material storage shelf, and otherwise, placing it into a corresponding second material box.

Optionally, the method further includes:

after the material transfer component completes the preset number of fetching and placing operations of replenishment or return materials for a second material box, instructing the material transfer component to place the material on the temporary material storage shelf or in the third material box back to the corresponding first material box, and instructing the handling assembly or the installation platform and the material transfer component to place the second material box back to its original position or other position;

instructing the handling assembly or the installation platform and the material transfer component to place the first material box back to its original position or other position.

Optionally, the position information of material replenishment or return includes position information of a plurality of second material boxes, and the replenishment or return material would be replenished or returned to the plurality of second material boxes, and the method further includes:

after the current second material box is placed back to its original position or other position, reaching positions of the remaining second material boxes in sequence according to the position information of the plurality of second material boxes, so as to complete replenishing or returning of all materials to be replenished or returned.

An embodiment of the present application provides a material replenishing or returning method for a processing terminal, and the processing terminal is communicatively connected with a handling robot, where the method includes:

sending a material replenishment or return instruction, so that the handling robot executes the aforementioned material replenishing or returning method according to the material replenishment or return instruction.

An embodiment of the present application provides a handling robot, including:

at least one processor; and a memory communicatively connected with the at least one processor; where the memory stores instructions executable by the at least one processor, and the instructions, when executed by the at least one processor, enable the at least one processor to execute the aforementioned material replenishing or returning method for a handling robot.

An embodiment of the present application provides a processing terminal, including:

at least one processor; and a memory communicatively connected with the at least one processor; where the memory stores instructions executable by the at least one processor, and the instructions, when executed by the at least one processor, enable the at least one processor to execute the aforementioned material replenishing or returning method for a processing terminal.

An embodiment of the present application provides an intelligent warehousing system, including the handling robot and processing terminal, as described above.

An embodiment of the present application provides a non-transitory computer-readable storage medium, which stores computer-executable instructions, and the computer-executable instructions enable a computer to execute the aforementioned material replenishing or returning method.

An embodiment of the present application further provides a computer program product, which includes a computer program stored on a non-transitory computer-readable storage medium, and the computer program includes program instructions that, when executed by a computer, enable the computer to execute the material replenishing or returning method as described above.

The material replenishing or returning provided by the embodiments of the present application is applied to a handling robot including a material transfer component, and the method includes: receiving a material replenishment or return instruction, which includes position information of material replenishment or return, type information of a replenishment or return material, and/or material information of a replenishment or return material; and instructing, according to the material replenishment or return instruction, a material transfer component to perform fetching and placing operations on a replenishment or return material and/or a first material box. The technical solution of the present application uses the material transfer component to perform fetching and pacing operations on a replenishment or return material and/or a first material box, improving the flexibility of material replenishment or return, and enhancing the efficiency of material replenishment or return.

DESCRIPTION OF EMBODIMENTS

To make the objects, technical solutions, and advantages of embodiments of the present application more clear, technical solutions in the embodiments of the present application will be clearly and completely described below in conjunction with the accompanying drawings of the embodiments of the present application. Apparently, the described embodiments are merely part rather than all of embodiments of the present application. All other embodiments obtained by persons of ordinary skill in the art based on the embodiments of the present application without creative effort shall fall within the protection scope of the present application.

Figure 1:
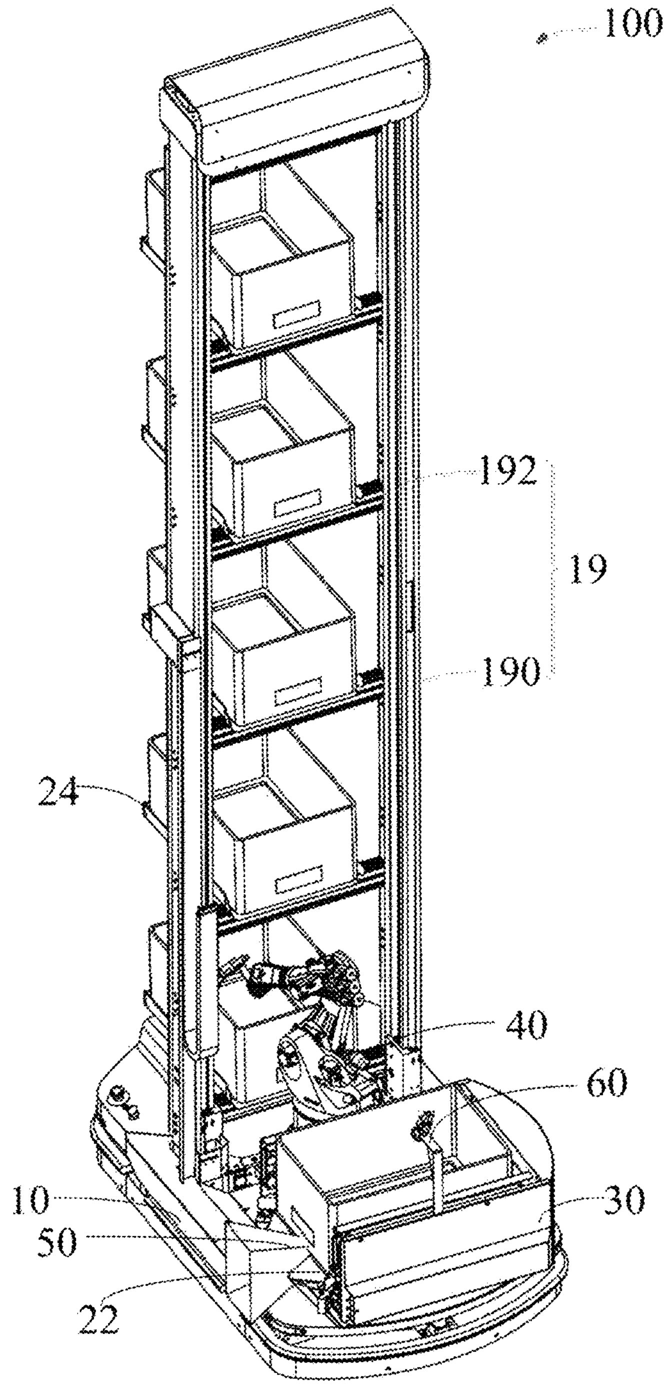
FIG. 1 is a perspective view of a handling robot provided by an embodiment of the present application.

In order to solve the technical problem in the first prior art, an embodiment of the present application provides the following technical solution:

Referring to FIG. 1, the embodiment of the present application provides a handling robot 100 for fetching out a material.

It should be stated that a warehouse shelf is placed in a warehouse, and the warehouse shelf is provided with material spaces for storing material boxes, and the material boxes are used for storing materials.

The handling robot 100 includes a mobile component 10, a pallet 22, a storage shelf 24, a handling system, a material box identification component 50, and a material identification component 60. The mobile component 10 supports the pallet 22, a material box handling component 30, a material transfer component 40, the material box identification component 50 and the material identification component 60.

The mobile component 10 is configured to move on the ground of the warehouse so as to drive the pallet 22, the storage shelf 24, the material box handling component 30, the material transfer component 40, the material box identification component 50 and the material identification component 60, which are carried thereby, to move together.

The pallet 22 and the storage shelf 24 are respectively configured to store a material box. The material box identification component 50 is configured to identify a material box stored on the warehouse shelf so that the handling system can fetch it out; and/or to identify an empty space of the warehouse shelf so that the handling system can store the material box. The handling system is configured to fetch out a material box from one of the pallet 22 and the warehouse shelf and store it onto the other, and/or configured to fetch out the material box from one of the pallet 22 and the storage shelf 24 and store it onto the other, and/or configured to fetch out the material from one of the material box stored on the pallet 22 and the material box stored on the storage shelf 26 and store it into the other. The material identification component 60 is configured to identify the material in the material box stored on the pallet 22 so that the material transfer component 40 can fetch it out; and/or configured to identify the material in the material box stored on the storage shelf 24 so as to count the material in the material box stored on the storage shelf 24; and/or configured to identify the material fetched out by the handling system so as to determine whether the material fetched is correct.

The handling robot works as follows:

The mobile component 10 moves on the floor of the warehouse to approach the warehouse shelf. After approaching the warehouse shelf, the material box identification component 50 identifies the material box stored on the warehouse shelf, and the handling system fetches out the material box identified by the material box identification component 50 and stores it onto the pallet 22. After the material box is stored onto the pallet 22, the material identification component 60 identifies the material stored in the material box on the pallet 22, and the handling system fetches out the material identified by the material identification component 60 and stores it onto the storage shelf 24. After the material transfer component 40 fetches out the material in the material box stored on the pallet, the material box identification component 50 identifies the empty space in the warehouse shelf, and the handling system fetches out the material box stored on the pallet 22 and stores it into the empty space in the warehouse shelf.

By configuring the mobile component 10, the material box handling component 30 may store and fetch material boxes on warehouse shelves that are far apart. In some other embodiments, the warehouse shelf is kept near the material box handling component 30. For example, the handling robot 100 is fixedly installed to the ground near the warehouse shelf. In this case, the mobile component 10 may be omitted.

By configuring the storage shelf 24, the handling robot may fetch out a large amount of materials and store them onto the storage shelf 24. In some other embodiments, the handling robot needs to fetch out few materials, and there is no need to configure the storage shelf 24. In this case, the storage shelf 24 may be omitted.

By configuring the material transfer component 40, after the material box handling component 30 fetches a material box out of a warehouse shelf and the material transfer component 40 fetches out the material in the material box, the material box handling component 30 then stores the material box onto the warehouse shelf so that the handling robot 100 may fetch out the material in the material box and there is no need for the staff to fetch out the material from the material box, improving the efficiency of material dispatching. In some other embodiments, when a material is not identified, the material transfer component 40 may also fetch out the material stored in the material box of the pallet 22. In this case, the material identification component 60 may be omitted. For example, if the materials stored in the material box are all of the same kind of material, and the materials in the material box have a relatively large area, for example, clothes that are spread flat in the material box, then there is basically no obstacle for the material transfer component 40 to fetch out this kind of material, and the material transfer component 40 may randomly fetch out one of the materials in the material box.

In some other embodiments, when the material box is not identified, the material box handling component 30 may also fetch the material box out of the warehouse shelf. In this case, the material box identification component 50 may be omitted, for example, when the warehouse shelf has only one material space for storing the material box.

It is worth noting that after the material box handling component 30 fetches a material box from the material space and stores it onto the pallet 22, by configuring the material transfer component 40, the material transfer component 40 fetches out a material stored in the material box on the pallet 22, without need for a staff to fetch the material out of the material box, thereby improving the efficiency of fetching out a material.

Optionally, the handling system includes a material box handling component 30 and a material transfer component 40.

The material box handling component 30 is configured to fetch a material box out of one of the warehouse shelf and the pallet 22 and store it onto the other, and/or configured to fetch a material box out of one of the pallet 22 and the storage shelf 24 and store it onto the other.

The material transfer assembly 40 is configured to fetch a material out of one of the material box stored on the pallet 22 and the material box stored on the storage shelf 24 and stored it into the other.

A specific implementation of the handling robot 100 will be introduced below. It should be noted that the following implementation is only exemplary, and other handling robots that can meet at least one of the above situations are within the protection scope of the present application.

Figure 3:
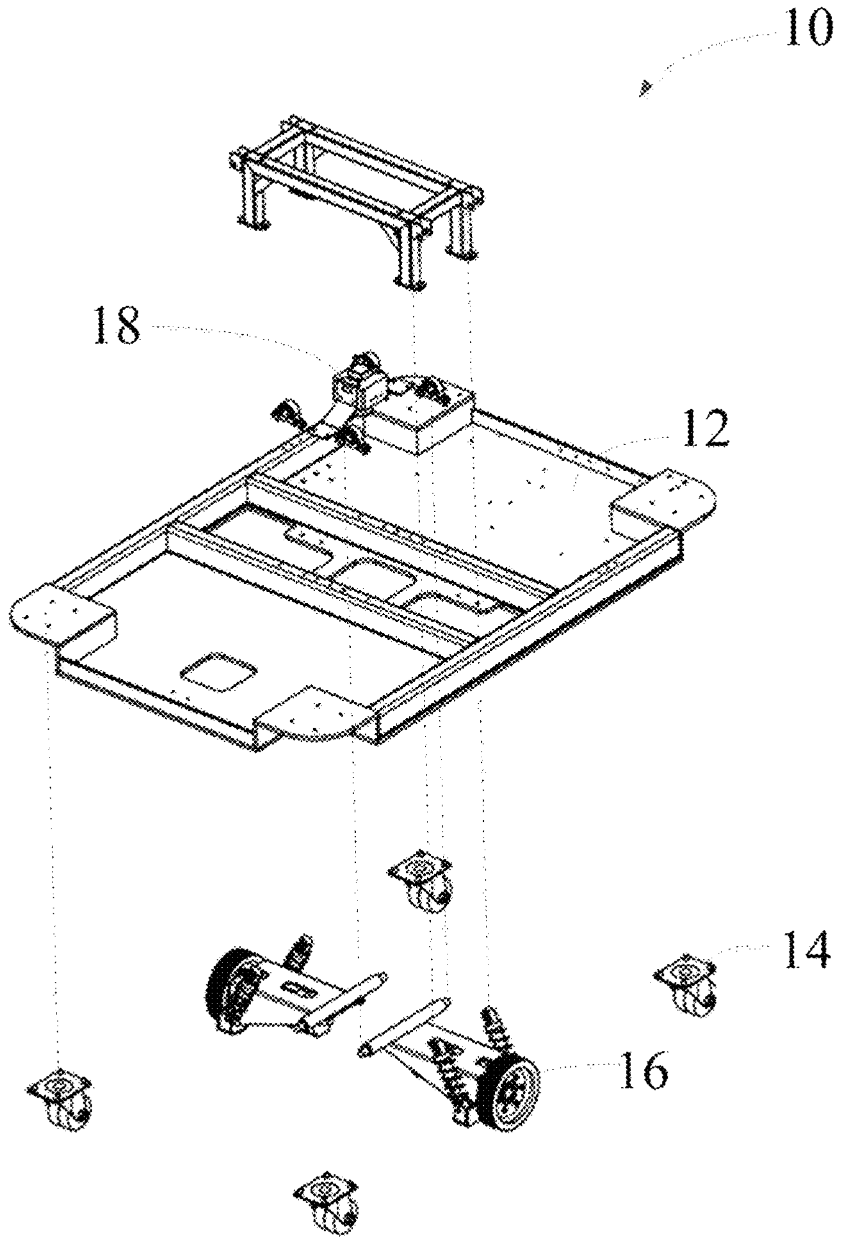
FIG. 3 is a schematic diagram of a disassembled mobile component of the handling robot shown in FIG. 1.

Referring to FIG. 3, the mobile component 10 includes a chassis 12, a driven wheel 14, a driving wheel 16 and a guiding device 18. The chassis 12 is formed by welding profiles and plates, relatively flat as a whole and symmetrical with respect to a vertical symmetry plane. A circuit module for controlling the operation of the mobile component 10 is installed inside the chassis 12. Four driven wheels 14 are installed at the bottom of the chassis 12 and are evenly and symmetrically distributed at both ends of the chassis 12 to support the chassis 12 together. In this embodiment, the driven wheels 14 are universal wheels. According to an actual situation, the driven wheels 14 may also have other wheel structures with a steering function. Two driving wheels 16 are installed at the bottom of the chassis 12 and are symmetrically distributed at both ends of the chassis 12. The two driving wheels 16 are respectively driven by two motors. Therefore, the rotation speeds of the two driving wheels 16 may be different, so as to realize the steering of the mobile component 10. When the rotation speeds of the two driving wheels 16 are the same, the mobile component 10 travels in a straight line. The guiding device 18 is installed at the bottom of the chassis 12 to guide the mobile component 10 to travel along a preset path. In this embodiment, the guiding device 18 is a camera with a lens just facing the ground, and a large number of two-dimensional codes are posted on the floor of the warehouse. Scanning the two-dimensional code by the camera may determine a current position of the mobile component 10, and then in combination with a previous scanned two-dimensional code, an orientation of the mobile component 10 may be determined. According to an actual situation, the two-dimensional code may also be replaced with an identification code such as a barcode.

Referring to FIG. 1 again, the chassis 10 is equipped with a vertical bracket 19 at the top thereof. The pallet 22, the material box handling component 30, the material transfer component 40, the material box identification component 50 and the material identification component 60, as described above, are all supported by the vertical bracket 19. The vertical bracket 19 includes an upright post 190 and a cross beam 192. The two upright posts 190 are both vertical and symmetrical. Each upright post 190 is provided with a guideway extending in the vertical direction. Guideways of the two upright posts 190 are jointly used to install the handling component 30 and guide the handling component 30 to move in the vertical direction.

Multiple cross beams 192 are all horizontally distributed in the vertical direction, and multiple cross beams 192 are jointly supported by two upright posts 190.

Figure 2:
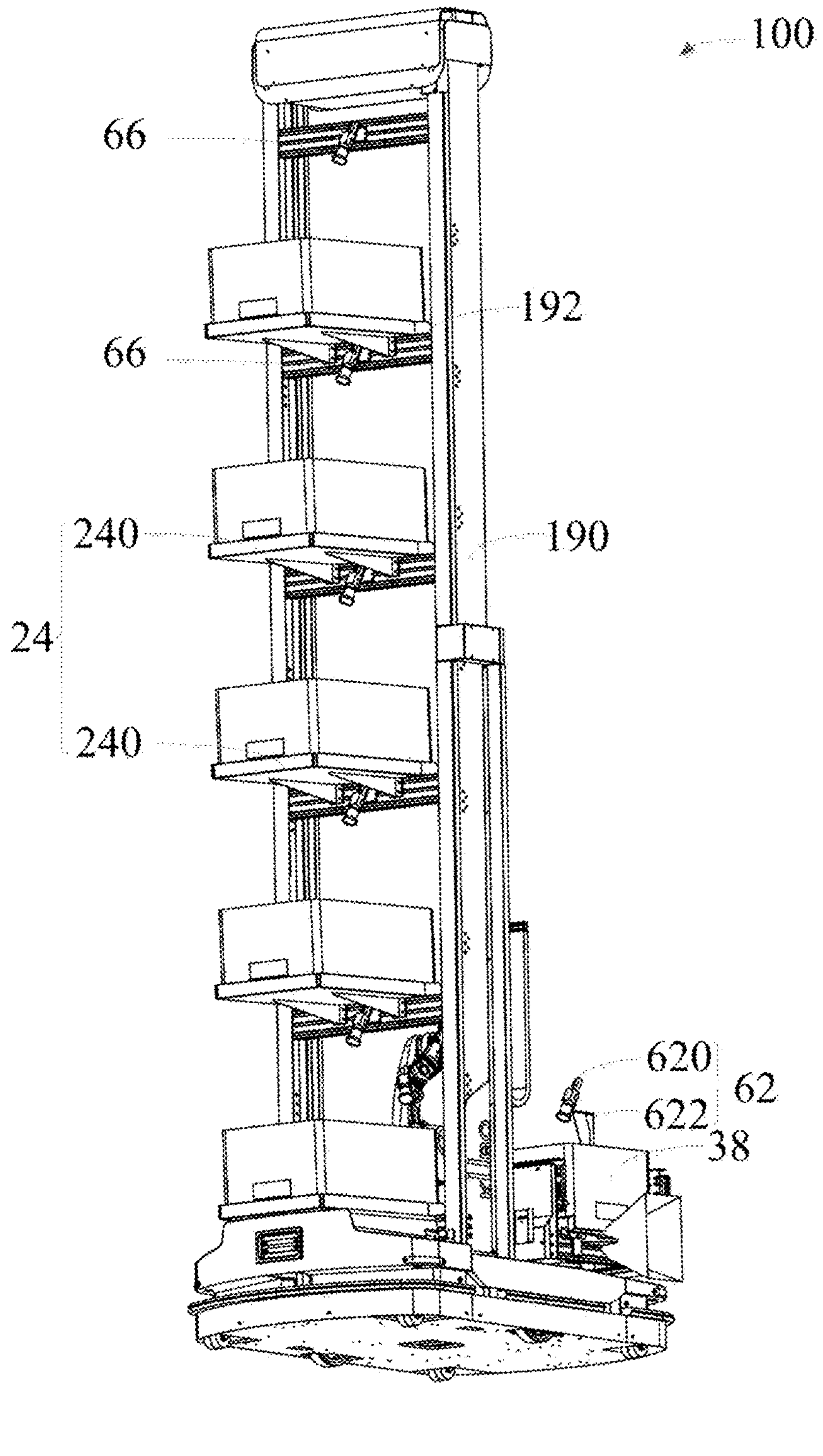
FIG. 2 is a perspective view of the handling robot shown in FIG. 1 from another angle.

Referring to FIG. 1 and FIG. 2, the pallet 22 is a horizontally arranged plate, which is fixedly installed to the material box handling component 30.

The material box stored on the storage shelf 24 may be stored by the material box handling component 30 or stored by a staff. In addition, the material box stored on the storage shelf 24 may be empty. In some other embodiments, the material transfer component 40 directly places the fetched-out material onto the storage shelf 24 without pre-placing a material box on the storage shelf 24.

The storage shelf 24 is fixedly installed to one side of the vertical bracket 19. The storage shelf 24 includes a layered plate 240. Multiple layered plates 240 are distributed in the vertical direction. Each layered plate 240 is configured to store a material box and is supported by a corresponding cross beam 192. By configuring multiple layered plates 240 for storing material boxes, after the material box stored on one layered plate 240 is filled up by the material transfer component 60, the material transfer component 60 may continue to store a material into a material box stored on another layered plate 240. It could be understood that according to an actual situation, there may be only one layered plate 240, for example, in the case where there is few materials or the materials are relatively small relative to the material box.

Figure 4:
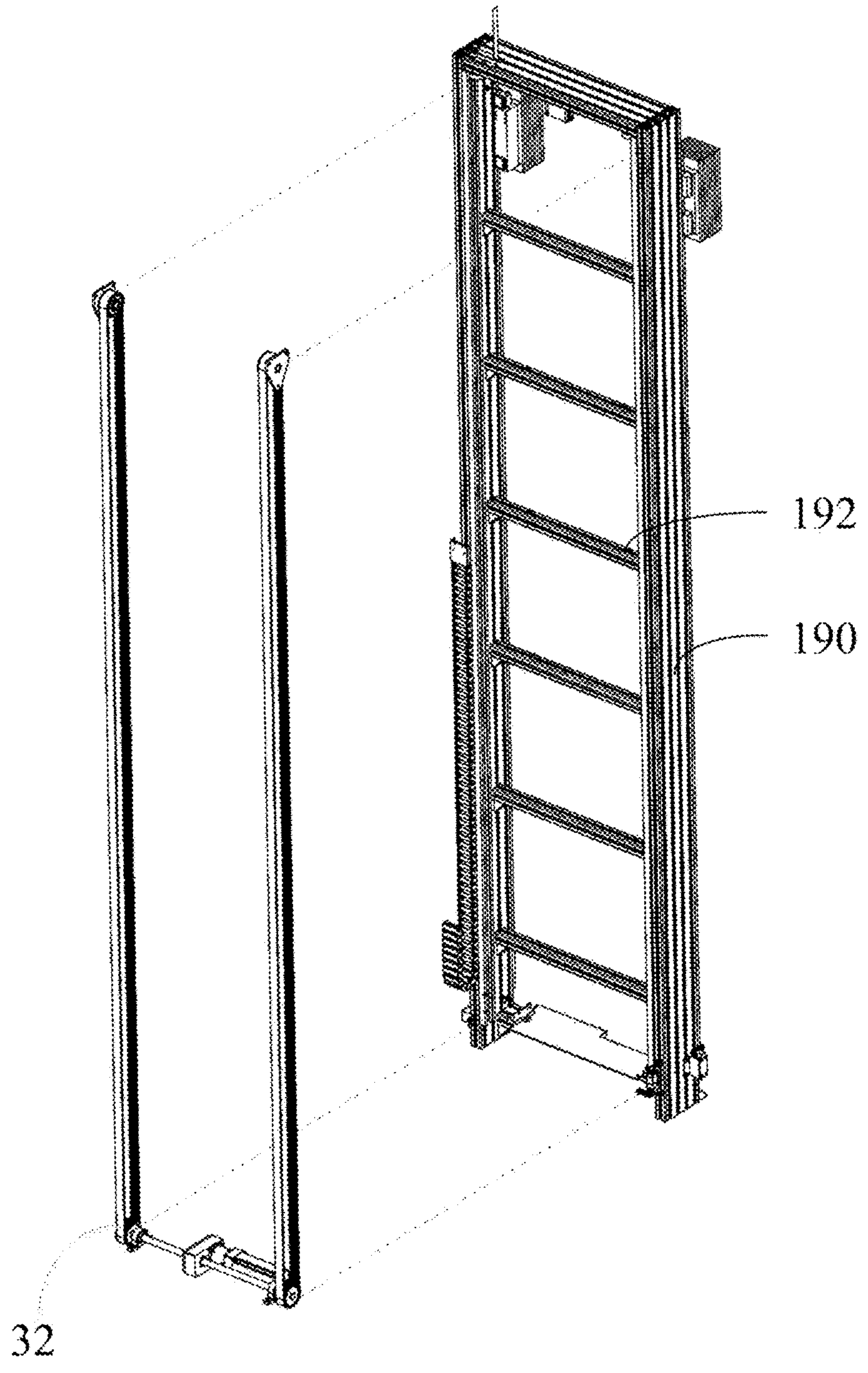
FIG. 4 is a schematic diagram of assembling a vertical bracket and a lift driving device of the handling robot shown in FIG. 1.
Figure 5:
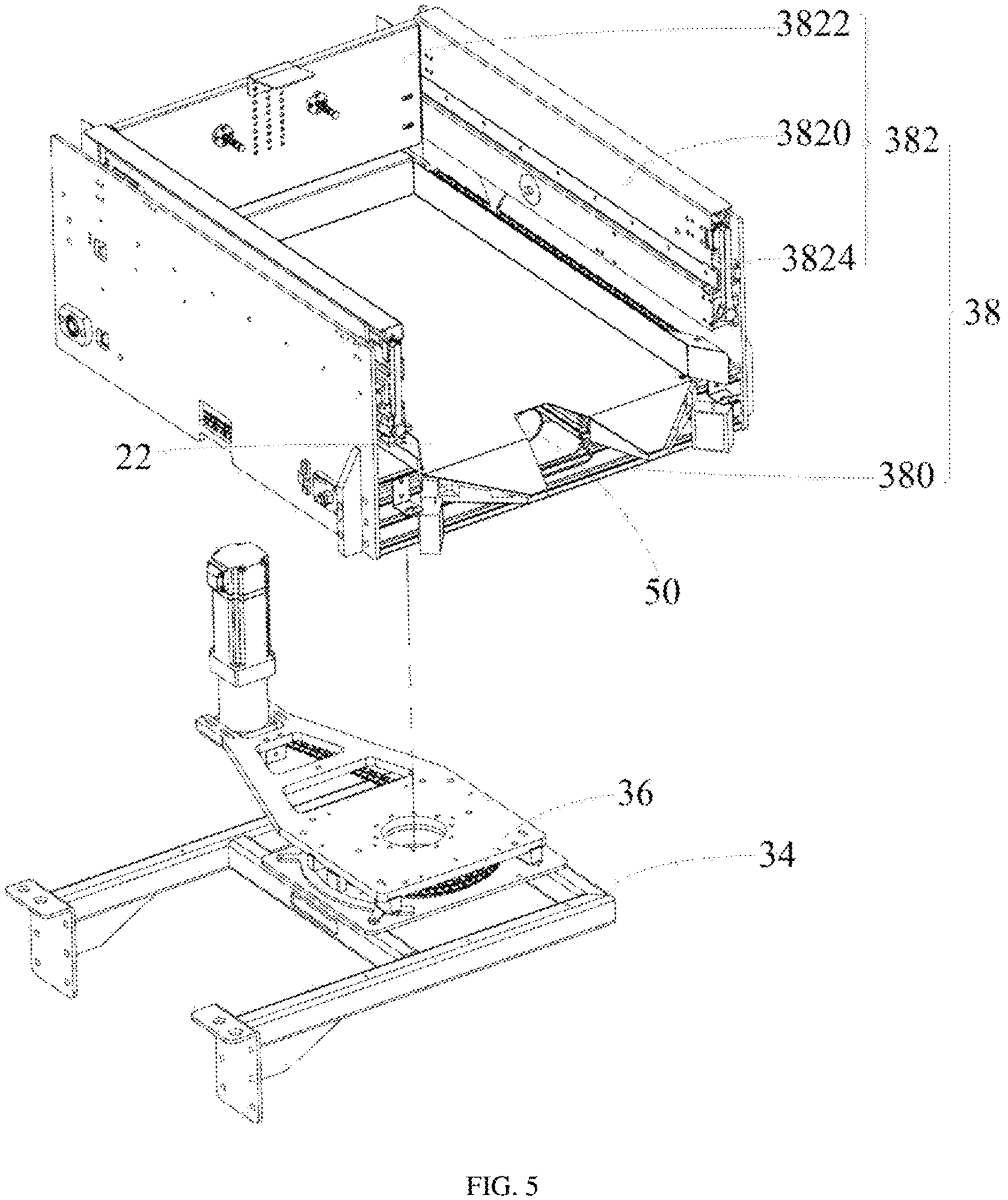
FIG. 5 is a schematic diagram of a disassembled material box handling component of the handling robot shown in FIG. 1.

Referring to FIG. 4 and FIG. 5 together, the material box handling component 30 includes a lift driving device 32, an installation base 34, a rotation driving device 36 and a handling assembly 38.

The installation base 34 is movably installed to the vertical bracket 19 and may be moved in the vertical direction relative to the vertical bracket 19. The lift driving device 32 is configured to drive the handling assembly 38 to move in the vertical direction relative to the vertical bracket 19. The handling assembly 38 is installed to the installation base 34 and may be rotated around a vertical direction relative to the installation base 34. The rotation driving device 36 is configured to drive the handling assembly 38 to rotate around a vertical direction relative to the installation base 34. The handling assembly 38 is configured to fetch out the material box stored on the storage shelf 24 or the warehouse shelf and store it onto the pallet 22; or configured to fetch out the material box stored on the pallet 22 and stored it onto the storage shelf 24 or the warehouse shelf.

The material box handling component 30 fetches out the material box stored on the warehouse shelf or the storage shelf 24 and stores it onto the pallet, which is specifically as follows:

The lift driving device 32 drives the handling assembly 38 to move in the vertical direction, so that the handling assembly 38 and the material box stored on the warehouse shelf or the layered plate 240 are at the same height. At the same time, the rotation driving device 36 drives the handling assembly 38 to rotate around the vertical direction so that the handling assembly 38 is aligned with the material box stored on the warehouse shelf or the layered plate 240. After lifting and rotating of the handling assembly 38 are completed, the handling assembly 38 fetches out the material box stored on the warehouse shelf or the layered plate 240, and stores it onto the pallet 22.

The material box handling component 30 fetches out the material box stored on the pallet and stores it onto the warehouse shelf or the storage shelf 24, which is specifically as follows:

The lift driving device 32 drives the handling assembly 38 to move in the vertical direction, so that the handling assembly 38 and the empty space of the warehouse shelf or the layered plate 240 are at the same height. At the same time, the rotation driving device 36 drives the handling assembly 38 to rotate around the vertical direction, so that the handling assembly 38 is aligned with the empty space of the warehouse shelf or the layered plate 240. After lifting and rotating of the handling assembly 38 are completed, the handling assembly 38 fetches out the material box stored on the pallet 22 and stores it into the empty space of the warehouse shelf or the storage shelf 24.

By configuring the lift driving device 32, the lift driving device 32 drives the handling assembly 38 supported by the installation base 34 to move in the vertical direction, so that the handling assembly 38 may store the material box onto and fetch the material box from the layered plate 240 or the warehouse shelf at different heights. Therefore, the warehouse shelf may be configured as having multiple layers, which improves the utilization rate of the warehouse shelf in the vertical space. In addition, the storage shelf 24 may be configured as having multiple layers, which improves the utilization rate of the storage shelf 24 in the vertical space while realizes that the storage shelf 24 may store multiple material boxes. The storage shelf 24 has a small floor area, and the chassis 12 for bearing the storage shelf 24 may also reduce the floor area. In some other embodiments, the lift driving device 32 may be omitted, such as in the case where the storage shelf 24 and the warehouse shelf have only one layer, as described above.

By configuring a rotation driving device 36, the rotation driving device 36 drives the handling assembly 38 to rotate around the vertical direction, so that the handling assembly 38 may store a material box onto and fetch a material box from the warehouse shelf in different directions. The material fetching way of the handling assembly 38 is more flexible and is conducive to store and fetch a material box in a complex warehouse environment. In some other embodiments, the rotation driving device 36 may be omitted, for example, in the case where the empty space of the warehouse shelf or the material box stored on the warehouse shelf is always located in the material fetching direction of the handling assembly 38, for example, a dedicated track of the mobile component 10 is provided on the floor of the warehouse, and after the mobile component 10 approaches the warehouse shelf, the empty space of the warehouse shelf or the material box stored on the warehouse shelf is located in the material fetching direction of the handling assembly 38, and since the layered plate 240 is part of the handling robot 100, the layered plate 240 just needs to be configured in the material fetching direction of the handling assembly 38.

Some specific implementations of the material box handling component 30 will be introduced below. It should be noted that the following implementations are only exemplary, and other material box handling components that can meet at least one of the above situations are all within the protection scope of the present application.

The installation base 34 and the storage shelf 24 are respectively located on two opposite sides of the vertical bracket 19. The installation base 34 is formed by welding profiles and plates. The installation base 34 is provided with two sliding members. Each sliding member is installed into a corresponding sliding chute and may move along the sliding chute.

The lift driving device 32 includes two sets of first sprocket mechanisms, a transmission shaft and a lift driving motor. Each set of first sprocket mechanism is installed to a corresponding upright post, two ends of the transmission shaft are fixed coaxially with driving wheels of the two sets of first sprocket mechanisms, respectively, and the installation base 34 is fixedly connected with link chains of the two sets of first sprocket mechanisms, respectively. The lift driving motor is configured to drive a driving shaft to rotate, so as to drive the two sets of sprockets to move synchronously, and thus drive the installation base to move in the vertical direction.

It can be understood that, according to an actual situation, the first sprocket mechanisms may also be replaced with a belt pulley mechanism, a gear rack transmission mechanism, and the like.

The rotation driving device 36 includes a second sprocket mechanism and a rotation driving motor. The driving wheel of the second sprocket mechanism is rotatably installed to the handling assembly 38, the transmission wheel of the second sprocket mechanism is fixedly installed to the installation base 34, and the rotation driving motor is configured to drive the driving wheel to rotate, and thus drive the handling assembly 38 to rotate around a vertical direction.

It can be understood that, according to an actual situation, the second sprocket mechanism may also be replaced with a belt pulley mechanism, a gear set, and the like.

The handling assembly 38 includes an installation platform 380 and a telescopic arm device 382, and the telescopic arm device 382 is installed to the installation platform 380. The installation platform 380 may be installed to the top of the installation base 34 through slewing bearing, so that the entire handling assembly 38 may rotate relative to the installation base 34 around a vertical direction. The pallet 22 is fixedly installed to the installation platform 380, and the telescopic arm device 382 is configured to push the material box stored on the pallet 22 into the empty space of the layered plate 240 or the warehouse shelf, or to pull the material box stored on the layered plate 240 or the warehouse shelf onto the pallet 22. In some other embodiments, the telescopic arm device 382 moves a material box by lifting or gripping.

Two sets of telescopic arm devices 382 are symmetrically arranged on both sides of the pallet 22, and the two sets of telescopic arm devices 382 work jointly to push or pull a material. According to an actual situation, there may be only one telescopic arm device 382.

Each set of telescopic arm device 382 includes a telescopic arm 3820, an immobile pusher 3822 and a mobile pusher 3824. One end of the telescopic arm 3820 is fixedly installed to the installation platform 380, and the other end may be extended out or retracted horizontally relative to the installation platform 380. The telescopic arm 382 includes an inner section arm, a middle section arm and an outer section arm. The outer section arm is fixedly installed to the installation platform 380 and located at one side of the pallet 22. The middle section arm is movably installed at a side of the outer section arm close to the pallet 22, the middle section arm may be extended or retracted relative to the outer section arm, and the middle section arm is driven by the sprocket transmission mechanism. The inner section arm is movably installed at a side of the middle section arm close to the pallet 22. The inner section arm may extend or retract relative to the middle section arm. The inner section arm is driven by a movable pulley mechanism. A pulley of the movable pulley mechanism is installed to the inner section arm. Two ends of strop of the movable pulley are installed to the outer section arm and the middle section arm, respectively. When the middle section arm is extended out or retracted relative to the outer section arm, the inner section arm moves in the same direction relative to the outer section arm, and a moving speed of the inner section arm is twice that of the middle section arm.

The immobile pusher 3822 protrudes from the other end of the telescopic arm 3820, and the mobile pusher 3824 is movably installed at the other end of the telescopic arm 3820. When the telescopic arm 3820 is extended out or retracted, the mobile pusher 3824 and immobile pusher 3822 are extended out or retracted together. The mobile pusher 3824 may be received in or protruded from the other end of the telescopic arm 3820, and may be directly driven by a motor. The mobile pusher 3824 and the immobile pusher 3822, which are protruded from the other end of the telescopic arm 3820, are spaced apart, and a distance between the two is used for accommodating a material box. In a protruding direction of the telescopic arm 3820, the mobile pusher 3824 protruded from the other end of the telescopic arm 3820 is located in the front of the immobile pusher 3822. The mobile pusher 3824 and the immobile pusher 3822, which are protruded from the other end of the telescopic arm 3820, are both located at the same side of the telescopic arm 3820 as the pallet 22, and both are higher than the position of the pallet 22.

When the handling assembly 38 fetches a material box out of the pallet 22 and stores it in the empty space of the layered plate 240 or the warehouse shelf, the mobile pusher 3824 is in the state of being received in the other end of the telescopic arm 3820, and the telescopic arm 3820 is extended out, and the immobile pusher 3822 pushes the material box stored on the pallet 22 from the pallet 22 into the empty space of the layered plate 240 or the warehouse shelf, and after the material box is pushed into the empty space of the layered plate 240 or the warehouse shelf, the telescopic arm 3820 is retracted.

When the handling assembly 38 fetches a material box out of the layered plate 240 or the warehouse shelf and stores it onto the pallet 22, the mobile pusher 3824 is in the state of being received into the other end of the telescopic arm 3820, and the telescopic arm 3820 is extended out to make the mobile pusher 3824 pass over the material box. The mobile pusher 3824 protrudes from the other end of the telescopic arm 3820 after passing over the material box, and then the telescopic arm 3820 is retracted, and the mobile pusher 3824 protruded from the telescopic arm 3820 pulls the material box onto the pallet 22. After the material box is pulled onto the pallet 22, the mobile pusher 3824 is received into the other end of the telescopic arm 3820.

Referring to FIG. 5 again, the material box identification component 50 includes a camera device which is installed to the handling assembly 38, and the lens of the camera device has an orientation that is the same as an extension direction of the telescopic arm 3820, and is used for acquiring the image information of the warehouse shelf or the material box. The camera device is fixedly installed to the installation platform 380. In some other embodiments, the camera device is installed at the other end of the telescopic arm 3820 and may be extended out along with the other end of the telescopic arm 3820.

By acquiring the image information of the warehouse shelf, it can be determined whether the empty space of the warehouse shelf or the material box stored on the warehouse shelf is at the same height as the handling assembly 38. Since the position of the layered plate is relatively fixed, whether the empty space of the layered plate or the material box stored on the layered plate is at the same height as the handling assembly 38 can be achieved by setting parameters of the lift driving device and the rotation driving device through a program, which is more efficient. Of course, it is also possible to identify the empty space of the layered plate or the material box stored on the layered plate via the material box identification component.

In some embodiments, the warehouse shelf is posted with two-dimensional codes. The handling assembly 38 is initially located at the lowest position, the handling assembly 38 gradually rises, and the camera device starts to scan starting from a low-layer two-dimensional code. When a specified two-dimensional code is scanned, the handling assembly 38 stops lifting. At this time, the empty space of the warehouse shelf or the material box stored on the warehouse shelf is at the same height as the handling assembly. The material box is also posted with a two-dimensional code. When the material box stored on the warehouse shelf is at the same height as the handling assembly 38, the handling assembly 38 is rotated, and the camera device scans the two-dimensional code on the material box. When the two-dimensional code on the material box is relatively complete or centered in the visual field of the camera device, the handling assembly 38 stops rotating. At this time, the handling assembly 38 is aligned with the material box stored on the warehouse shelf.

Figure 6:
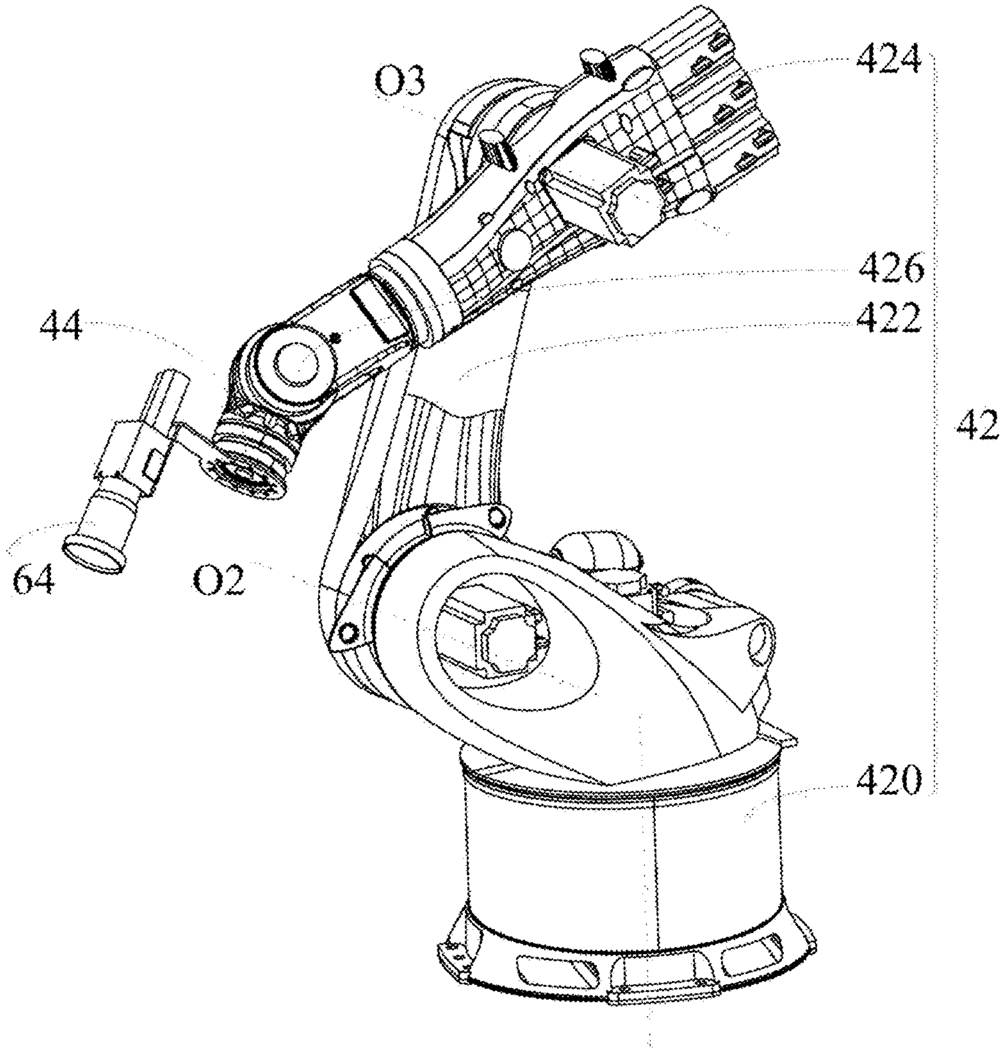
FIG. 6 is a perspective view of a material transfer component of the handling robot shown in FIG. 1.

Referring to FIG. 6, the material transfer component 40 is installed to the installation platform 380 and may be rotated around a vertical axis along with the handling assembly 38, so that the material transfer component 40 is close to the material box stored on the layered plate 240. The material transfer component 40 may also move in a vertical direction along with the handling assembly 38, so that the material transfer component 40 and the material box stored on the layered plate 240 are at the same height. The material transfer component 40 is close to the material box stored on the layered plate 240, or the material transfer component 40 is located at the same height as the material box stored on the layered plate, which is both beneficial for the material transfer component 40 to fetch a material out of the material box stored on the layered plate 240 or store the fetched material into the material box stored on the layered plate 240.

Some specific implementations of the material transfer component 40 will be introduced below. It should be noted that the following implementations are only exemplary, and other material transfer components that can meet at least one of the above situations are all within the protection scope of the present application.

The material transfer component 40 includes a multidimensional mechanical joint 42 and a terminal actuator 44. One end of the multidimensional mechanical joint 42 is installed to the installation platform 380, and is located at the same side of the installation platform 380 as the pallet 22. The other end of the multidimensional mechanical joint 42 may rotate in multiple angles and move in multiple directions relative to the installation platform 380. The multidimensional mechanical joint 42 includes a rotation base 420, a first rotation arm 422, a second rotation arm 424, and a three-axis platform 426. The rotation base 420 has a first rotation axis O1. One end of the first rotation arm 422 is movably installed to the rotation base 420, the first rotation arm 422 may rotate relative to the rotation base 420 around a second rotation axis O2 that is perpendicular to the first rotation axis O1. One end of the second rotation arm 424 is movably installed at the other end of the first rotation arm 422, and the second rotation arm 424 may rotate relative to the other end of the first rotation arm 422 around a third rotation axis O3 that is parallel to the second rotation axis O2. The three-axis platform 426 is installed at the other end of the second rotation arm 424 and is configured to install the terminal actuator 44. The rotation base 420 is installed to the installation platform 380 and is located at the same side of the installation platform 380 as the pallet 22. The first rotation axis O1 is in the vertical direction, and the second rotation axis O2 is in the horizontal direction.

The terminal actuator 44 is configured to fetch and release a material, and is installed at the other end of the multidimensional mechanical joint 42. In this embodiment, the terminal actuator 44 is a sucker device for grabbing a material by adsorption. According to an actual situation, the terminal actuator 44 is not limited to the sucker device, and according to different types of materials, the terminal actuator 44 can be configured to be adaptive to a type of material. For example, the sucker device is suitable for grabbing a solid boxed material with a relatively flat surface, and a mechanical claw is suitable for grabbing a material with unfixed shapes, such as clothes, and so on.

A specific process of the material transfer component 40 fetching a material out of a material box stored on the pallet 22 is as follows:

after the multidimensional mechanical joint 42 drives the terminal actuator 44 to move into a material box stored on the pallet 22 or the layered plate 240, the terminal actuator 44 fetches a material and the multidimensional mechanical joint 42 drives the terminal actuator 44 to return to its original position.

A specific process of the material transfer component 40 storing a fetched-out material into a material box stored on the pallet 22 or a material box stored on the layered plate 240 is as follows:

after the multidimensional mechanical joint 42 drives the terminal actuator 44 to move until it is above a material box stored on the layered plate 240 or a material box stored on the pallet 22, the terminal actuator 44 releases the material so that the material falls into the material box stored on the layered plate 240 or the material box stored on the pallet 22. According to an actual situation, for example, when the material is a fragile item, in order to prevent the material from damage due to falling, after the multidimensional mechanical joint 42 drives the terminal actuator 44 to move into the material box stored on the layered plate 240 or the material box stored on the pallet 22, and then the terminal actuator 44 releases the material to avoid damage caused by the falling of material.

Referring to FIGS. 2 and 6, the material identification component 60 includes a first material identification device 62, a second material identification device 64, and a third material identification device 66.

Both the first material identification device 62 and the second material identification device 64 are configured to identify the material in the material box stored on the pallet 22.

The first material identification device 62 is fixedly installed to the installation platform 380. The first material identification device 62 includes a first camera 620 and a camera holder 622. The camera holder 622 is rod-shaped and is located at the same side of the installation platform 380 as the pallet 22. One end of the camera holder 622 is fixedly installed to the installation platform 380, and the other end of the camera holder 622 is higher than the pallet 22. The first camera 620 is installed at the other end of the camera holder 622 and is configured to acquire the image information of the material in the material box stored on the pallet 22, so as to identify the material in the material box stored on the pallet 22.

The second material identification device 64 is fixedly installed at the other end of the multidimensional mechanical joint 42 and may move along with the other end of the multidimensional mechanical joint 42. The second material identification device 64 includes a second camera. The second camera is installed at the other end of the multidimensional mechanical joint 42, may move along with the other end of the multidimensional mechanical joint 42 and is configured to acquire the image information of the material in the material box stored on the pallet 22, so as to identify the material in the material box stored on the pallet 22.

The second material identification device 64 is further configured to identify the material in the material box stored on the storage shelf 24. Specifically, the second camera moves along with the other end of the multidimensional mechanical joint 42 and is configured to acquire the image information of the material in the material box stored on the layered plate 240, so as to identify the material in the material box stored on the layered plate 240.

The third material identification device 66 is configured to identify the material in the material box stored on the storage shelf. The third material identification device 66 includes a third camera 660. A plurality of third cameras 660 are distributedly installed to the vertical bracket 19 in the vertical direction, and each third camera 660 is configured to acquire the image information of the material in the material box stored on a corresponding layered plate 240, so as to identify the material in the material box stored on the corresponding layered plate 240. Each third camera 660 may be hung on a corresponding cross beam 192, and a corresponding layered plate 240 is located below the cross beam 192.

Here is a detailed description of how each material identification device (that is, the first, second, and third material identification devices as described above) identifies the material in the material box. The aforementioned image information of the material includes SKU (stock keeping unit) information of material and position information of material. The material is posted with a barcode containing the SKU information. By scanning the barcode in the camera's field of view, a barcode containing specified SKU information is marked, and the material posted with this barcode is a material to be fetched out (in the material box stored on the pallet) or a material that has been stored (in the material box stored on the layered plate). Since the position of the material box stored on the pallet or the layered plate is basically fixed, the position of the material to be stored or fetched out in the material box may be determined according to the position of the marked barcode in the camera's field of view. At this time, the material identification device completes the work of identification of the material in the material box.

On the basis of the aforementioned principle of material identification by the material identification device, the difference among the first, second, and third material identification devices is further set forth here. Both the first material identification device and the second material identification device are configured to identify the material in the material box stored on the pallet, but the first material identification device is fixed to the installation base. In the case where positions of materials in the material box are scattered, the first camera of the first material identification device can accurately acquire the position information of each material in the material box; however, in the case where the positions of the materials in the material box are relatively dense, the accuracy of the first camera to acquire the position information of each material in the material box will be decreased. The third material identification device is fixed to the storage shelf. Similar to the first material identification device, when the positions of the materials in the material box stored on the layered plate are relatively scattered, the third camera of the third material identification device can accurately acquire the image information of the materials in the material box; and when the positions of the materials in the material box stored on the layered plate are relatively dense, the accuracy of the third camera of the third material identification device to acquire the position information of each material in the material box will be decreased. Therefore, by installing the second material identification device to the other end of the mechanical arm, the second material identification device moves along with the other end of the mechanical arm and the mechanical arm may drive the second material identification device to move and approach each material in the material box, so as to improve the accuracy of the second camera of the second material identification device to acquire the image information of each material in the material box. Therefore, in some other embodiments, the second material identification device may be omitted when the positions of the materials in the material box are scattered as described above.

Since both the first material identification device and the second material identification device are configured to identify the material in the material box stored on the pallet, in order to improve the identification efficiency, the first material identification device performs the identification of the material in the material box prior to the second material identification device. If the first material identification device has identified the position information and the SKU information of the material in the material box (as in the case where the positions of the materials are relatively scattered as described above), the second material identification device only needs to identify the SKU information of the material in the material box according to the position information and the SKU information provided by the first material identification device, and find the matching SKU information, and then the position information of the material can be determined, without need to identify the position information of the material again. If the first material identification device does not identify the position information of the material, the second material identification device needs to identify the position information and the SKU information of the material. Both the second material identification device and the third material identification device are configured to identify the material in the material box stored in the storage component, and have the same cooperation principle as that of the first material identification device and the second material identification device, which will not be repeated here.

The second material identification device is further configured to identify the SKU information of the material fetched by the terminal actuator to match the specified SKU information, so as to determine whether the terminal actuator fetches a wrong material. Based on this, by configuring multiple layered plates, it is also possible to select a stored material box from the multiple layered plates, and is only used for storing the wrong material.

Figure 7:
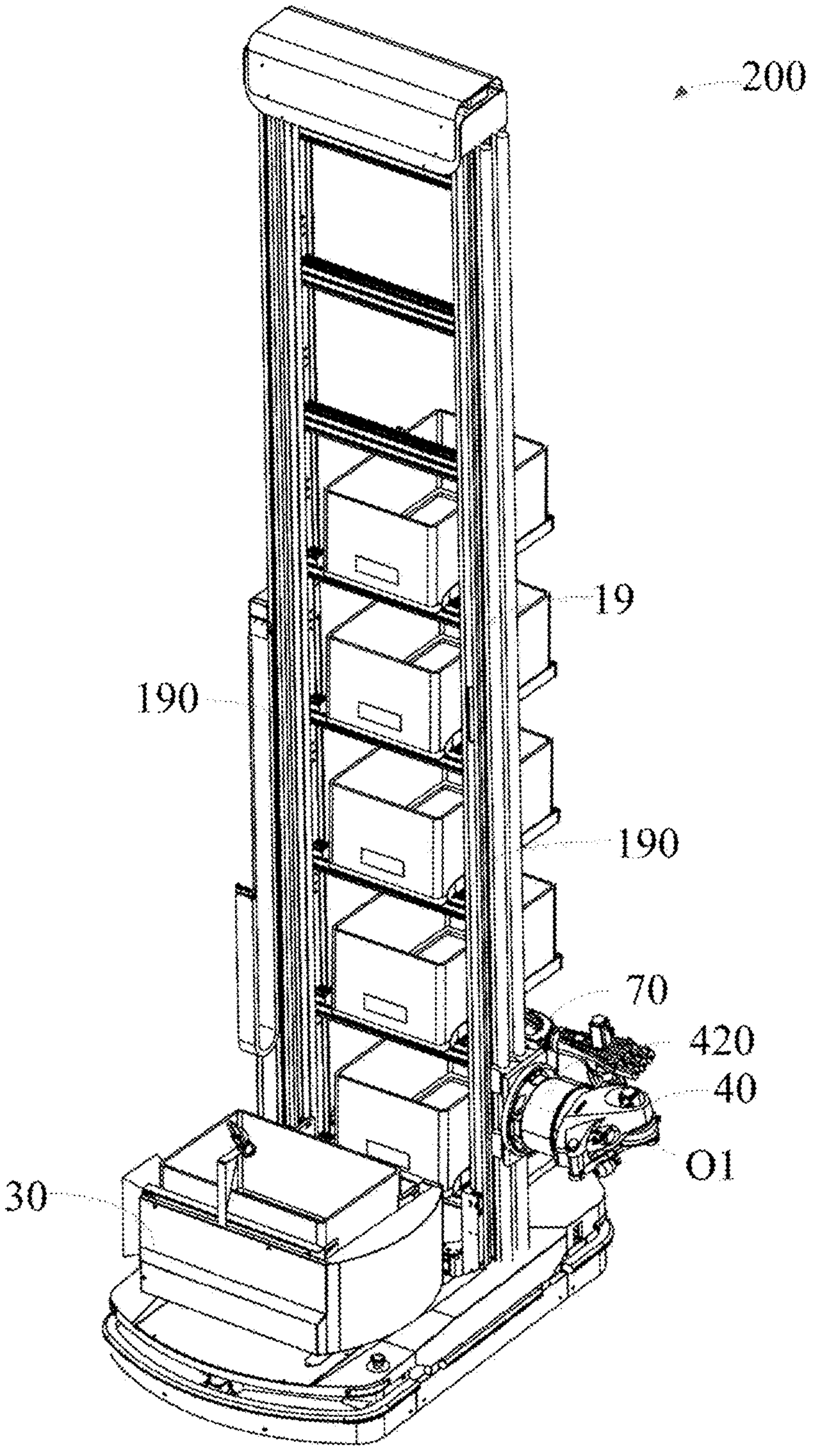
FIG. 7 is a perspective view of a handling robot provided by an embodiment of the present application.

Referring to FIG. 7, this embodiment of the present application provides a handling robot 200, which is basically the same as the handling robot 100 provided in the embodiment shown in FIG. 1, except for the installation position of the material transfer component 40.

One side of one upright post 190 facing away from the other upright post 190 is provided with a guide post for guiding in the vertical direction. Two guide posts are arranged in parallel and are configured to jointly guide the material transfer component 40 to move relative to the vertical bracket 19 in the vertical direction.

The vertical bracket further includes a lift platform 70. The lift platform 70 is provided with two gripping jaws, and each gripping jaw is arranged around a corresponding guide post. The lift platform 70 may move relative to the vertical bracket 19 in the vertical direction. The rotation base 420 is horizontally installed to the lift platform 70, and the first rotation axis O1 is arranged in the horizontal direction.

When material transfer component 40 needs to fetch the material out of the material box stored on the pallet 22 or needs to store the fetched-out material into the material box stored on the pallet 22, the lift platform 70 moves in the vertical direction so that the material transfer component 40 supported by the lift platform and the material box stored on the pallet 22 are located at the same height, which facilitates the material transfer component 40 to fetch the material out of the material box stored on the pallet 22 or store the fetched material into the material box stored on the pallet 22.

It can be understood that, according to the actual situation, the number of material transfer components 40 may be two, and the two material transfer components 40 are arranged on both sides of the vertical bracket.

When the material transfer component 40 needs to be at the same height as the material box stored on the layered plate 240, it may be realized by lifting and lowering the lift platform 70. Since the material transfer component 40 is installed to the lift platform of the vertical bracket, the material transfer component 40 is closer to the material box stored on the layered plate 240 than in the first embodiment.

Figure 8:
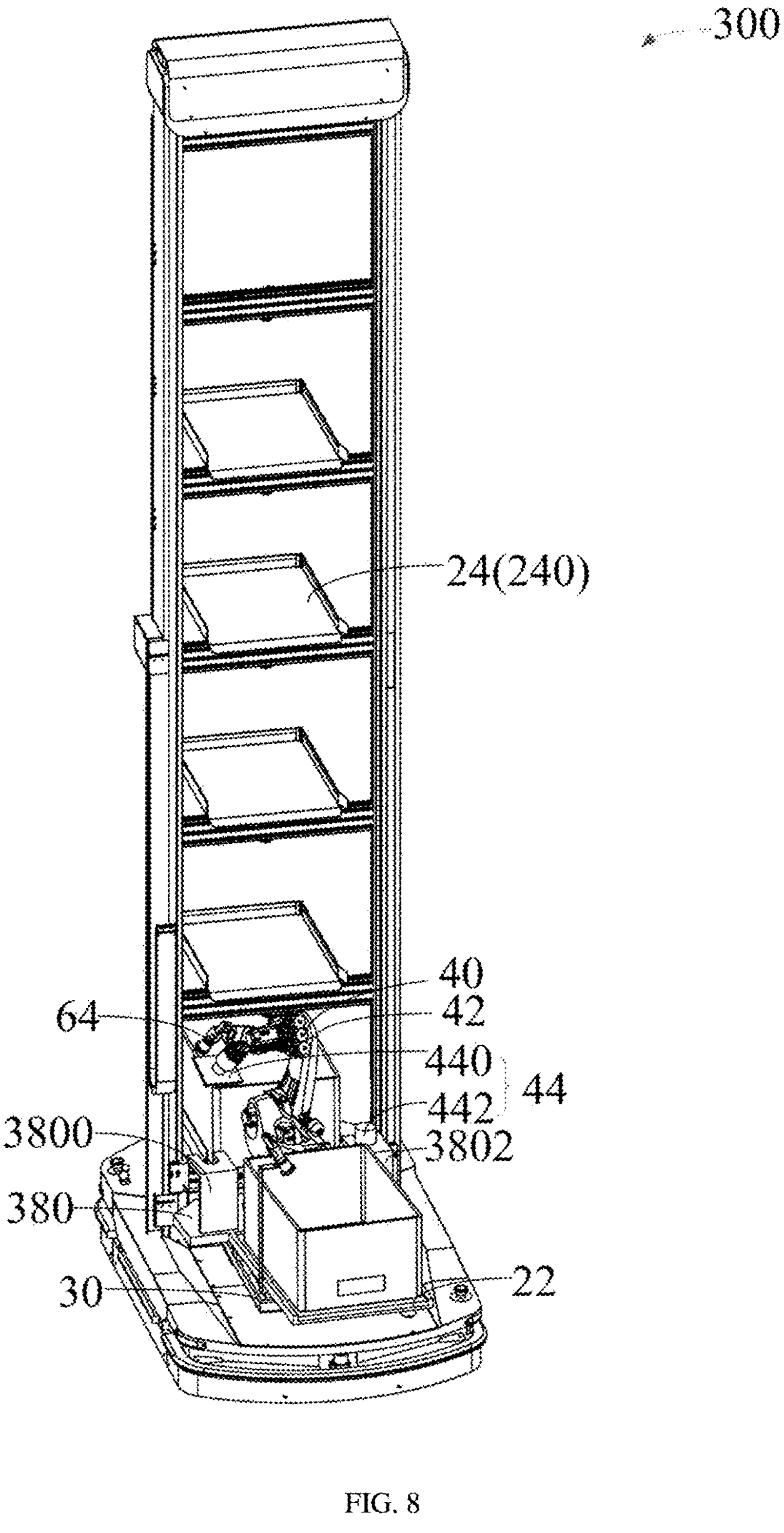
FIG. 8 is a perspective view of a handling robot provided by an embodiment of the present application.

Referring to FIG. 8, an embodiment of the present application provides a handling robot 300, which is basically the same as the handling robot 100 provided in the embodiment shown in FIG. 1, except that the telescopic arm device of the material handling component 30 is removed, and storing and fetching functions of the material box is realized by the material transfer component 40, that is, the material transfer component 40 is used to fetch the material box out of one of the warehouse shelf and the pallet 22 and store it onto the other, and fetch the material out of one of the material box stored on the pallet 22 and the material box stored on the storage shelf 24 and store it into the other.

The terminal actuator 44 includes a first terminal actuator 440 and a second terminal actuator 442. The first terminal actuator 440 and the second terminal actuator 442 are interchangeably connected to the other end of the multidimensional mechanical joint 42. The first terminal actuator 440 is configured to grab a material, and the second terminal actuator 442 is configured to grab a material box.

It is understandable that according to the actual situation, the first terminal actuator may also be configured to grab a material box. Due to different specifications of material boxes, the terminal actuator may be adapted to corresponding model. Similarly, the second terminal actuator may also be configured to grab a material.

The first terminal actuator 440 is a sucker device for adsorbing a material. The second terminal actuator 442 is a mechanical claw for gripping a material box. According to an actual situation, the first terminal actuator 440 or the second terminal actuator 442 may also be replaced with a hook, a shovel and other actuators.

The material box identification component may be omitted, and in this embodiment, the second material identification device 64 replaces it to realize a material box identification function.

The installation platform 380 is provided with a first storage bracket 3800 and a second storage bracket 3802. The first storage bracket is configured to store the first terminal actuator 440 or the second terminal actuator 442, and the second storage bracket is configured to store the first terminal actuator 440 or the second terminal actuator 442. By providing the first and second storage brackets 3800, 3802, the replaceable first and second terminal actuators 440, 442 may be stored.

The installation platform 380 is lifted and lowered in the vertical direction so that the material transfer component 40 supported by the installation platform 380 and the material box stored on the warehouse shelf or the layered plate 240 are at the same height. The installation platform 380 rotates around the vertical direction to make the material transfer component 40 close to the material box stored on the warehouse shelf or the layered plate 240. The material transfer component 40 is at the same height as the material box stored on the warehouse shelf or the layered plate 240, and the material transfer component 40 is close to the material box stored on the warehouse shelf or the layered plate 240, both of which is beneficial for the material transfer component 40 to fetch the material box out of the warehouse shelf or the storage shelf 24, or store the material box onto the warehouse shelf or the storage shelf 24.

A specific process of the material transfer component 40 for fetching out the material box stored on warehouse shelf or the storage shelf 24 and storing it onto the pallet 22 is as follows:

The multidimensional mechanical joint 42 stores the first terminal actuator 442 to the first storage bracket 3800 or the second storage bracket 3802, and the multidimensional mechanical joint 42 equipped with the second terminal actuator 440 that is stored on the first storage bracket 3800 or the second storage bracket 3802. The multidimensional mechanical joint 42 drives the second terminal actuator 442 to approach the material box stored on the warehouse shelf or the layered plate 240, the second terminal actuator 442 grabs the material box stored on the warehouse shelf or the layered plate 240. The multidimensional mechanical joint 42 drives the second terminal actuator 442 to approach the pallet 22, and then the second terminal actuator 442 releases the material box and stores it onto the pallet 22.

A specific process of the material transfer component 40 for fetching out the material box stored on the pallet 22 and storing it into the empty space of the warehouse shelf or the storage shelf is as follows:

The multidimensional mechanical joint 42 stores the first terminal actuator 442 onto the first storage bracket 3800 or the second storage bracket 3802, and the multidimensional mechanical joint 42 is equipped with the second terminal actuator 440 that is stored on the first storage bracket 3800 or the second storage bracket 3802. The multidimensional mechanical joint 42 drives the second terminal actuator 442 to approach a material box stored on the pallet 22, and the second terminal actuator 442 grabs the material box stored on the pallet 24. The multidimensional mechanical joint 42 drives the second terminal actuator 442 to approach the empty space of the warehouse shelf or the layered plate 240, and then the second terminal actuator 442 releases the material box and stores the material box into the empty space of the warehouse shelf or the layered plate 240. The multidimensional mechanical joint 42 drives the second terminal actuator 442 to return to its original position.

A specific process of the material transfer component 40 for fetching out a material from the material box stored on the pallet 22 or the material box stored on the storage shelf 24 is as follows:

The multidimensional mechanical joint 42 stores the second terminal actuator 442 onto the first storage bracket 3800 or the second storage bracket 3802, and the multidimensional mechanical joint 42 is equipped with the first terminal actuator 440 that is stored on the first storage bracket 3800 or the second storage bracket 3802. The multidimensional mechanical joint 42 drives the first terminal actuator 440 to move into a material box stored on the pallet 22 or the material box stored on the layered plate 240. The first terminal actuator 440 grabs a material, and the multidimensional mechanical joint 42 drives the first terminal actuator 440 to move out from the material box.

A specific process of the material transfer component 40 for storing a fetched-out material into the material box stored on the pallet 22 or the material box stored on the layered plate 240 is as follows:

The multidimensional mechanical joint 42 drives the first terminal actuator 42 to move until it is above a material box stored on the pallet 22 or the material box stored on the layered plate 240, and then the first terminal actuator 42 releases the material so that the material falls into the material box stored on the pallet 22 or the material box stored on the layered plate 240.

Compared with the prior arts, for the handling robots 100, 200, 300 provided in first embodiment, the second embodiment and the third embodiment of the present application, by configuring a handling system, it is possible to fetch out the material from the material box stored on the pallet and place the material box back to the warehouse shelf after the material is fetched out. This material fetching manner is flexible and has a relatively higher efficiency.

In order to solve the technical problem in the second prior art, an embodiment of the present application provides the following technical solution:

Material sorting refers to a process of fetching out a material corresponding to an order from a warehouse or other suitable type of material storage places and completing the packaging to form a final order package for delivery. In the process of material sorting, the fetching-and-placing efficiency of a material is very important for the sorting efficiency. The fetching-and-placing efficiency of material may be determined by the fetching-and-placing number of order materials processed in unit time. The more the number of order materials processed in unit time, the higher the fetching-and-placing efficiency of material.

The final material sorting efficiency may be affected by many factors, such as the way of issuing order, the method of assigning material-fetching task for robot, the way of fetching and placing material of robot, and so on. The optimization of the steps involved in the process of fetching and placing material by the robot may have a beneficial effect on the improvement of material sorting efficiency. For the convenience of presentation, in the description of the present application, a material to be fetched in a material box is taken as an example of a target material corresponding to a material fetching task, without limiting other material fetching targets.

In an intelligent process of material fetching and placing, the same material may usually be stored in the same material box. Each material box for storing a material is placed in a specific location of the warehouse according to a specific storage rule, and the material stored in the material box is marked by an external feature (for example, it can be two-dimensional code, barcode or other identifier) of the material box.

Figure 9:
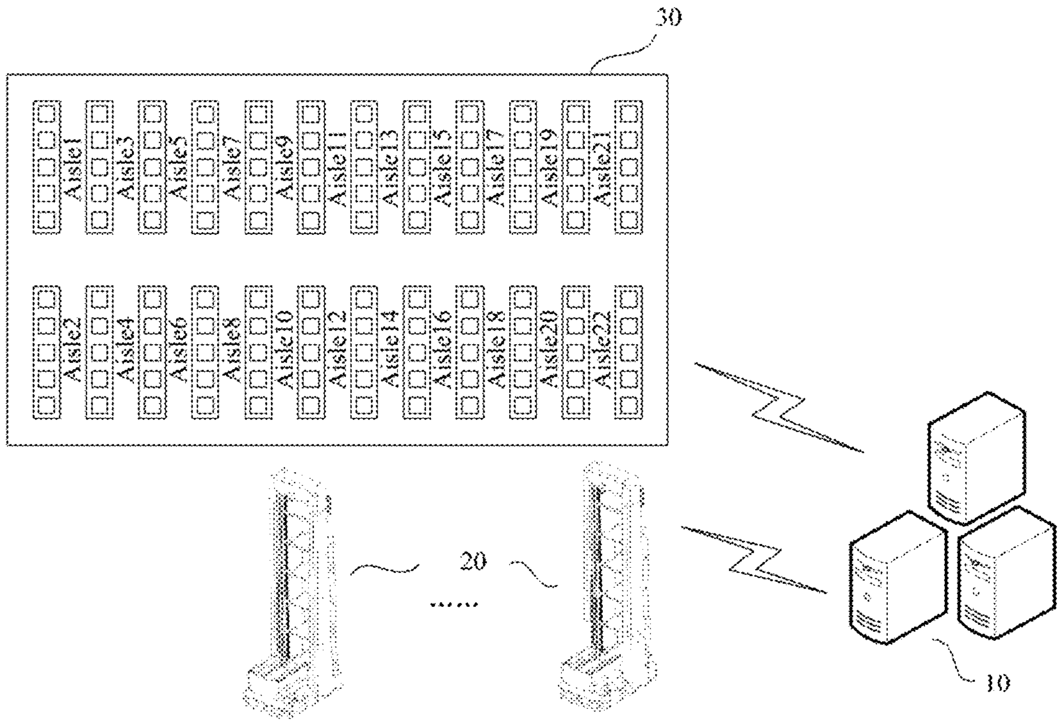
FIG. 9 is a schematic diagram of an application environment provided by an embodiment of the present application.

FIG. 9 shows an application environment provided by an embodiment of the present application. As shown in FIG. 9, the application environment includes an intelligent warehousing system composed of a processing terminal 10 and a robot 20, and a warehouse 30 storing different materials by using the intelligent warehousing system, where the warehouse 30 may include a shelf storing a material box.

The processing terminal 10 may be any type of electronic computing platform or device and is used as a control core of an entire intelligent warehousing system. According to an actual requirement, it may have a corresponding storage space or computing capability to provide one or more application services or functions, such as receiving orders to be delivered, issuing orders, or controlling robots to perform fetching and placing tasks.

Figure 10A:
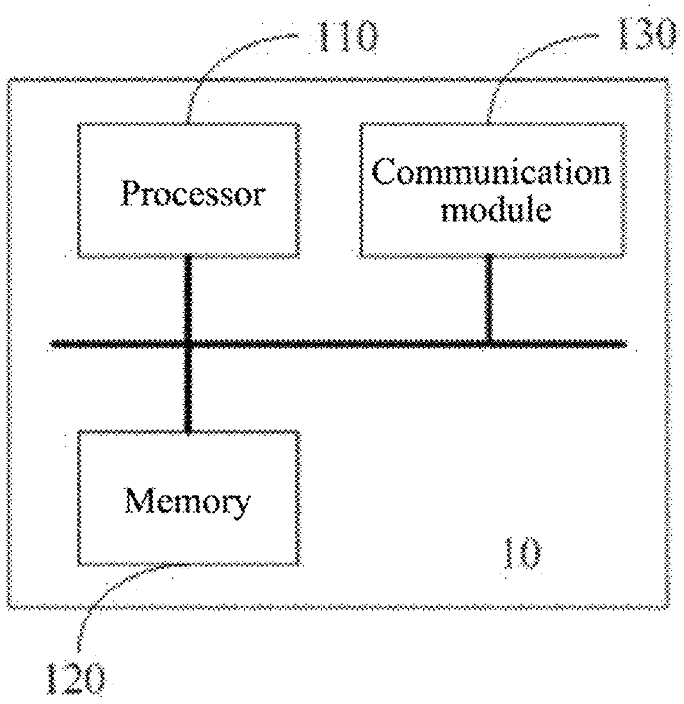
FIG. 10*a* is a structural block diagram of a processing terminal provided by an embodiment of the present application.

FIG. 10*a* is a structural block diagram of an electronic computing platform for implementing all or part of functions of the processing terminal 10. As shown in FIG. 10*a*, the processing terminal 10 may include: a processor 110 and a memory 120.

The processor 110 and the memory 120 establish a communication connection with each other through a bus.

The processor 110 may be of any type and has one or more processing cores. It may perform a single-threaded or multi-threaded operation and is configured to parse instructions to perform operations such as obtaining data, performing logical operation functions, and issuing operation processing results.

The memory 120 is used as a non-volatile computer-readable storage medium, such as at least one magnetic disk storage device, a flash memory device, a distributed storage device remotely provided relative to the processor 110, or other non-volatile solid-state storage device.

The memory 120 may have a program storage area for storing non-volatile computer-executable program instructions (in other embodiments, it may also be called "a non-volatile software program") that can be called by the processor 110 to enable the processor 110 to execute one or more method steps, for example, implement one or more steps in the allocation method of material fetching task provided by the embodiments of the present application. The memory 120 may also have a data storage area for storing the operation processing results issued and outputted by the processor 110.

In order to realize the communication connection between the processing terminal 10 and the robot 20, the processing terminal may further include a communication module 130 and establish a communication connection with a device such as the robot through the communication module 130. The communication connection may be a wired connection or a wireless connection.

The robot 20 is an automated device with a walking mechanism that may move in a warehouse and handles a material box to perform fetching and placing operations on material, for example, a handling robot, an AGV, and the like. The walking mechanism may adopt any suitable type of power system, for example, it may be driven by electric power.

The robot 20 has one or more functional indicators, including but not limited to material loading capacity (that is, the maximum number of material boxes that may be loaded at a time), cruising range, guide method, material box fetching and releasing speed, and operating speed, etc.

Warehouse 30 is an area for storing material boxes. In order to facilitate management, the warehouse 30 can be provided with multiple shelves, and each shelf can be provided with multiple identical or different material boxes according to a specific placement rule.

As shown in FIG. 9, these shelves are divided at intervals to form a plurality of aisles for the robot 20 to enter. The robot 20 enters the aisles and then fetches out a specific material box or places it back (such as material box 1, material box 2, material box 3, etc.). The robot may enter and exit from the aisles from both ends of the aisles. Here, openings located at the both ends of the aisles are referred to as "aisle openings", which may be used as exits of the robot 20 or entrances of the robot 20.

In some embodiments, directions between some aisles are the same, and the aisle openings between them are opposite so that the robot 20 may directly pass through, such as aisle 1 and aisle 2 shown in FIG. 9. Here, such two aisles are called "adjacent aisles". That is, when the robot 20 walks from the aisle 1 to its adjacent aisle, i.e., aisle 2, or from the aisle 2 to its adjacent aisle, i.e., aisle 1, it may enter directly without turning.

The material stored in the material box in the warehouse 30 is managed by using the stock keeping unit (SKU) as a unit. The stock keeping unit is a basic unit for inventory incoming and outgoing measurement or for control and storage, and may be in unit of piece, tray, or box (depending on specific material). The same material may belong to different SKUs due to differences in production date, size, color, and so on.

In the embodiment of the present application, the processing terminal 10 needs to assign an appropriate material fetching task to each robot 20 so that it may move in the warehouse and handle a material box corresponding to a material to be fetched on the order.

Figure 10B:
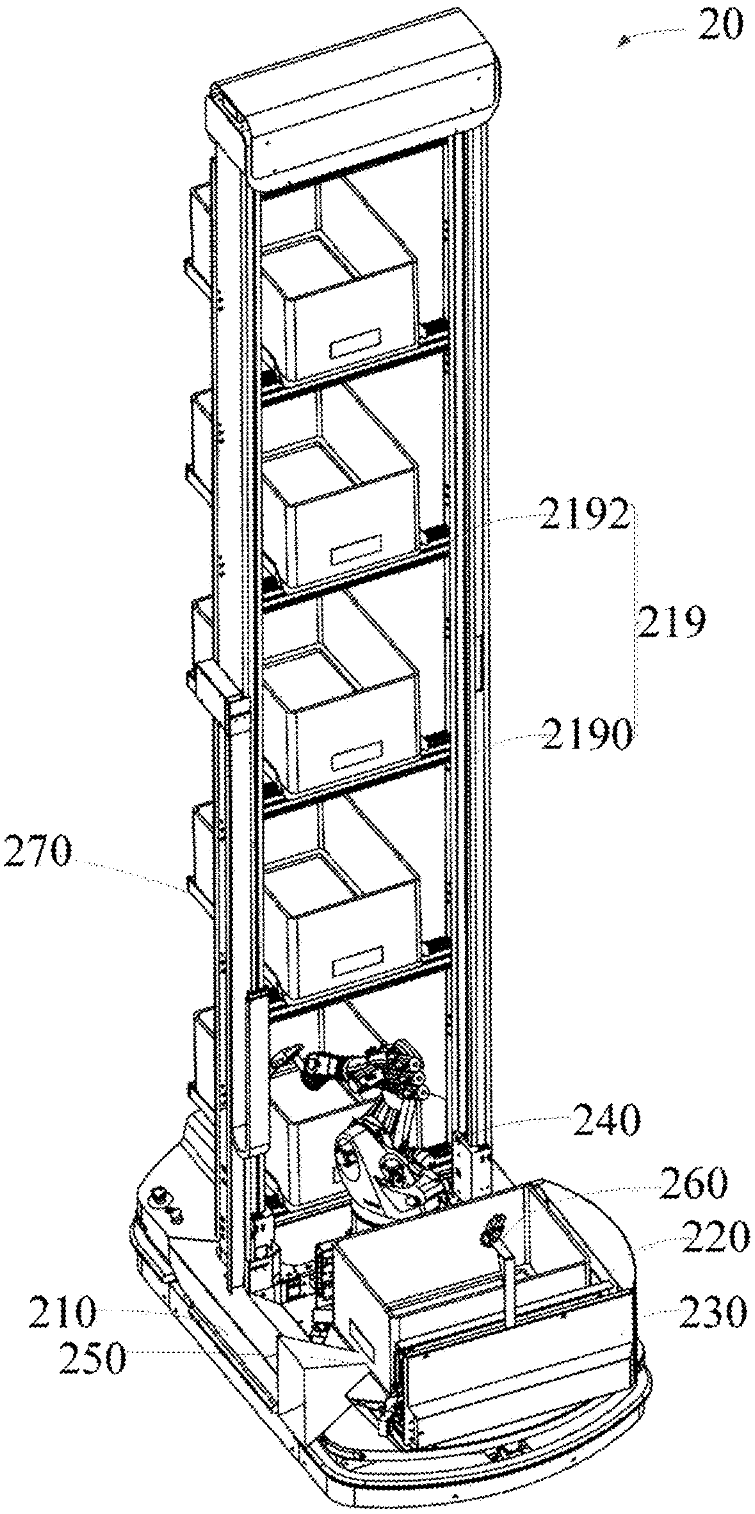
FIG. 10*b* is a perspective view of a handling robot provided by an embodiment of the present application.

FIG. 10*b* is a perspective view of a handling robot for all or part of functions of the robot 20. As shown in FIG. 10*b*, the handling robot 20 is configured to fetch out a material.

The handling robot 20 includes a mobile component 210, a pallet 220, a material box handling component 230, a material transfer component 240, a material box identification component 250, a material identification component 260 and a storage shelf 270. Where the mobile component 210 supports the pallet 220, the material box handling component 230, the material transfer component 240, the material box identification component 250, the material identification component 260 and the storage shelf 270.

The mobile component 210 is configured to move on the floor of the warehouse so as to drive the pallet 220, the material box handling component 230, the material transfer component 240, the material box identification component 250, the material identification component 260 and the storage shelf 270, which are supported thereby, to move together to approach the warehouse shelf.

The pallet 220 and the storage shelf 270 are each configured to store a material box. The material box identification component 250 is configured to identify a material space where the material box is located after the mobile component 210 approaches the warehouse shelf. The material box handling component 230 is configured to fetch out the material box from the material space identified by the material box identification component 250 and store it onto the pallet 220, or to fetch out the material box from the pallet 220 and store it onto the warehouse shelf or the storage shelf 270. The material identification component 260 is configured to identify the material in the material box stored on the pallet 220. The material transfer component 240 is configured to fetch out the material identified by the material identification component 260 from the material box stored on the pallet 220.

By configuring the mobile component 210, the material box handling component 230 may store and fetch a material box on a warehouse shelf far away from it. In some other embodiments, the warehouse shelf is kept near the material box handling component 230. For example, the handling robot 20 is fixedly installed to the ground near the warehouse shelf. In this case, the mobile component 210 may be omitted.

By configuring the storage shelf 270, the handling robot may fetch out a large amount of materials and store them onto the storage shelf 270. In some other embodiments, a few materials need to be fetched out by the handling robot, and thus there is no need to configure the storage shelf 270. In this case, the storage shelf 270 may be omitted.

By configuring the material transfer component 240, after the material box handling component 230 fetches out the material box from the warehouse shelf and the material transfer component 240 fetches out the material from the material box, the material box handling component 230 then stores the material box onto the warehouse shelf, to enable the handling robot 20 to fetch out the material from the material box, without requiring a staff to fetch out the material from the material box, which improves the efficiency of material dispatching. In some other embodiments, in the case where the material is not identified, the material transfer component 240 may also fetch out the material from the material box stored on the pallet 220. In this case, the material identification component 260 may be omitted. For example, when the materials stored in the material box are all the same kind of materials and the materials in the material box have relatively large areas, for example, clothes that are spread flat in the material box, there is basically no any obstacle for the material transfer component 240 to fetch out this kind of material, and the material transfer component 240 may randomly fetch out one material from the material box.

In some other embodiments, in the case where the material box is not identified, the material box handling component 230 may also fetch out the material box from the warehouse shelf. In this case, the material box identification component 250 may be omitted, for example, when the warehouse shelf has only one material space for storing the material box.

It is worth noting that after the material box handling component 230 fetches the material box from the material space and stores it onto the pallet 220, by configuring the material transfer component 240, the material transfer component 240 will fetch out the material from the material box stored on the pallet 220, without need for the staff to fetch out the material from the material box, which improves the efficiency of fetching out the material.

Some specific implementations of the handling robot 100 will be introduced below. It should be noted that the following implementations are only exemplary, and other handling robots that can meet at least one of the above conditions are within the protection scope of the present application.

Figure 10C:
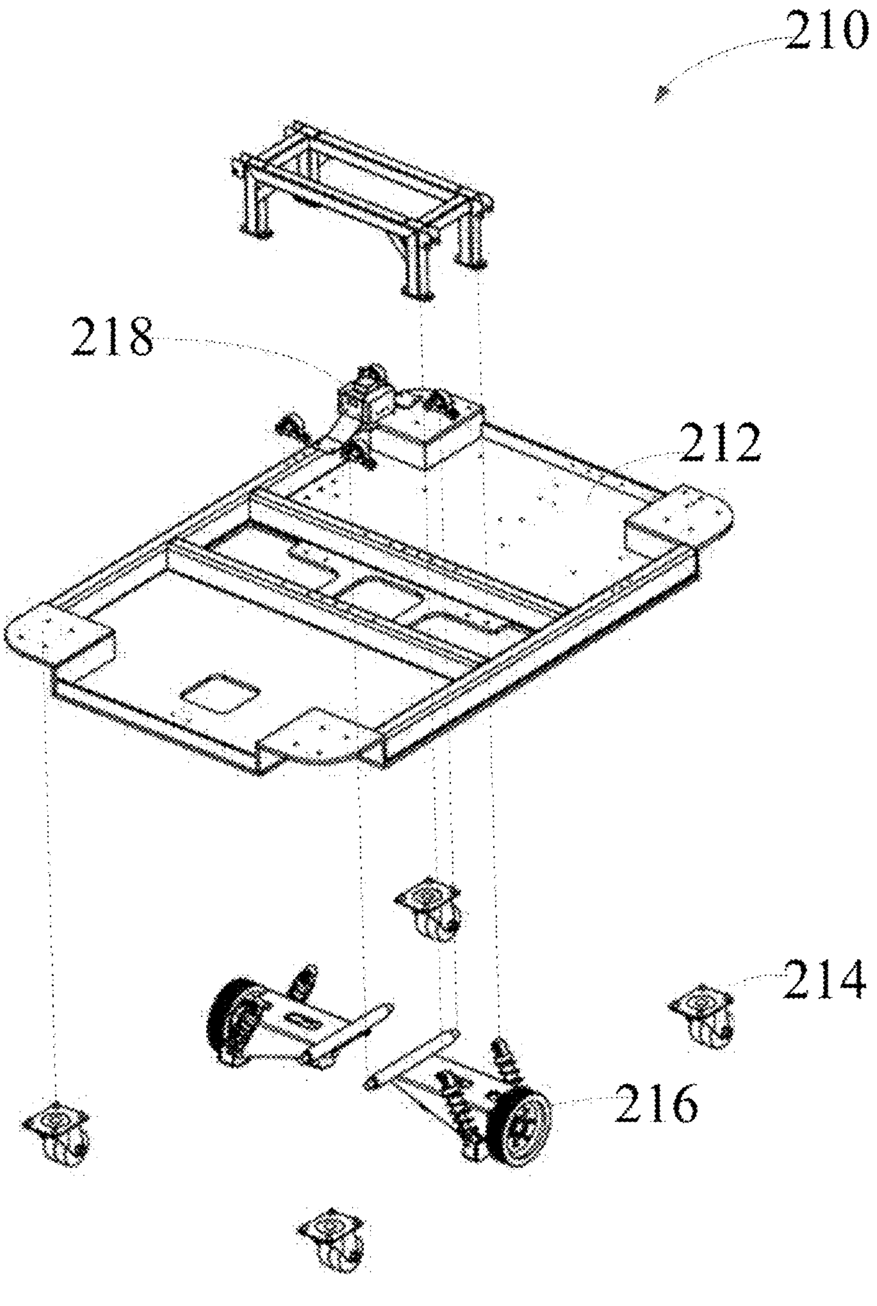
FIG. 10*c* is a schematic diagram of a disassembled mobile components of the handling robot shown in FIG. 10*b;*

Referring to FIG. 10*c*, the mobile component 210 includes a chassis 212, a driven wheel 214, a driving wheel 216, and a guiding device 218. The chassis 212 is formed by welding profiles and plates, is relatively flat as a whole and symmetrical with respect to a vertical symmetrical plane.

The interior of chassis 212 is internally equipped with a circuit module for controlling the operation of the mobile component 210. Four driven wheels 214 are installed at the bottom of the chassis 212 and are evenly and symmetrically distributed at both ends of the chassis 212 to jointly support the chassis 212. In this embodiment, the driven wheels 214 are universal wheels. According to an actual situation, the driven wheels 214 may also have other wheel structures with a steering function. Two driving wheels 216 are installed at the bottom of the chassis 212 and are symmetrically distributed at the both ends of the chassis 212. The two driving wheels 216 are respectively driven by two motors. Therefore, rotation speeds of the two driving wheels 216 may be different and thus realize the steering of the mobile component 210. When the two driving wheels 216 have the same rotation speed, the mobile component 210 travels in a straight line. The guiding device 218 is installed at the bottom of the chassis 212 is configured to guide the mobile component 210 to travel along a preset path. In this embodiment, the guiding device 218 is a camera with a lens facing the ground, and a large number of two-dimensional codes are posted on the ground of the warehouse. Scanning a two-dimensional code by the camera may determine a current position of the mobile component 210, and then in combination with a previous scanned two-dimensional code, an orientation of the mobile component 210 may be determined. According to an actual situation, the two-dimensional codes may also be replaced with barcodes and other identification codes.

Referring to FIG. 10*b* again, the mobile component 210 is equipped with a vertical bracket 219 at the top thereof. As described above, the pallet 220, the material box handling component 230, the material transfer component 240, the material box identification component 250 and the material identification component 260 are all supported by the vertical bracket 219. The vertical bracket 219 includes an upright post 2190 and a cross beam 2192. Two upright posts 2190 are both vertical and symmetrical, and each upright post 2190 is provided with a guideway extending in the vertical direction. Guideways of the two upright posts 2190 are jointly used to install the material box handling component 230 and guide the material box handling component 230 to move in the vertical direction.

Multiple cross beams 2192 are all horizontally distributed in the vertical direction, and the multiple cross beams 2192 are jointly supported by the two upright posts 2190.

Figure 10D:
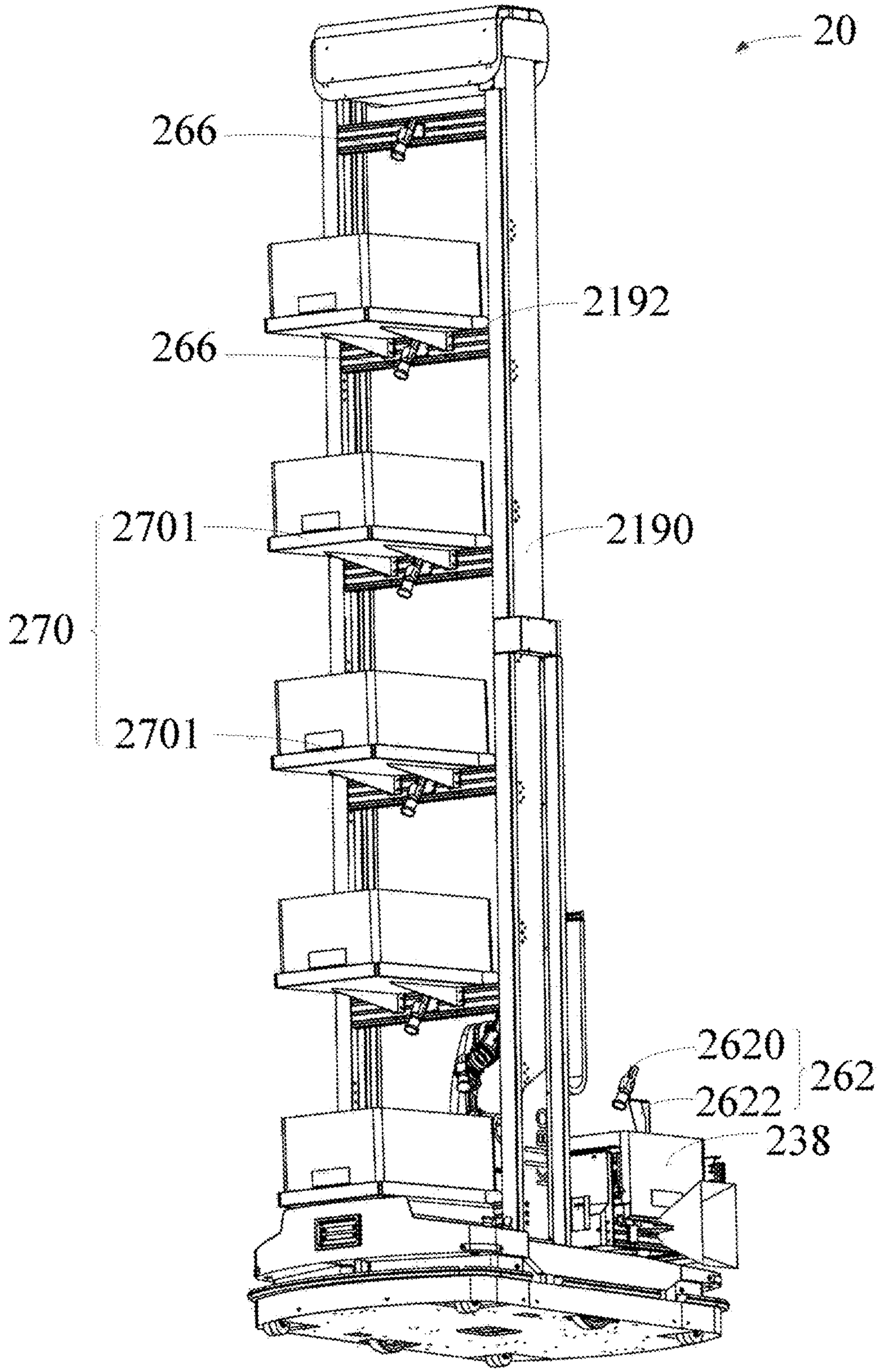
FIG. 10*d* is a perspective view of the handling robot shown in FIG. 10*b* from another angle.
Figure 10E:
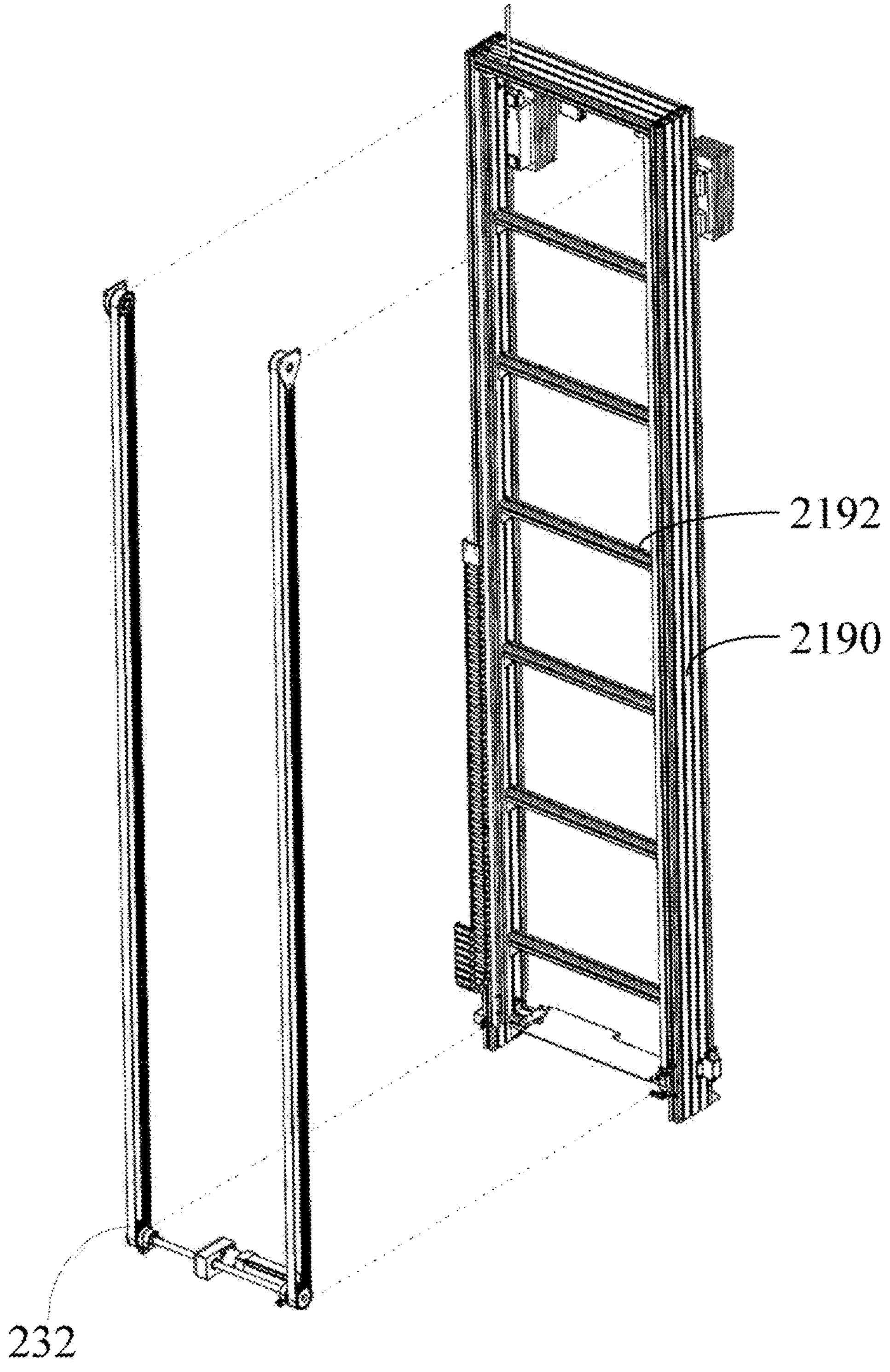
FIG. 10*e* is a schematic diagram of assembling a vertical bracket and a lift driving device of the handling robot shown in FIG. 10*b;*
Figure 10F:
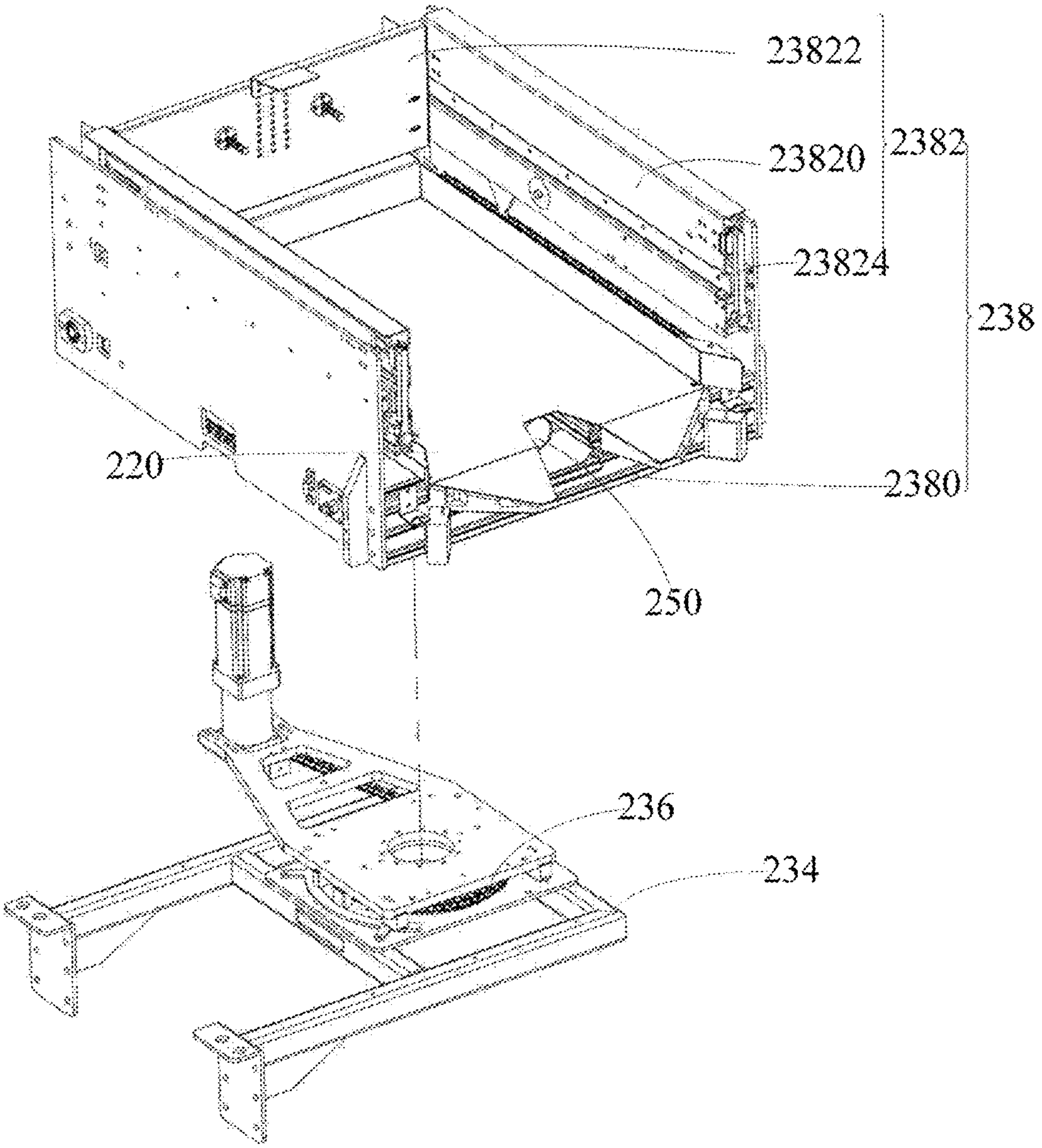
FIG. 10*f* is a schematic diagram of a disassembled material box handling component of the handling robot shown in FIG. 10*b;*

Referring to FIG. 10*d* and FIG. 10*f* together, the pallet 220 is a horizontally arranged plate and is fixedly installed to the material box handling component 230.

The material box stored on the storage shelf 270 may be stored by the material box handling component 230 or stored by a staff. In addition, the material box stored on the storage shelf 270 may be empty. In some other embodiments, the material transfer component 240 directly places the fetched material onto the storage shelf 270 without need to pre-store the material box on the storage shelf 270.

The storage shelf 270 is fixedly installed at one side of the vertical bracket 219. The storage shelf 270 includes a layered plate 2701. Multiple layered plates 2701 are distributed in the vertical direction. Each layered plate 2701 is configured to store a material box, and is supported by a corresponding cross beam 192. By configuring multiple layered plates 2701 for storing material boxes, after the material box stored on one layered plate 2701 is filled up by the material transfer component 240, the material transfer component 240 may continue to store a material into the material box stored on another layered plate 2701. It may be understood that, according to an actual situation, there may be only one layered plate 2701, for example, in the case where there is few materials or the material is small relative to the material box.

Referring to FIGS. 10*e* and 10*f*, the material box handling component 230 includes a lift driving device 232, an installation base 234, a rotation driving device 236, and a handling assembly 238.

The installation base 234 is movably installed to the vertical bracket 219 and may move in the vertical direction relative to the vertical bracket 219. The lift driving device 232 is configured to drive the handling assembly 238 to move in the vertical direction relative to the vertical bracket 219. The handling assembly 238 is movably installed to the installation base 234 and may be rotated around a vertical direction relative to the installation base 234. The rotation driving device 236 is configured to drive the handling assembly 238 to rotate around a vertical direction relative to the installation base 234. The handling assembly 238 is configured to fetch out the material box from a layered plate 2701 or the material space of the warehouse shelf at specified height and angle and store it onto the pallet 220, or to fetch out the material box from the pallet 220 and store it onto a layered plate 2701 or into the material space of the warehouse shelf at specified height and angle.

The material box handling component 230 fetches out the material box stored on the warehouse shelf or the storage shelf and stores it onto the pallet, which is specifically as follows:

The lift driving device 232 drives the handling assembly 238 to move in the vertical direction so that the handling assembly 238 is at the same height as the material box stored on the warehouse shelf or the layered plate. Meantime, the rotation driving device 236 drives the handling assembly 238 to rotate around the vertical direction so that the handling assembly 238 is aligned with the material box stored on the warehouse shelf or the layered plate. After lifting and rotating of the handling assembly 238 are completed, the handling assembly 238 fetches out the material box stored on the warehouse shelf or the layered plate 2701 and stores it onto the pallet 220.

The material box handling component 230 fetches out the material box stored on the pallet and stores it onto the warehouse shelf or the storage shelf, which is specifically as follows:

The lift driving device 232 drives the handling assembly 238 to move in the vertical direction, so that the handling assembly 238 is at the same height as the empty space of the warehouse shelf or the layered plate. Meantime, the rotation driving device 236 drives the handling assembly 238 to rotate around the vertical direction so that the handling assembly 238 is aligned with the empty space of the warehouse shelf or the layered plate. After lifting and rotating of the handling assembly 238 are completed, the handling assembly 238 fetches out the material box stored on the pallet 220 and stores it onto the warehouse shelf or the storage shelf 270.

By configuring the lift driving device 232, that the lift driving device 232 drives the handling assembly 238 supported by the installation base 234 to move in the vertical direction, so that the handling assembly 238 may store and fetch the material box from the layered plate 2701 or the warehouse shelf at different heights. Therefore, the warehouse shelf may be configured as having multiple layers, thereby improving the utilization rate of the warehouse shelf in the vertical space. Furthermore, the storage shelf 270 may be configured as having multiple layers, which improves the utilization rate of the storage shelf 270 in the vertical space while realizing that the storage shelf 270 may store multiple material boxes. In some other embodiments, the lift driving device 232 may be omitted, such as, in the case where the storage shelf 270 and the warehouse shelf have only one layer as described above.

By configuring the rotation driving device 236, the rotation driving device 236 drives the handling assembly 238 to rotate around the vertical direction, so that the handling assembly 238 may store and fetch the material box from the warehouse shelves at different directions. The material fetching mode of the handling assembly 238 is more flexible and facilitates to store and fetch the material box in a complex warehouse environment. In some other embodiments, the rotation driving device 236 may be omitted, for example, when the empty space of the warehouse shelf or the material box stored on the warehouse shelf is always in the material fetching direction of the handling assembly 238. For example, a dedicated track of the mobile component 210 is arranged on the ground of the warehouse, and after the mobile component 210 approaches the warehouse shelf, the empty space of the warehouse shelf or the material box stored on the warehouse shelf is located in the material fetching direction of the handling assembly 238, and since the layered plate 2701 is part of the handling robot 100, the layered plate 2701 just needs to be configured to be in the material fetching direction of the handling assembly 238.

Some specific implementations of the material box handling component 230 will be introduced below. It should be noted that the following implementations are only exemplary, and other material box handling components that can meet at least one of the above situations are all within the protection scope of the present application.

The installation base 234 and the storage shelf 270 are respectively located at two opposite sides of the vertical bracket 219. The installation base 234 is formed by welding profiles and plates, and the installation base 234 is provided with two sliding members. Each sliding member is installed in a corresponding sliding chute and may move along the sliding chute.

The lift driving device 232 includes two sets of first sprocket mechanisms, a transmission shaft and a lift driving motor. Each set of first sprocket mechanism is installed to a corresponding upright post, two ends of the transmission shaft are fixed coaxially with driving wheels of the two sets of first sprocket mechanisms, respectively, and the installation base is fixedly connected with the link chains of the two sets of first sprocket mechanisms, respectively. The lift driving motor is configured to drive a driving shaft to rotate, so as to drive the two sets of sprockets to move synchronously, and thus drive the installation base to move in the vertical direction.

It can be understood that, according to an actual situation, the first sprocket mechanism may also be replaced with a belt pulley mechanism, a gear rack transmission mechanism, and the like.

The rotation driving device 236 includes a second sprocket mechanism and a rotation driving motor. The driving wheel of the second sprocket mechanism is rotatably installed to the handling assembly 238, the transmission wheel of the second sprocket mechanism is fixedly installed to the installation base 234, and the rotation driving motor is configured to drive the driving wheel to rotate, and thus drive the handling assembly 238 to rotate around a vertical direction.

It can be understood that, according to an actual situation, the second sprocket mechanism may also be replaced with a belt pulley mechanism, a gear set, and the like.

The handling assembly 238 includes an installation platform 2380 and a telescopic arm device 2382, and the telescopic arm device 2382 is installed to the installation platform 2380. The installation platform 2380 may be installed at the top of the installation base 234 through slewing bearing, so that the entire handling assembly 238 may rotate relative to the installation base 234 around a vertical direction. The pallet 220 is fixedly installed to the installation platform 2380, and the telescopic arm device 2382 is configured to push the material box stored on the pallet 220 to the empty space of the layered plate 2701 or the warehouse shelf, or to pull the material box stored on the layered plate 2701 or the warehouse shelf onto the pallet 220. In some other embodiments, the telescopic arm device 2382 moves a material box by lifting or gripping.

Two sets of telescopic arm devices 2382 are symmetrically arranged at both sides of the pallet 220, and the two sets of telescopic arm devices 2382 work jointly to push or pull a material. According to an actual situation, there may be only one telescopic arm device 2382.

Each set of telescopic arm device 2382 includes a telescopic arm 23820, an immobile pusher 23822 and a mobile pusher 23824. One end of the telescopic arm 23820 is fixedly installed to the installation platform 2380, and the other end may be extended out or retracted horizontally relative to the installation platform 2380. The telescopic arm 2382 includes an inner section arm, a middle section arm and an outer section arm. The outer section arm is fixedly installed to the installation platform 2380 and located at one side of the pallet 220. The middle section arm is movably installed at a side of the outer section arm close to the pallet 220, the middle section arm may be extended out or retracted relative to the outer section arm, and the middle section arm is driven by the sprocket transmission mechanism. The inner section arm is movably installed at a side of the middle section arm close to the pallet 220. The inner section arm may be extended out or retracted relative to the middle section arm. The inner section arm is driven by a movable pulley mechanism. A pulley of the movable pulley mechanism is installed to the inner section arm. Two ends of strop of the movable pulley are respectively installed to the outer section arm and the middle section arm. When the middle section arm is extended out or retracted relative to the outer section arm, the inner section arm moves in the same direction relative to the outer section arm, and the moving speed of the inner section arm is twice that of the middle section arm.

The immobile pusher 23822 protrudes from the other end of the telescopic arm 23820, and the mobile pusher 23824 is movably installed at the other end of the telescopic arm 23820. When the telescopic arm 23820 is extended out or retracted, the mobile pusher 23824 and immobile pusher 23822 are extended out or retracted together. The mobile pusher 23824 may be received into or protruded from the other end of the telescopic arm 23820, and may be directly driven by a motor. The mobile pusher 23824 and the immobile pusher 23822, which are protruded from the other end of the telescopic arm 23820, are spaced apart from each other, and a distance between the two is used for accommodating a material box. In a protruding direction of the telescopic arm 23820, the mobile pusher 23824 protruded from the other end of the telescopic arm 23820 is located in the front of the immobile pusher 23822. The mobile pusher 23824 and the immobile pusher 23822, which are protruded from the other end of the telescopic arm 23820, are both located at the same side of the telescopic arm 23820 as the pallet 220, and both are higher than a position of the pallet 220.

When the handling assembly 238 fetches a material box out of the pallet 220 and stores it into an empty space of the layered plate 2701 or the warehouse shelf, the mobile pusher 23824 is in the state of being received in the other end of the telescopic arm 23820, and the telescopic arm 23820 is extended out. The immobile pusher 23822 pushes the material box stored on the pallet 220 from the pallet 220 into the empty space of the layered plate 2701 or the warehouse shelf, and after the material box is pushed into the empty space of the layered plate 2701 or the warehouse shelf, the telescopic arm 23820 is retracted.

When the handling assembly 238 fetches a material box out of the layered plate 2701 or the warehouse shelf and stores it onto the pallet 220, the mobile pusher 23824 is in the state of being received into the other end of the telescopic arm 23820, and the telescopic arm 23820 is extended out to make the mobile pusher 23824 pass over the material box. The mobile pusher 23824 protrudes from the other end of the telescopic arm 23820 after passing over the material box, and then the telescopic arm 23820 is retracted, and the mobile pusher 23824 protruded from the telescopic arm 23820 pulls the material box onto the pallet 220. After the material box is pulled onto the pallet 220, the mobile pusher 23824 is received into the other end of the telescopic arm 23820.

Referring to FIG. 10*f* again, the material box identification component 250 includes a camera device that is installed to the handling assembly 238, and the lens of the camera device has an orientation that is the same as the protruding direction of the telescopic arm 23820, and is used to acquire the image information of the warehouse shelf or the material box. The camera device is fixedly installed to the installation platform 2380. In some other embodiments, the camera device is installed at the other end of the telescopic arm 23820 and may be extended out along with the other end of the telescopic arm 23820.

By acquiring the image information of the warehouse shelf, it can be determined whether the empty space of the warehouse shelf or the material box stored on the warehouse shelf is at the same height as the handling assembly 238. Since the position of the layered plates is relatively fixed, whether the empty space of the layered plate or the material box stored on the layered plate is at the same height as the handling assembly 238 can be achieved by setting parameters of the lift driving device and the rotation driving device through a program, which is more efficient. Of course, it is also possible to identify the empty space of the layered plate or the material box stored on the layered plate via the material box identification component.

In some embodiments, the warehouse shelf is posted with a two-dimensional code. The handling assembly 238 is initially located at the lowest position, the handling assembly 238 gradually rises, and the camera device starts to scan starting from a low-layer two-dimensional code. When a specified two-dimensional code is scanned, the handling assembly 238 stops lifting. At this time, the empty space of the warehouse shelf or the material box stored on the warehouse shelf is at the same height as the handling assembly. The material box is also posted with a two-dimensional code. When the material box stored on the warehouse shelf is at the same height as the handling assembly 238, the handling assembly 238 is rotated, and the camera device scans the two-dimensional code on the material box. When the two-dimensional code on the material box is relatively complete or centered in the visual field of the camera device, the handling assembly 238 stops rotating. At this time, the handling assembly 38 is aligned with the material box stored on the warehouse shelf.

Figure 10G:
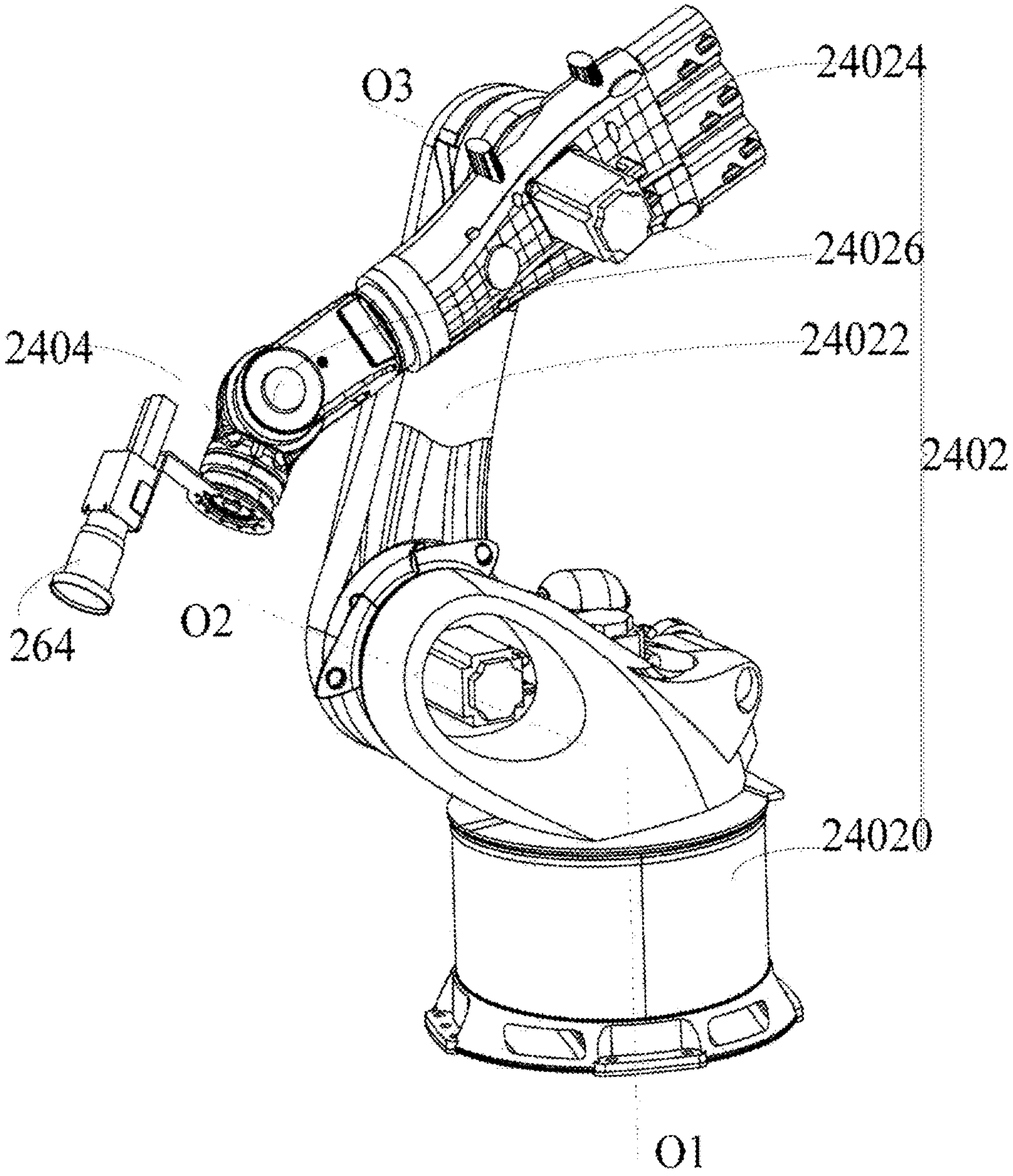
FIG. 10*g* is a perspective view of a material transfer component of the handling robot shown in FIG. 10*b;*

Referring to FIG. 10*g*, the material transfer component 240 is installed to the installation platform 2380, and may be rotated around the vertical axis or moved in the vertical direction along with the handling assembly 238, so that the material box stored on the layered plate 2701 and the material transfer component 240 are at the same height or the material transfer component 240 is close to the material box stored on the layered plate 2701. The material transfer component 240 includes a multidimensional mechanical joint 2402 and a terminal actuator 2404. One end of the multidimensional mechanical joint 2402 is installed to the installation platform 2380 and is located at the same side of the installation platform 2380 as the pallet 220. The other end of the multidimensional mechanical joint 2402 may rotate in multiple angles and move in multiple directions relative to the installation platform 2380. The multidimensional mechanical joint 2402 includes a rotation base 24020, a first rotation arm 24022, a second rotation arm 24024, and a three-axis platform 24026. The rotation base 24020 has a first rotation axis O1. One end of the first rotation arm 24022 is movably installed to the rotation base 24020. The first rotation arm 24022 may rotate relative to the rotation base 24020 around a second rotation axis O2 that is perpendicular to the first rotation axis O1. One end of the second rotation arm 24024 is movably installed at the other end of the first rotation arm 24022, and the second rotation arm 24024 may rotate relative to the other end of the first rotation arm 24022 around a third rotation axis O3 that is parallel to the second rotation axis O2. The three-axis platform 24026 is installed at the other end of the second rotation arm 24024 and is configured to install the terminal actuator 2404. The rotation base 24020 is installed to the installation platform 2380 and is located at the same side of the installation platform 2380 as the pallet 220. The first rotation axis O1 is in the vertical direction, and the second rotation axis O2 is in the horizontal direction.

The terminal actuator 2404 is configured to fetch or release a material, and is installed at the other end of the multidimensional mechanical joint 2402. In this embodiment, the terminal actuator 2404 is a sucker device for grabbing a material by adsorption. According to an actual situation, the terminal actuator 2404 is not limited to the sucker device. According to different types of materials, the terminal actuator 2404 can be configured to be adaptive to a type of material. For example, the sucker device is suitable for grabbing a solid boxed material with a relatively flat surface, and the mechanical claw is suitable for grabbing a material with an unfixed shape, such as clothes, and so on.

A specific process of the material transfer component 240 fetching a material out of a material box stored on the pallet 220 is as follows: the multidimensional mechanical joint 2402 drives the terminal actuator 2404 to move into the material box stored on a pallet 220, and after the terminal actuator 2404 fetches a material, the multidimensional mechanical joint 2402 drives the terminal actuator 2404 to return to its original position.

A specific process of the material transfer component 240 storing the fetched-out material into a material box stored on the layered plate 2701 is as follows: after the multidimensional mechanical joint 2402 drives the terminal actuator 2404 to move until it is above a material box stored on the layered plate 2701, the terminal actuator 2404 releases the material so that the material falls into the material box stored on the layered plate 2701. According to an actual situation, for example, when the material is a fragile item, in order to prevent the material from damage due to falling, after the multidimensional mechanical joint 2402 drives the terminal actuator 2404 to move until it is above the material box stored on this layered plate 2701, the multidimensional mechanical joint 2402 drives the terminal actuator 2404 to extend into the material box stored on the layered plate 2701 and then the terminal actuator 2404 releases the material to avoid the damage caused by the falling of material.

Referring to FIGS. 10*d* and 10*g*, the material identification component 260 includes a first material identification device 262, a second material identification device 264, and a third material identification device 266.

Both the first material identification device 262 and the second material identification device 264 are configured to identify the material in the material box stored on the pallet 220.

The first material identification device 262 is fixedly installed to the installation platform 2380. The first material identification device 262 includes a first camera 2620 and a camera holder 2622. The camera holder 2622 is rod-shaped and is located at the same side of the installation platform 2380 as the pallet 220. One end of the camera holder 2622 is fixedly installed to the installation platform 2380, and the other end of the camera holder 2622 is higher than the pallet 220. The first camera 2620 is installed at the other end of the camera holder 2622 and is configured to acquire the image information of the material in the material box stored on the pallet 220, so as to identify the material in the material box stored on the pallet 220.

The second material identification device 264 is fixedly installed at the other end of the multidimensional mechanical joint 2402 and may move along with the other end of the multidimensional mechanical joint 2402. The second material identification device 264 includes a second camera. The second camera is installed at the other end of the multidimensional mechanical joint 2402 and may move along with the other end of the multidimensional mechanical joint 2402 and is configured to acquire the image information of the material in the material box stored on the pallet 220, so as to identify the material in the material box stored on the pallet 220.

The second material identification device 264 is further configured to identify the material in the material box stored on the storage shelf 270. Specifically, the second camera moves along with the other end of the multidimensional mechanical joint 2402 and is configured to acquire the image information of the material in the material box stored on the layered plate 2701, so as to identify the material in the material box stored on the layered plate 2701.

The third material identification device 266 is configured to identify the material in the material box stored on the storage shelf. The third material identification device 266 includes a third camera 2660. A plurality of third cameras 2660 are distributedly installed to the vertical bracket 219 in the vertical direction, and each third camera 2660 is configured to acquire the image information of material in the material box stored on a corresponding layered plate 2701, so as to identify the material in the material box stored on the corresponding layered plate 2701. Each third camera 2660 may be hung on a corresponding cross beam 2192, and a corresponding layered plate 2701 is located below the cross beam 2192.

Here is a detailed description of how each material identification device (that is, the first, second, and third material identification devices as described above) identifies the material in the material box. The aforementioned image information of the material includes SKU (stock keeping unit) information of material and position information of material. The material is posted with a barcode containing the SKU information. By scanning the barcode in the camera's field of view, a barcode containing the specified SKU information is marked, and the material posted with this barcode is a material to be fetched out (in the material box stored on the pallet) or a material that has been stored (in the material box stored on the layered plate). Since the position of the material box stored on the pallet or the layered plate is basically fixed, the position of the material to be stored or fetched out in the material box may be determined according to the position of the marked barcode in the camera's field of view. At this time, the material identification device completes the work of identification of the material in the material box.

On the basis of the aforementioned principle of material identification by the material identification device, the difference among the first, second, and third material identification devices is further set forth here. Both the first material identification device and the second material identification device are configured to identify the material in the material box stored on the pallet, but the first material identification device is fixed to the installation base. In the case where positions of materials in the material box are scattered, the first camera of the first material identification device can accurately acquire the position information of each material in the material box; however, when the positions of the materials in the material box are relatively dense, the accuracy of the first camera to acquire the position information of each material in the material box will be decreased. The third material identification device is fixed to the storage shelf Similar to the first material identification device, when the positions of the materials in the material box stored on the layered plate are relatively scattered, the third camera of the third material identification device can accurately acquire the image information of the materials in the material box; and when the positions of the materials in the material box stored on the layered plate are relatively dense, the accuracy of the third camera of the third material identification device to acquire the position information of each material in the material box will be decreased. Therefore, by installing the second material identification device to the other end of the material transfer component, the second material identification device moves along with the other end of the material transfer component and the material transfer component may drive the second material identification device to move and approach each material in the material box, so as to improve the accuracy of the second camera of the second material identification device to acquire the image information of each material in the material box. Therefore, in some other embodiments, the second material identification device may be omitted when the positions of the materials in the material box are scattered as described above.

Since both the first material identification device and the second material identification device are configured to identify the material in the material box stored on the pallet, in order to improve the identification efficiency, the first material identification device performs the identification of the material in the material box prior to the second material identification device. If the first material identification device has identified the position information and the SKU information of the material in the material box (as in the case where the positions of the materials are relatively scattered as described above), the second material identification device only needs to identify the SKU information of the material in the material box according to the position information and the SKU information provided by the first material identification device, and find the matching SKU information, and then the position information of the material can be determined, without need to identify the position information of the material again. If the first material identification device does not identify the position information of the material, the second material identification device needs to identify the position information and the SKU information of the material. Both the second material identification device and the third material identification device are configured to identify the material in the material box stored in the storage component, and have the same cooperation principle as that of the first material identification device and the second material identification device, which will not be repeated here.

The second material identification device is further configured to identify the SKU information of the material fetched by the terminal actuator to match the specified SKU information, so as to determine whether the terminal actuator fetches a wrong material. Based on this, by configuring multiple layered plates, it is also possible to select a stored material box from the multiple layered plates, and is only used for storing the wrong material.

Figure 11A:
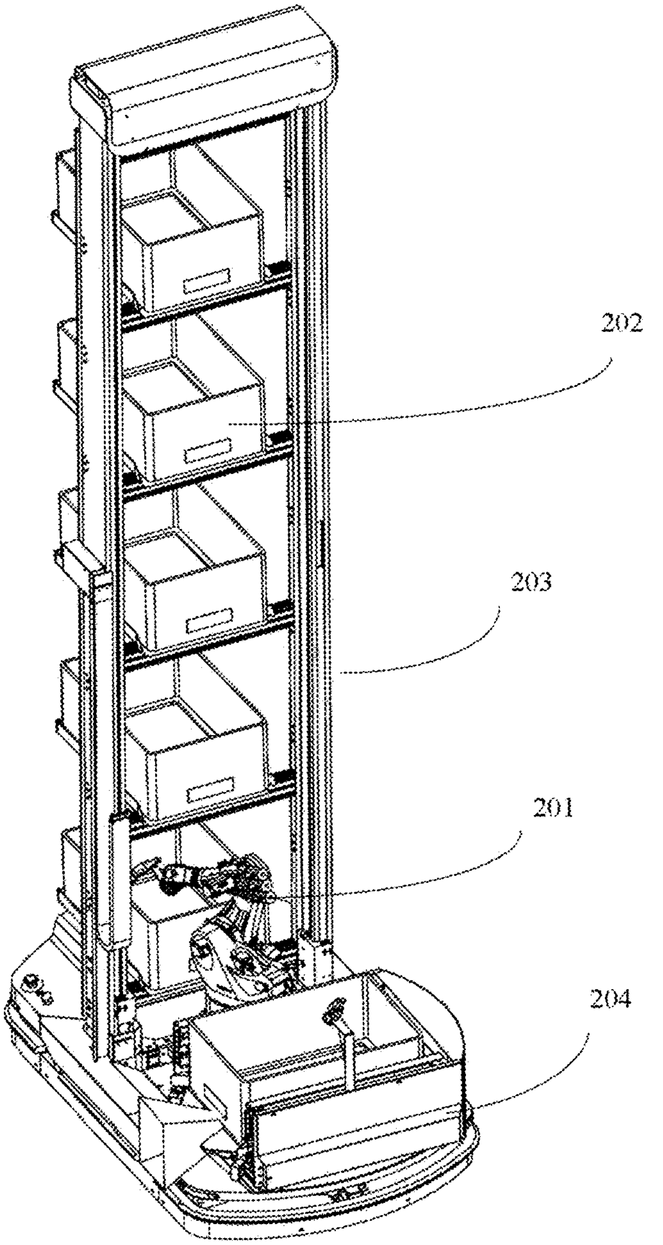
FIGS. 11*a*-11*b* each are a structural schematic diagram of a handling robot provided by an embodiment of the present application.
Figure 11B:
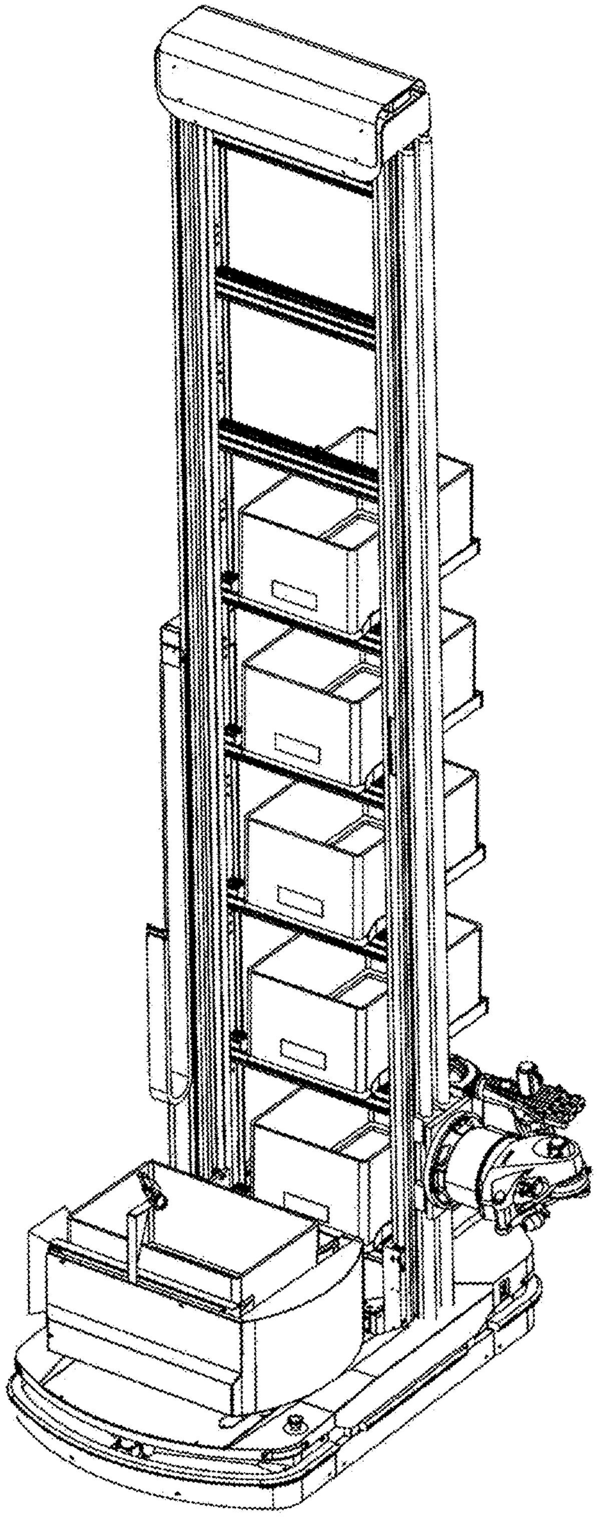

FIG. 11*a* is a schematic structural diagram of a handling robot 20 provided by an embodiment of the present application. In this embodiment of the present application, the various components and elements of the handling robot 20 in the foregoing embodiments may correspond to specific physical devices. For example, the material handling component 230 may include the handling assembly, and the material transfer component 240 may include the mechanical arm. The storage shelf 270 may be configured to pre-place various material-holding containers, such as a material box or a basket. The vertical bracket 219 may be used for supporting the handling assembly, the mechanical arm, and the storage shelf. The handling assembly, the mechanical arm, and the storage shelf may all be installed to the vertical bracket. Referring to FIG. 11*a*, the handling robot 20 includes a material transfer component 201, a storage shelf 202, a vertical bracket 203 and a handling assembly 204. Among them, the material transfer component 201 may be installed to the handling assembly 204, the handling assembly 204 may be slidably connected to the vertical bracket 203, and the material transfer component 201 may follow the handling assembly 204 to move up and down on the vertical bracket. The material transfer component 201 may also be slidably connected to the vertical bracket 203, which may include upright posts on two sides. When the material transfer component 201 is slidably connected to the vertical bracket 203, the material transfer component 201 may be one or two, which are slidably connected to the upright posts of the vertical bracket 203 respectively. The material transfer component 201 may move up and down on the upright posts. FIG. 11*b* shows a schematic diagram of the material transfer component 203 slidably connected to the vertical bracket 203. The storage shelf 202 is installed to the vertical bracket 203. The storage shelf 202 may be multiple and arranged in layers on one side of the vertical bracket 203, and the handling assembly 204 is arranged on the other side of the vertical bracket 203.

Figure 12:
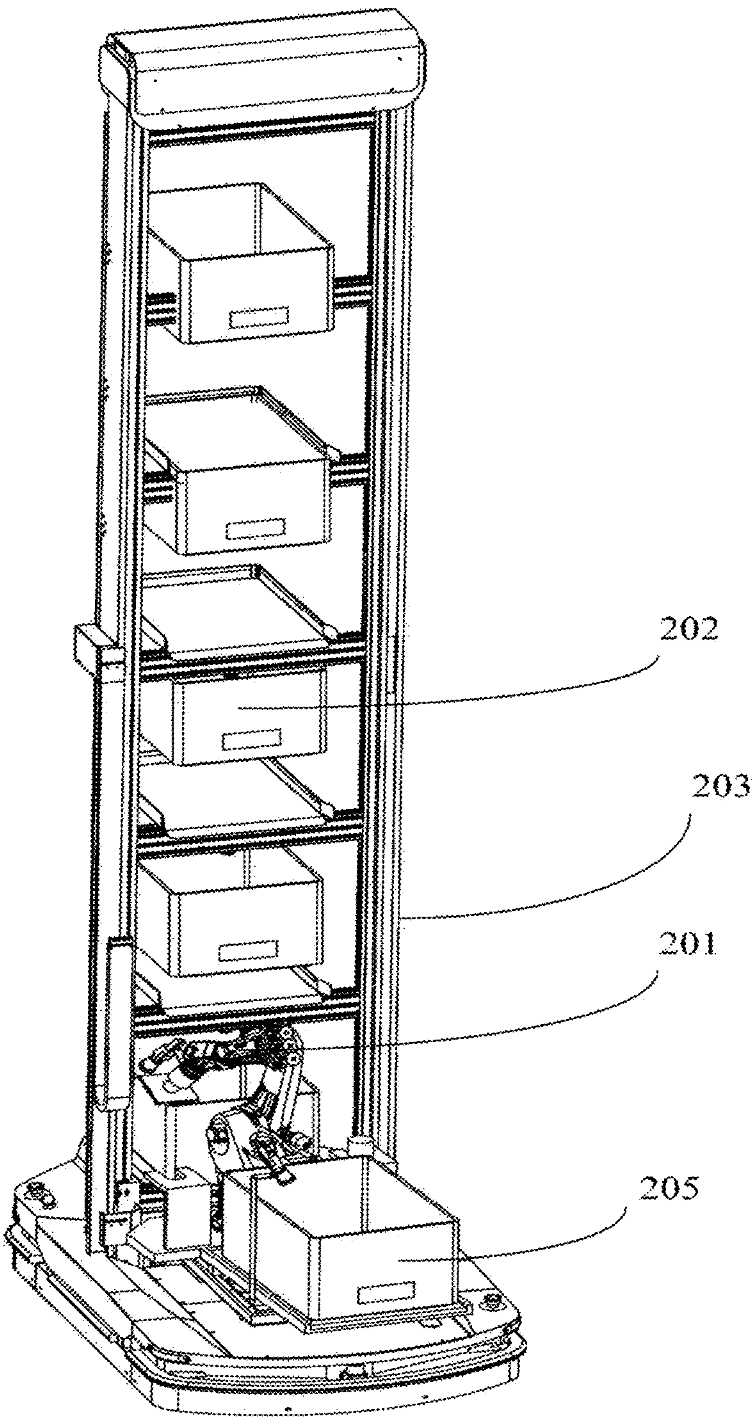
FIG. 12 is a structural schematic diagram of another handling robot provided by an embodiment of the present application.

Referring to FIG. 12, which is a schematic structural diagram of another handling robot 20 provided by an embodiment of the present application. In this embodiment of the present application, various components and elements of the handling robot 20 in the foregoing embodiments may correspond to specific physical devices. For example, the material handling component 230 may include the installation platform, and the material transfer component 240 may include the mechanical arm. The storage shelf may be configured to pre-place various material-holding containers, such as a material box or a basket. The vertical bracket 219 may be used for supporting the installation platform, the material transfer component and the storage shelf. The installation platform, the material transfer component and the storage shelf may all be installed to the vertical bracket. Referring to FIG. 12, the handling robot 20 includes the material transfer component 201, the storage shelf 202, the vertical bracket 203 and the installation platform 205. Among them, the material transfer component 201 may be installed to the installation platform 205, which may be slidably connected to the vertical bracket 203. The material transfer component 201 may follow the installation platform 205 to move up and down on the vertical bracket, the material transfer component 201 may also be slidably connected to the vertical bracket 203, which may include upright posts on two sides. When the material transfer component 201 is slidably connected to the vertical bracket 203, the material transfer component 201 may be one or two, which are slidably connected to the upright posts of the vertical bracket 203 respectively. The material transfer component 201 may move up and down on the upright posts. The storage shelf 202 is installed to the vertical bracket 203. The storage shelf 202 may be multiple and arranged in layers on one side of the vertical bracket 203, and the installation platform 205 is arranged on the other side of the vertical bracket 203.

For a situation where there are multiple storage shelves 202, the storage shelves may be divided into an order material storage shelf and a temporary material storage shelf Among them, the order material storage shelf is configured to store a material to be fetched, and the material to be fetched may correspond to a material on an order. The temporary material storage shelf is configured to store a material that is not on the order, that is, the material fetched and placed by the material transfer component does not belong to the material to be fetched.

In the implementation of the present application, compared with the handling assembly 204, the installation platform 205 cannot move the material box, and the material transfer component 201 can be used to move the material box to the installation platform. The sliding mechanism may move the installation platform up and down in the vertical direction so as to move the material box on the installation platform to a height corresponding to the storage shelf, so that the material transfer component fetches out the material to be fetched from the material box and places it onto the storage shelf. In addition, the installation platform 205 may be rotated so that the installation platform may be aligned with the material box on the shelf so as to move the material box.

In the embodiment of the present application, the material transfer component 201 may be provide with a sucker or a mechanical claw, and a material may be sucked out through the sucker or grabbed through the mechanical claw. The sucker or the mechanical claw may be provided at the end of the material transfer component, and may be replaced according to different materials.

In the embodiment of the present application, in order to identify the position of the material in the material box, the material in the material box may be captured by the material identification device. At the same time, in order to confirm the accuracy of the material fetched and placed by the material transfer component, the material information of the material may be captured by the material identification device. The material identification device may be installed to the material transfer component, the handling assembly and/or the installation platform. The material identification device may capture the image information of the material to be fetched in the material box, and the image information includes: the position information of material to be fetched in the material box, the stock keeping unit information of the material to be fetched, the shape of material to be fetched, and the image feature point of material to be fetched, and the color information of a material to be fetched and/or volume information of a material to be fetched.

In the embodiment of the present application, the handling robot 20 further includes a mobile chassis for moving the handling robot 20 according to a planned path. The planned path may be a path for fetching and placing a material. The path may be planned by the processing terminal 10 and sent to the handling robot in the form of instructions. For example, the processing terminal 10 sends a material fetching instruction to the handling robot and thus correspondingly moves the handling robot to realize material fetching.

In the application scenario and related devices shown in FIGS. 9-12, the material fetching method provided in the embodiments of the present application may be used to perform a material fetching operation through the material transfer component, improving the efficiency of material fetching and increasing the degree of automation of material sorting.

Figure 13:
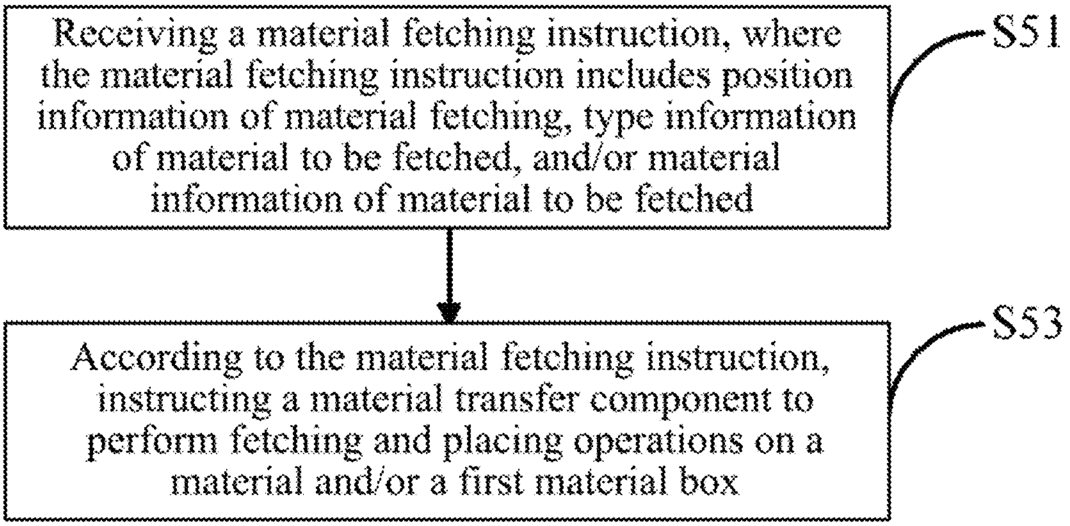
FIG. 13 is a schematic flowchart of a material fetching method provided by an embodiment of the present application.

FIG. 13 is a flowchart of a material fetching method provided by an embodiment of the present application. As shown in FIG. 13, the material fetching method is applied to the handling robot described above, and the handling robot includes a material transfer component, and the material fetching method includes:

S51, receiving a material fetching instruction, where the material fetching instruction includes the position information of material fetching, the type information of material to be fetched, and/or the material information of material to be fetched.

In the embodiment of the present application, the material fetching instruction may be sent by the processing terminal to the handling robot, and the handling robot receives the material fetching instruction and parses the material fetching instruction to identify the information included in the instruction, such as the position information of material fetching, the type information of material to be fetched, and/or the material information of material to be fetched. Among them, the position information of material fetching may include the position of the material box in which the material to be fetched is stored, and the position of the material box may be different positions on the shelf in the warehouse. The position information may be three-dimensional space coordinates, or may be determined by the information of the code, such as two-dimensional code, on the material box. The type information of material to be fetched may include the stock keeping unit information (SKU information) of the material to be fetched. Through the SKU information, the name, quantity, model and other information of the material to be fetched may be determined. For different material boxes, the SKU information of the materials in the material boxes may be the same or different. The SKU information may be presented in the form of bar code. The material information of material to be fetched may include shape, volume, image feature point, color and weight information of material to be fetched, and the material information may be presented in the form of word, number or image.

In the embodiment of the present application, for different types of handling robots, due to individual differences in structure, different method steps may be executed after the material fetching instruction is received, for example:

For a handling robot that includes a vertical bracket and a handling assembly to which a material transfer component is installed, the method further includes:

- instructing the handling assembly to move to a first position according to the position information of material fetching, and
- instructing the handling assembly or the material transfer component to move a first material box carrying a material to be fetched from a second position to the first position.

For a handling robot that includes a handling assembly and a vertical bracket to which at least one material transfer component is slidably connected, the method further includes:

- instructing the handling assembly to move to a first position according to the position information of material fetching,
- instructing the handling assembly to move a first material box carrying a material to be fetched from a second position to the first position, or
- instructing the material transfer component to move to the first position, and moving a first material box carrying the material to be fetched from the second position to the first position.

For a handling robot that includes a vertical bracket and an installation platform on which the material transfer component is installed, the method further includes:

- instructing the installation platform to move to a first position according to the position information of material fetching, and
- instructing the material transfer component to move a first material box carrying a material to be fetched from a second position to the first position.

For a handling robot that includes an installation platform and a vertical bracket to which at least one material transfer component is slidably connected, the method further includes:

- instructing the installation platform to move to a first position according to the position information of material fetching, and
- instructing the material transfer component to move to the first position, and moving a first material box carrying a material to be fetched from a second position to the first position.

In the embodiment of the present application, each of the above-mentioned handling robots may further include at least one storage shelf. Furthermore, the handling assembly or the installation platform may further include a rotation driving device, and the rotation driving device is configured to drive the handling assembly or the installation platform to rotate around a vertical position, and the method further includes:

- instructing the handling assembly or the material transfer component to move the first material box from the first position to a corresponding storage shelf, or
- instructing the handling assembly or the material transfer component to move the first material box from the first position to s third position corresponding to the storage shelf.

Among them, for the mode of fetching material in the manner of full container loading, the first material box may be directly placed on the corresponding storage shelf, and for the mode of fetching material from the material box, the first material box may be moved to a height corresponding to the storage shelf so that the material to be fetched is fetched out from the first material box and placed onto the corresponding storage shelf or the second material box pre-placed on the storage shelf.

In the embodiment of the present application, the storage shelf of various types of handling robots described above may be multiple and arranged in layers at one side of the vertical bracket, and the handling assembly or the installation platform is arranged at the other side of the vertical bracket.

In the embodiment of the present application, the handling robot may move, according to the position information of material fetching, to the position of the material box in which the material to be fetched is located, by ground two-dimensional code map navigation or other navigation mode. At the same time, in order to be able to fetch out the material box from the shelf, the handling assembly or the installation platform needs to be moved to the first position. The first position is usually at the same height as the first material box carrying the material to be fetched. The position at which the first material box is located is the second position, where the first material box carrying the material to be fetched may be moved from the second position to the first position by the handling assembly or the material transfer component. After the handling assembly or the installation platform moves to the first position, the telescopic arm device of the handling assembly may be extended out to hold the material box, or the material transfer component may be used to grab the material box. When the handling assembly or the installation platform is not aligned with the material box, the posture of the handling robot may be adjusted by scanning the two-dimensional code on the shelf, so as to be aligned with the material box. After the first material box carrying the material to be fetched is moved from the second position to the first position, the material transfer component may fetch out the material to be fetched in the material box and place it onto the storage shelf or the pre-placed second material box of the storage shelf. Where the storage shelf may be located at the same height as the first position and within the fetching-and-placing range of the material transfer component. For example, the first position is on one side of the vertical bracket and the position of the storage shelf is on the other side of the vertical bracket. When there are two or more storage shelves, the material box may be moved from the first position to the third position corresponding to the storage shelf by the handling assembly or the installation platform, so that the mechanical arm fetches out the material to be fetched from the material box and place it onto the corresponding storage shelf or into the pre-placed second material box of the storage shelf. Since there are multiple storage shelves, the third position may be determined according to the storage shelf onto which the material fetched out from the first material box needs to be placed. The third position and the position of the storage shelf are at the same height, for example, at both sides of the vertical bracket.

S53, instructing, according to the material fetching instruction, the material transfer component to perform the fetching and placing operations on a material and/or a first material box.

In this embodiment of the present application, the information included in the material fetching instruction may be different. For example, the type information of material to be fetched and the material information of material to be fetched may be not exactly the same; the information in the material fetching instruction is different, which indicates that the ways of the material transfer component to perform material fetching and placing operations are also not exactly the same. For example, the type information of material to be fetched includes the stock keeping unit information. When the materials to be fetched in the first material box have the same stock keeping unit information, the material transfer component may be instructed to fetch out the material to be fetched from the first material box and place it onto the corresponding storage shelf or into the pre-placed second material box of the storage shelf. When the material to be fetched in the first material box have different stock keeping unit information, the image information of the material to be fetched in the first material box may be acquired, and a material that is consistent with the stock keeping unit information in the material fetching instruction is determined according to the image information of the material to be fetched in the first material box, and the material transfer component is instructed to fetch the material out from the first material box and place it onto the storage shelf or into the pre-placed second material box of the storage shelf.

In the embodiments of the present application, the image information includes: the position information of material to be fetched in a material box, the stock keeping unit information of material to be fetched, the shape of material to be fetched, the image feature point of material to be fetched, and the color information of a material to be fetched and/or volume information of a material to be fetched.

In this embodiment of the present application, the image information of the material to be fetched in the first material box may be acquired through the material identification device, where the material identification device may be installed to the material transfer component, or the material identification device is installed to the handling assembly, or the material identification device is installed to the installation platform, or the material identification device is installed to the material transfer component and the handling assembly, or the material identification device is installed to the material transfer component and the installation platform.

The acquiring the image information of the material to be fetched in the first material box includes:

acquiring the image information, which is taken by the material identification device of the material transfer component, the handling assembly or the installation platform, respectively, of the material to be fetched in the first material box;

or acquiring the image information, which is taken by the material identification devices of the handling assembly and of the material transfer component, of the material to be fetched in the first material box, or acquiring the image information, which is taken by the material identification devices of the installation platform and the material transfer component, of the material to be fetched in the first material box.

In the embodiments of the present application, the material information may include the shape, volume, image feature point, color, and/or weight information of the material to be fetched, and the storage shelf includes an order material storage shelf and a temporary material storage shelf, the order material storage shelf is pre-placed with a second material box, and it is determined, according to the stock keeping unit information of the material to be fetched, that the material to be fetched is placed onto the corresponding storage shelf or into the pre-placed second material box of the storage shelf, and the method further includes:

when a material that is consistent with consistent with the stock keeping unit information and/or the material information in the material fetching instruction cannot be determined by the image information acquired through the material identification device that is installed to the material transfer component, the installation platform or the handling assembly respectively, instructing the material transfer component to obtain the material from the first material box;

continuing to acquire the image information through the material identification device located in the material transfer component, the material identification device located in the handling assembly, or the material identification device located in the installation platform; and when it is determined through the image information that the material obtained by the material transfer component is inconsistent with the stock keeping unit information and/or the material information in the material fetching instruction, placing the material obtained by the material transfer component onto the temporary material storage shelf or a third material box pre-placed on the temporary material storage shelf, and otherwise placing it into the corresponding second material box.

In the embodiment of the present application, the material transfer component may also be instructed to perform the fetching and placing operations on the first material box according to the material fetching instruction. For example, the first material box is placed on the storage shelf in a whole-box manner to realize the fetching and placing operations of the whole material box.

In the embodiment of the present application, the material fetching instruction may include one or more of the position information of material fetching, the type information of material to be fetched, or the material information of the material to be fetched. The handling robot may instruct the material transfer component to perform the fetching and placing operations on the material and/or the first material box according to the specific information in the material fetching instruction, such as the material information or the type information of material to be fetched.

In the embodiment of the present application, the handling robot receives the material fetching instruction, and the material fetching instruction includes the position information of material fetching, the type information of material to be fetched, and/or the material information of the material to be fetched. According to the material fetching instruction, the material transfer component is instructed to perform the fetching and placing operations on the material and/or the first material box, which improves material fetching efficiency and enhances the degree of automation of material sorting.

To further illustrate the embodiments of the present application, a specific embodiment of a material fetching method based on specific information contained in the material fetching instruction is provided below.

Figure 14:
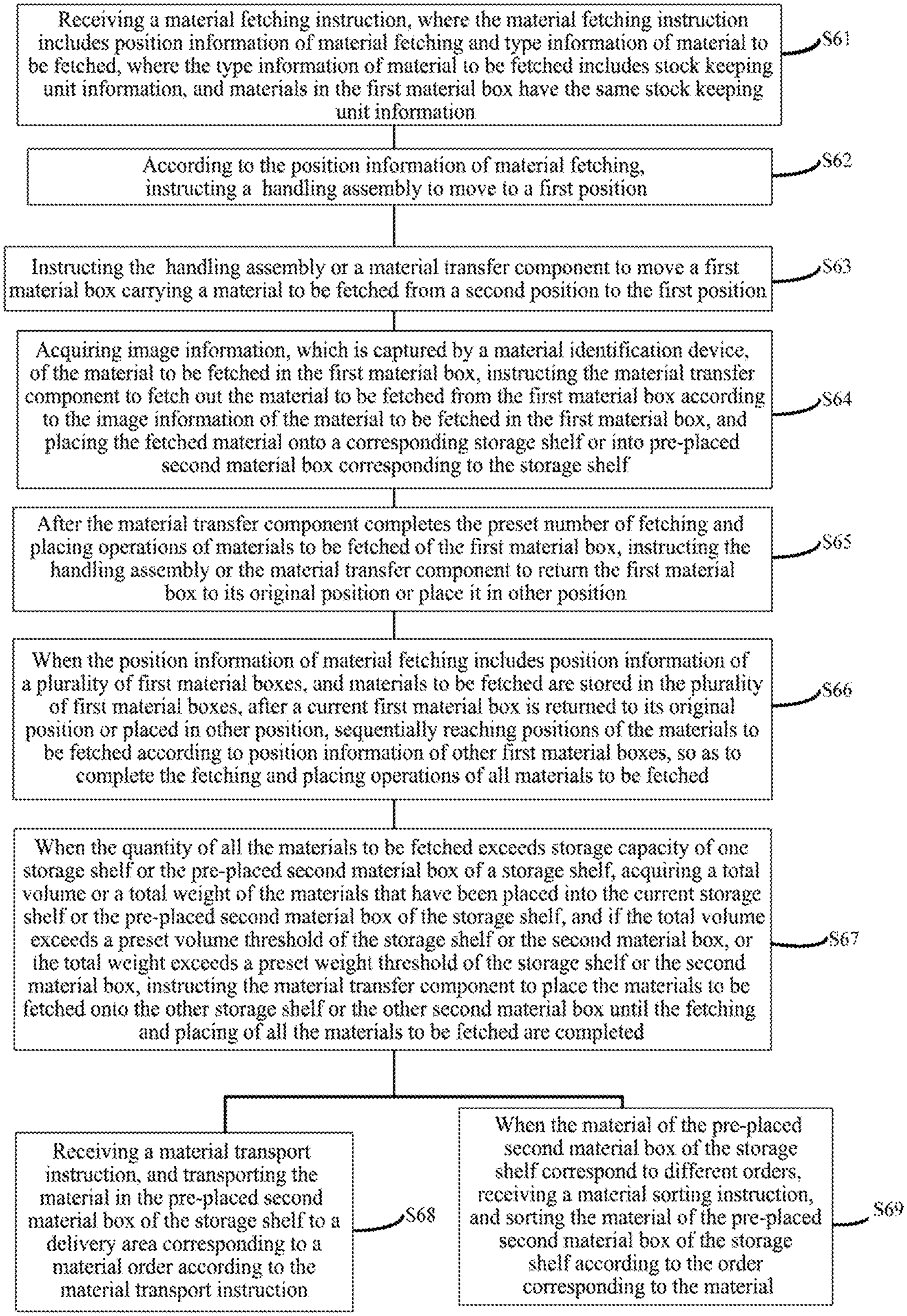
FIG. 14 is a flowchart of a material fetching method for the materials to be fetched that have the same inventory information in a first material box provided by an embodiment of the present application.

FIG. 14 is a flowchart of a material fetching method for materials to be fetched with the same inventory information in the first material box provided by an embodiment of the present application. As shown in FIG. 14, the material fetching method is applied to the above handling robots, where a handling robot having a material transfer component fixed on a handling assembly and a material identification device installed to the material transfer component is taken as an example for description in this embodiment, and the method includes:

S61, receiving a material fetching instruction, where the material fetching instruction includes the position information of material fetching and the type information of material to be fetched, where the type information of material to be fetched includes stock keeping unit information, and materials in the first material box have the same stock keeping unit information.

In the embodiment of the present application, the SKU information in the first material box in which the material to be fetched is located is the same, and the material transfer component does not need to perform distinguishing in the process of fetching and placing the material. For a single piece of material with a large volume, the material transfer component may be directly used for fetching the material; and for a single piece of material with a small volume, in order to facilitate the material transfer component to grab the material, it is possible to capture the image information of the material in the material box via the material identification device on the material transfer component. The image information may include the position of the material to be fetched in the material box, and the material is grabbed according to the captured position.

In the embodiment of the present application, after the handling robot receives a material fetching instruction, the material fetching instruction is parsed; and according to the parsed instruction information, the handling robot is instructed to perform corresponding processing. The processing include: instructing the handling robot to move according to the material fetching position, instructing the handling assembly and the material transfer component to perform associated operations such as moving material box and grabbing material, etc.

S62, instructing, according to the position information of material fetching, the handling assembly to move to a first position.

In the embodiment of the present application, the position information of material fetching includes a position of the first material box carrying the material to be fetched, for example, such as three-dimensional information of the position of the first material box. Before the handling assembly moves to the first position, the handling robot may move to the vicinity of the first material box carrying the material to be fetched, based on the position information of material fetching. Then according to the information located on the first material box, such as the code on the first material box, the accuracy of the position of the first material box is further verified through the information of the code on the first material box; and also according to the information of the code on the first material box, such as information of two-dimensional code, the posture of the robot may be adjusted so that the handling assembly may be aligned with the first material box.

In the embodiment of the present application, the first position is usually at the same height as the first material box carrying the material to be fetched, and a horizontal distance between the first position and the first material box is within a telescopic range of the telescopic arm device of the handling assembly, so that the handling assembly may move the first material box to the first position by extending out from the telescopic arm device.

S63, instructing the handling assembly or the material transfer component to move the first material box carrying the material to be fetched from the second position to the first position.

In the embodiment of the present application, after the handling assembly is moved to the first position, the first material box carrying the material to be fetched may be moved from the second position to the first position by the telescopic arm device of the handling assembly, or the first material box carrying the material to be fetched may be moved from the second position to the first position by the material transfer component. Where, the second position is a position at which the first material box is located, and this position is usually located on the shelf in the warehouse and may be determined by three-dimensional space coordinates.

S64, acquiring the image information, which is captured by the material identification device, of the material to be fetched in the first material box, instructing the material transfer component to fetch out the material to be fetched from the first material box according to the image information of the material to be fetched in the first material box, and placing the fetched material onto the corresponding storage shelf or into the pre-placed second material box corresponding to the storage shelf.

In the embodiment of the present application, since the materials to be fetched have the same SKU information, the image information of the material to be fetched in the first material box may be captured by the material identification device on the material transfer component, so as to avoid the material transfer component to be unable to grab the material during the material fetching by the material transfer component. The image information contains the position of the material to be fetched in the first material box. The material transfer component is instructed to fetch out the material to be fetched from the first material box. The material fetching manner may be using the sucker on the material transfer component to suck out the material, or using mechanical claw to grab the material. After the material is fetched out, the fetched material may be placed on the storage shelf or the second material box pre-placed on the storage shelf. The storage shelf may be at the same height as the first position, and the storage shelf may be on one side of the vertical bracket and the handling assembly may be on the other side of the vertical bracket. The storage shelf can also be at a different height from the first position, and then it is necessary to move the handling assembly to the same height as the storage shelf, so that the material transfer component fetches out the material to be fetched from the material box and places it onto the storage shelf or the pre-placed second material box of the storage shelf.

In the embodiment of the present application, the material to be fetched may correspond to the same order or different orders. For the materials to be fetched in the same order, they may be placed into the pre-placed second material box of the same storage shelf, and if there are the materials to be fetched in different orders, they may be placed in other pre-placed second material boxes of different storage shelves; the materials to be fetched in different orders may be placed in the preset second material boxes of corresponding different storage shelves, and the materials to be fetched may be placed into pre-placed second material box of the same storage shelf. If the materials to be fetched are placed into pre-placed second material box of the same storage shelf, it is necessary to sort the order materials before delivery.

S65, after the material transfer component completes the preset number of fetching and placing operations of the materials to be fetched of a first material box, instructing the handling assembly or the material transfer component to return the first material box to its original position or place it in other position.

In this embodiment of the present application, after the material transfer component completes the preset number of fetching and placing operations for the materials to be fetched of a first material box, that is, when the first material box has no material to be fetched that is on the order and needs to be fetched out, the handling assembly is instructed to move to the first position, that is, the height position corresponding to the original position of the first material box. Furthermore, the handling assembly or the material transfer component is instructed to place the first material box back to the original position of the first material box or place it in other position. As for the quantity of materials to be fetched that need to be fetched out from the first material box, it may be determined by the information included in the material fetching instruction. For example, the material fetching instruction may include the information on different quantities of the materials to be fetched of different orders.

S66, when the position information of material fetching includes position information of a plurality of first material boxes and materials to be fetched are stored in the plurality of first material boxes, after the current first material box is returned to its original position or placed at other position, sequentially reaching positions of the materials to be fetched according to position information of other first material boxes, so as to complete the fetching and placing operations of all the materials to be fetched.

In the embodiment of the present application, when the materials to be fetched on an order cannot be accommodated by one material box, multiple material boxes are needed to accommodate the materials on the order. At this time, the position information of the material fetching in the material fetching instruction may include position information of the multiple first material boxes, and the materials to be fetched on the order may be carried in the first material boxes at multiple positions. After the material transfer component completes the fetching and placing operations of the materials to be fetched in one first material box, the first material box may be placed back to its original position, and then the handling robot may sequentially reach the position of the materials to fetched according to the position information of other first material boxes, so as to complete the fetching and placing operations of all the materials to be fetched.

S67, when the quantity of all the materials to be fetched exceeds storage capacity of one storage shelf or the pre-placed second material box of a storage shelf, acquiring a total volume or a total weight of the materials that have been placed into the current storage shelf or the pre-placed second material box of the storage shelf, and if the total volume exceeds a preset volume threshold of the storage shelf or the second material box, or the total weight exceeds a preset weight threshold of the storage shelf or the second material box, instructing the material transfer component to place the materials to be fetched onto the other storage shelf or the other second material box until the fetching and placing of all the materials to be fetched are completed.

In the embodiment of the present application, when the material transfer component places the material to be fetched onto the pre-placed second material box of the storage shelf, the materials in the pre-placed second material box of the storage shelf will increase gradually with the increase of the fetching and placing number. If the quantity of all the materials to be fetched in the material fetching instruction exceeds the storage capacity of one pre-placed second material box of the storage shelf, the material transfer component may be instructed to replace the pre-placed second material box of the storage shelf. When determining whether the pre-placed second material box of the storage shelf is to be replaced, the total volume or total weight of the materials that are placed into the pre-placed second material box of the storage shelf may be determined by obtaining weight or volume of single material according to the SKU information and then combining with the number of fetching and placing. At the same time, the capacity threshold or the volume threshold of the pre-placed second material box of each storage shelf is set in advance. If the total volume of the materials which are placed into the pre-placed second material box of the storage shelf exceeds the preset volume threshold of the pre-placed second material box of the storage shelf, or the total weight of the materials which are placed into the pre-placed second material box of the storage shelf exceeds the preset weight threshold of the pre-placed second material box of the storage shelf, the material transfer component is instructed to place the materials to be fetched into other pre-placed second material box of the storage shelf until the fetching and placing operations of all the materials to be fetched are completed.

S68, receiving a material transport instruction, and transporting the material in the pre-placed second material box of the storage shelf to the delivery area corresponding to a material order according to the material transport instruction;

In this embodiment of the present application, the material to be fetched may be materials of the same order or materials of different orders. When an order attribute of the materials to be fetched is that the materials are in the same order, the processing terminal may send the material transport instruction to the handling robot. The material transport instruction is mainly used to instruct the handling robot to transport the material of the pre-placed container of the storage shelf preset container to the delivery area corresponding to the material order, and package it in the delivery area and then sending it to the receiving destination on the order.

S69, when the material of the pre-placed second material box of the storage shelf correspond to different orders, receiving a material sorting instruction, and sorting the material of the pre-placed second material box of the storage shelf according to the order corresponding to the material.

In the embodiment of the present application, when the material to be fetched corresponds to materials of different orders, the material that the material transfer component fetches out from the first material box is placed into the pre-placed second material box of same storage shelf. However, the material in the pre-placed material box of the storage shelf needs to be further sorted before it may be delivered. Therefore, in order to complete the delivery of the order material, the processing terminal needs to send a material sorting instruction to the handling robot so as to sort the materials of different orders in the pre-placed second material box of the storage shelf. During the sorting process, the material may be sorted according to the order information corresponding to the material.

In this embodiment of the present application, by receiving the material fetching instruction, the material transfer component is instructed to perform the fetching and placing operations on the materials according to the position information of material fetching contained in the material fetching instruction and the same SKU information of the material in the first material box in which the material to be fetched is located; at the same time, the image information of the materials to be fetched in the first material box is obtained by the material identification device, and the material transfer component is instructed to fetch out the materials to be fetched from the first material box, and place the fetched materials onto the corresponding storage shelf or into the second material box of the storage shelf. Since the materials to be fetched in the first material box have the same SKU information, there is no need to identify the materials during the material fetching process by the material transfer component, which facilitates the material transfer component to fetch the materials quickly and accurately, improves the efficiency of material fetching, and enhances the degree of automation of material sorting.

Figure 15:
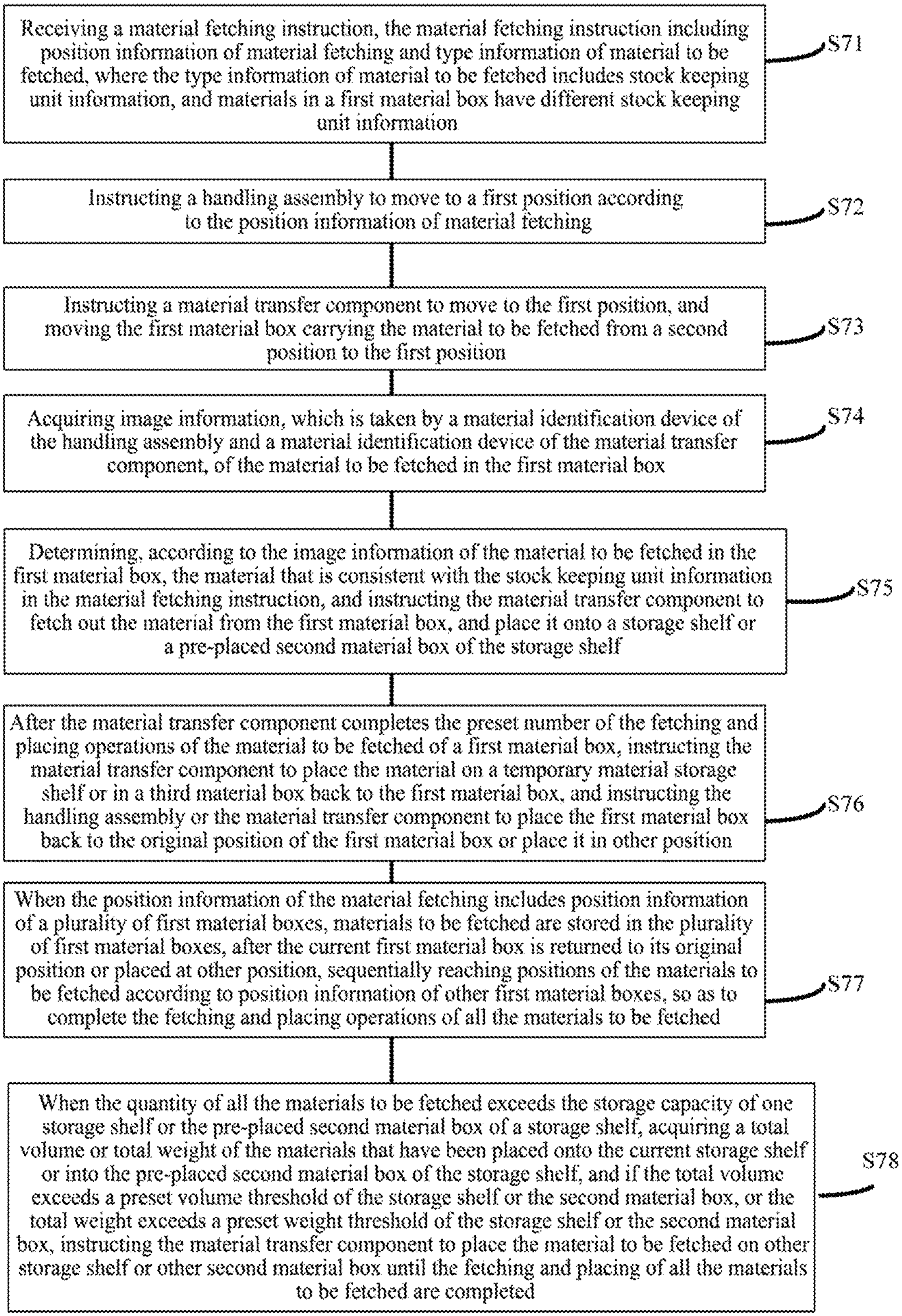
FIG. 15 is a flowchart of a material fetching method for materials having different inventory information in a first material box provided by an embodiment of the present application.

FIG. 15 is a flowchart of a fetching method of the materials with different inventory information in the first material box provided by an embodiment of the present application. As shown in FIG. 15, the material fetching method is applied to the above handling robots. The handling robot described in the following embodiment includes at least one material transfer component that is slidably connected to the vertical bracket of the handling robot, and the material identification device is installed to both the material transfer component and the handling assembly. At the same time, it includes multiple storage shelves, and the multiple storage shelves include an order material storage shelf and a temporary material storage shelf. The order material storage shelf is pre-placed with a second material box, and the temporary material storage shelf is pre-placed with a third material box, and the method includes:

S71, receiving a material fetching instruction, the material fetching instruction including the position information of material fetching and the type information of material to be fetched, where the type information of material to be fetched includes the stock keeping unit information, and materials in the first material box have different stock keeping unit information.

In this embodiment of the present application, the type information of material to be fetched includes stock keeping unit information. The materials in the first material box have different SKU information. The material transfer component enhances the identification on the SKU information during the material fetching process so as to decide the storage place of the fetched material, for example, whether to place it onto the order material storage shelf or into the second material box, or placing it onto the temporary material storage shelf or into the third material box. In the process of identifying the SKU information, the image information may be captured through the material identification device arranged on the material transfer component, and the image information may contain the SKU information of the material. By the comparison of the SKU information of the material to be fetched in the material fetching instruction with the SKU information in the image information captured by the material identification device, it is determined whether it is necessary to place the fetched material onto the order material storage shelf or into the second material box, or place onto the temporary material storage shelf or into the third material box.

S72, instructing the handling assembly to move to the first position according to the position information of material fetching.

In the embodiment of the present application, the position information of material fetching includes position of the first material box carrying the material to be fetched, for example, such as the three-dimensional information of position of the first material box. Before the handling assembly moves to the first position, the handling robot may move to the vicinity of the first material box for carrying the material to be fetched based on the position information of material fetching. Then according to the information located on the first material box, such as the code on the first material box, the accuracy of the position of the first material box is further verified through information of the code on the first material box; and also according to the information of the code on the first material box, such as information of two-dimensional code, the posture of the robot may be adjusted so that the handling assembly may be aligned with the first material box.

In the embodiment of the present application, the first position is usually at the same height as the first material box carrying the material to be fetched, and a horizontal distance between the first position and the first material box is within a telescopic range of the telescopic arm device of the handling assembly, so that the handling assembly may move the first material box to the first position by extending out from the telescopic arm device to.

S73, instructing the material transfer component to move to the first position, and moving the first material box carrying the material to be fetched from the second position to the first position.

In this embodiment of the present application, since the material transfer component is slidably connected to the vertical bracket, when it is necessary to utilize the material transfer component to move the first material box carrying the material to be fetched from the second position to the first position, it is necessary to instruct the material transfer component to move to the first position first. Of course, the handling assembly may also be used to move the first material box carrying the material to be fetched from the second position to the first position. Where the second position is a position at which the first material box is located, and this position is usually located on the shelf in the warehouse and may be determined by three-dimensional space coordinates.

S74, acquiring the image information, which is taken by the material identification device of the handling assembly and the material identification device of the material transfer component, of the material to be fetched in the first material box.

In this embodiment of the present application, since the material to be fetched has different SKU information from other materials in the material box, in order to avoid fetching a wrong material, the SKU information of the material may be used to determine whether the fetched material is the material to be fetched on the order and the SKU information of the fetched material may be captured by using the material identification device of the material transfer component. During the material fetching process of the material transfer component, position space information of the material to be fetched in the material box may be captured by a camera device on the handling assembly or by a camera device on the material transfer component, so as to avoid the material transfer component to be unable to grab the material.

In the embodiment of the present application, the image information captured by the material identification device may include the SKU information of the above material and the position space information of the material in the material box, as well as the shape of material to be fetched, the image feature point of material to be fetched, and the color information of a material to be fetched and/or volume information of a material to be fetched.

In the embodiment of the present application, the material identification device may also be installed separately to the installation platform, the handling assembly or the material transfer component, or may be installed to both the installation platform and the material transfer component at the same time. When the image information of the material is to be captured, it can be captured by using the material identification devices at different locations respectively. Where the image information captured by the material identification devices on the installation platform and the handling assembly may mainly include relevant information that is convenient for determining the material to be fetched, such as position space, shape, and volume of the material in the material box. The image information captured by the material identification device on the material transfer component may mainly include relevant information that is convenient for determining whether the fetched material is placed onto the order material storage shelf or the temporary material storage shelf, such as stock keeping unit. Of course, the image information captured by the material identification devices at different positions may also include any one or more of the above information.

S75, determining, according to the image information of the material to be fetched in the first material box, the material that is consistent with the stock keeping unit information in the material fetching instruction, and instructing the material transfer component to fetch out the material from the first material box, and place it onto the storage shelf or the pre-placed second material box of the storage shelf.

In this embodiment of the present application, the image information of the material to be fetched in the first material box, such as the SKU information in the image can be used to determine whether it is consistent with the SKU information in the material fetching instruction. When the two pieces of SKU information are consistent, the material transfer component is instructed to fetch out the material from the first material box and place it onto the order material storage shelf or into the second material box. When the two pieces of SKU information are inconsistent, the fetched material is placed onto the temporary material storage shelf or into the third material box. Where, the material transfer component moves between the corresponding positions of the order material storage shelf and the temporary material storage shelf along the vertical bracket.

In this embodiment of the present application, according to information of a position space of the material to be fetched in the material box in the image information captured by the material identification device, the material transfer component is instructed to fetch out the material from the position space, for example, the material may be sucked out by the sucker on the material transfer component or grabbed by the mechanical claw; after the material is fetched out, it is possible to determine whether the fetched material is the material to be fetched on the order according to the SKU information in the image information captured by the camera device, and if the fetched material is the material to be fetched on the order, the fetched material is placed onto the order material storage shelf or into the second material box, and if the fetched material is not the material to be fetched on the order, the fetched material is placed onto the temporary material storage shelf or into the third material box. Since the material transfer component is needed to place the fetched material into the order material container or the temporary storage material container, the material transfer component may move between corresponding positions of the order material storage shelf and the temporary material storage shelf along the vertical bracket. The order material storage shelf and the temporary material storage shelf may be located at different height positions on the same side of the vertical bracket.

S76, after the material transfer component completes the preset number of the fetching and placing operations of the material to be fetched of a first material box, instructing the material transfer component to place the material on the temporary material storage shelf or in the third material box back to the first material box, and instructing the handling assembly or the material transfer component to place the first material box back to the original position of the first material box or place it in other position.

In this embodiment of the present application, when the material transfer component completes the preset number of the fetching and placing operations of the materials to be fetched in the first material box, that is, when the first material box has no material to be fetched that is on the order and needs to be fetched out, the material transfer component is instructed to move to a corresponding height of the temporary material storage shelf. At the same time, the handling assembly is instructed to move the first material box to this position, so that the material transfer component may place the material on the temporary material storage shelf or in the third material box back to the first material box. When materials on the temporary material storage shelf or in the third material box are all placed back into the first material box, the handling assembly and the material transfer component are instructed to move to the first position, that is, a position at a height corresponding to the original position of the first material box, and the handling assembly or the material transfer component is instructed to return the first material box to the original position of the first material box or other position. As for the quantity of the material to be fetched that needs to be fetched out from the first material box, it may be determined by the information carried in the material fetching instruction. For example, the material fetching instruction may include information on different quantities of materials to be fetched of different orders.

S77, when the position information of the material fetching includes position information of a plurality of first material boxes, materials to be fetched are stored in the plurality of first material boxes, after the current first material box is returned to its original position or placed at other position, sequentially reaching positions of the materials to be fetched according to position information of other first material boxes, so as to complete the fetching and placing operations of all the materials to be fetched.

In the embodiment of the present application, when the materials to be fetched on an order cannot be accommodated by one material box, multiple material boxes are needed to carry the materials on the order. At this time, the position information of material fetching in the material fetching instruction may include the position information of the multiple first material boxes, and the materials to be fetched on the order may be carried in the first material boxes at the multiple positions. After the material transfer component completes the fetching and placing operations of the materials to be fetched in one first material box, the first material box may be returned to its original position, and then the handling robot may sequentially reach the position of the materials to fetched according to pending on the position information of other first material boxes, so as to complete the fetching and placing operations of all the materials to be fetched. During the material fetching process, since the material SKU information in the material box is not completely the same, the material transfer component needs to perform the above-mentioned relevant steps in this embodiment during the material fetching process of each first material box.

S78, when the quantity of all the materials to be fetched exceeds the storage capacity of one storage shelf or the pre-placed second material box of a storage shelf, acquiring a total volume or total weight of the materials that have been placed onto the current storage shelf or into the pre-placed second material box of the storage shelf, and if the total volume exceeds a preset volume threshold of the storage shelf or the second material box, or the total weight exceeds a preset weight threshold of the storage shelf or the second material box, instructing the material transfer component to place the material to be fetched on other storage shelf or other second material box until the fetching and placing of all the materials to be fetched are completed.

In the embodiment of the present application, when the material transfer component places the material to be fetched into the pre-placed second material box of the storage shelf, the materials in the pre-placed second material box of the storage shelf will increase gradually with the increase of the fetching-and-placing number. If the quantity of the materials placed in the pre-placed second material box of the storage shelf exceeds the storage capacity of one pre-placed second material box of the storage shelf, the material transfer component may be instructed to replace the second material box of the storage shelf. When determining whether the pre-placed second material box of the storage shelf is to be replaced, the total volume or total weight of the materials that are placed into the pre-placed second material box of the storage shelf may be determined by obtaining weight or volume of single material according to the SKU information and then combining with the number of fetching and placing. At the same time, the capacity threshold or the volume threshold of the pre-placed second material box of each storage shelf is set in advance. If the total volume of the materials which are placed into the pre-placed second material box of the storage shelf exceeds the preset volume threshold of the pre-placed second material box of the storage shelf, or the total weight of the materials which are placed into the pre-placed second material box of the storage shelf exceeds the preset weight threshold of the pre-placed second material box of the storage shelf, the material transfer component is instructed to place the materials to be fetched into other pre-placed second material box of the storage shelf until the fetching and placing operations of all the materials to be fetched are completed.

In this embodiment of the present application, by receiving the material fetching instruction, and according to the position information of material fetching contained in the material fetching instruction and different SKU information of materials in the first material box, the material transfer component is instructed to perform the fetching and placing operations on the materials, and at the same time, the image information of the materials to be fetched is obtained by the material identification device and the material storage location is determined according to the image information. This effectively solves problem in fetching of materials with different SKU information in the material box, facilitates the material transfer component to fetch material quickly and accurately, improves the efficiency of material fetching, and enhances the degree of automation of material sorting.

Figure 16:
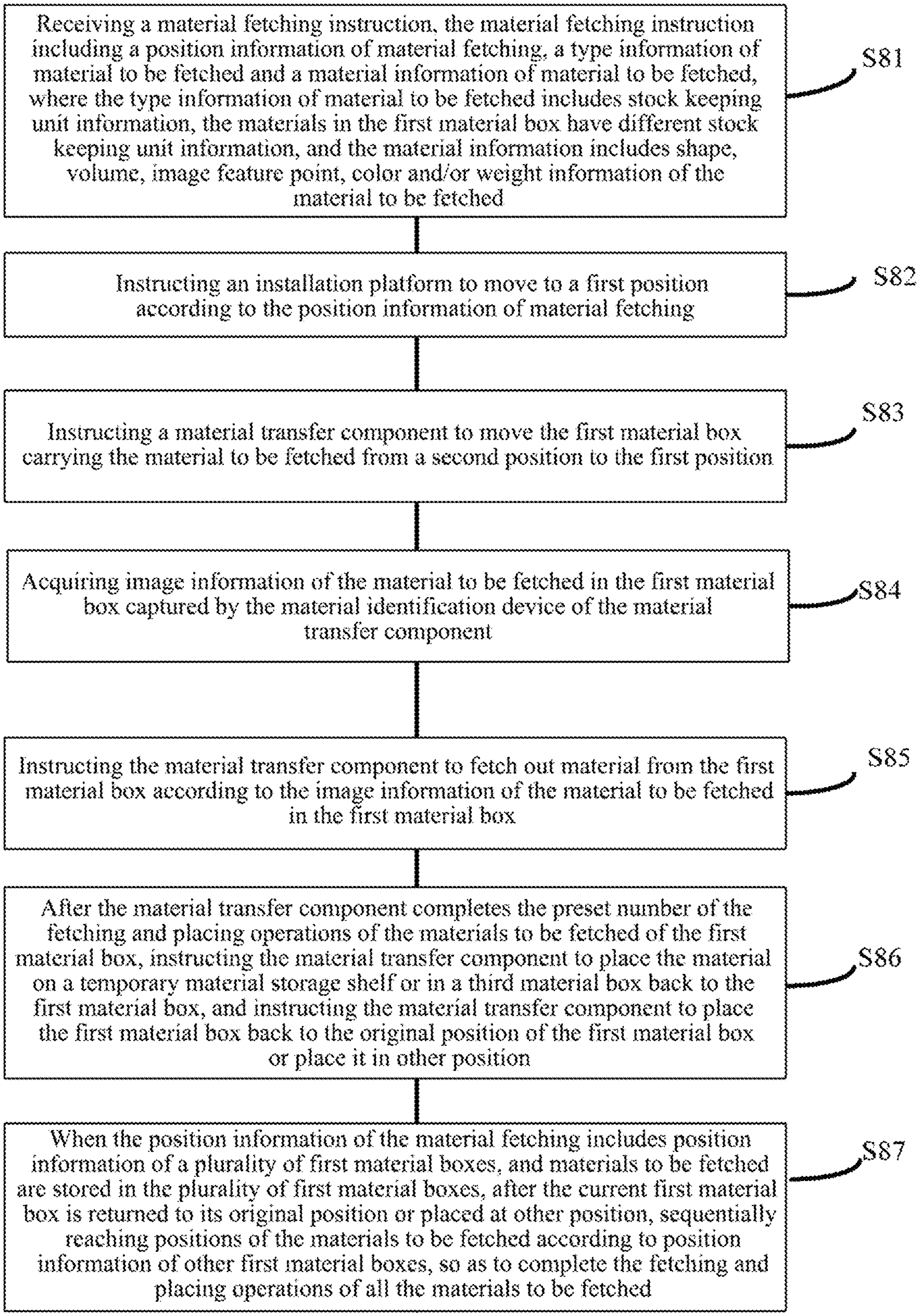
FIG. 16 is a schematic flowchart of a material fetching method provided by another embodiment of the present application.

FIG. 16 is a flowchart of a material fetching method provided by another embodiment of the present application. As shown in FIG. 16, the material fetching method is applied to the handling robots described above, and the handling robot described in the following embodiment includes at least one material transfer component, which is fixed to the installation platform and equipped with the material identification device. At the same time, it includes multiple storage shelves, and the multiple storage shelves include the order material storage shelf and the temporary material storage shelf. The order material storage shelf is pre-placed with a second material box, and the temporary material storage shelf is pre-placed with a third material box. The method includes:

S81, receiving a material fetching instruction, the material fetching instruction including the position information of material fetching, the type information of material to be fetched and the material information of material to be fetched, where the type information of material to be fetched includes stock keeping unit information, the materials in the first material box have different stock keeping unit information, and the material information includes shape, volume, image feature point, color and/or weight information of the material to be fetched.

In this embodiment of the present application, the type information of material to be fetched includes stock keeping unit information. The materials in the first material box have different SKU information. The material transfer component may increase the identification of the material information during the material fetching process so as to determine the material to be fetched. For example, it is possible to capture image information through the material identification device on the material transfer component, where the image information may include information related to the material information, such as actual shape, volume, image feature point, color and/or weight information of the material. By comparing the material information in the material fetching instruction with the material information captured by the material identification device, the material to be fetched that needs to be fetched out is determined. At the same time, the image information may further include the SKU information of the material. By comparing the SKU information of the material to be fetched in the material fetching instruction with the SKU information of the material in the image information captured by the material identification device, whether to fetch out the material is determined. After the material is fetched out, it is also possible to determine whether the fetched material is placed onto the order material storage shelf or into the second material box, or placed onto the temporary material storage shelf or into the third material box, through the image information captured by the material identification device provided on the material transfer component, such as the SKU information. In addition, in the process of fetching the material, it is possible to grab the material to be fetched according to the image information of the material to be fetched in the first material box captured by the material identification device, where the image information may include the position space information of the material to be fetched in the first material box, and/or image feature points, color, shape, volume, etc. of the material to be fetched, such as the volume information or color information of the material to be fetched.

S82, instructing the installation platform to move to the first position according to the position information of material fetching.

In the embodiment of the present application, the position information of material fetching includes the position of the first material box carrying the material to be fetched, for example, the three-dimensional information of position of the first material box. Before the installation platform moves to the first position, the handling robot may move to the vicinity of the first material box that carries the material to be fetched based on the position information of material fetching. Then according to the information located on the first material box, such as the code on the first material box, the accuracy of the position of the first material box is further verified through information of the code on the first material box; and also according to information of the code on the first material box, such as information of two-dimensional code, the posture of the robot may be adjusted so that the handling assembly may be aligned with the first material box.

In the embodiment of the present application, the first position is usually at the same height as the first material box carrying the material to be fetched, and the horizontal distance between the first position and the first material box is within the material fetching range of the material transfer component, so that the material transfer component may move the material box to the first position.

S83, instructing the material transfer component to move the first material box carrying the material to be fetched from the second position to the first position;

In the embodiment of the present application, since the installation platform is not able to grab the material box and the material transfer component is installed to the installation platform, it is possible to instruct the material transfer component to move the first material box carrying the material to be fetched from the second position to the first position. Where, the second position is the position at which the first material box is located, and this position is usually located on the shelf in the warehouse and may be determined by three-dimensional space coordinates.

S84, acquiring the image information of the material to be fetched in the first material box captured by the material identification device of the material transfer component.

In this embodiment of the present application, since the material to be fetched has different SKU information or different material information from other material in the first material box, such as different volume, color or weight information. Therefore, in order to avoid fetching a wrong material, it is possible to determine whether the fetched material is the material to be fetched on the order through the material information of the material, and it is possible to capture the material information of the fetched material through the material identification device on the material transfer component. During the material fetching process of the material transfer component, it is possible to capture the position space information of the material to be fetched in the material box by the material identification device on the material transfer component or by the camera device on the installation platform, so as to prevent the material transfer component from being unable to grab the material.

In the embodiment of the present application, the image information captured by the material identification device may include the material information and the SKU information of the above material and the position space information of the material in the material box, and the material information may include the shape of material to be fetched, the image feature point of material to be fetched, and the color information of a material to be fetched and/or volume information of a material to be fetched.

In the embodiment of the present application, the material identification device may also be installed separately to the installation platform, or may be installed to both the installation platform and the material transfer component. When the image information of the material is to be captured, it can be captured by the material identification devices at different locations are respectively. Where the image information captured by the material identification device on the installation platform may mainly include relevant information that is convenient for determining the material to be fetched, such as position space, shape, and volume of the material in the material box. The image information captured by the material identification device on the material transfer component may mainly include relevant information that is convenient for determining whether the fetched material is placed onto the order material storage shelf or the temporary material storage shelf, such as stock keeping unit. Of course, the image information captured by the material identification devices at different locations may also include any one or more of the above information.

S85, instructing the material transfer component to fetch out material from the first material box according to the image information of the material to be fetched in the first material box.

In the embodiment of the present application, when a material is consistent with the stock keeping unit information and/or the material information in the material fetching instruction cannot be determined through the image information, the material transfer component is instructed to fetch a material from the first material box and the image information of the obtained material is continuously captured. When it is determined through the image information that the material obtained by the material transfer component is inconsistent with the stock keeping unit information and/or the material information in the material fetching instruction, then the material obtained by the material transfer component is placed onto the temporary material storage shelf or into the third material box pre-placed on the temporary material storage shelf, and otherwise, it is placed onto the corresponding order material storage shelf or into the second material box.

In this embodiment of the present application, according to the position space information, which is obtained based on the image information of the material to be fetched in the first material box captured by the material identification device, of the material to be fetched in the first material box, the material transfer component is instructed to fetch out the material from the position space. Or, according to the material information in the image information of the material to be fetched captured by the material identification device, such as the volume or color of the material to be fetched, the material may be sucked out by the sucker on the material transfer component or grabbed by the mechanical claw. After the material is fetched out, whether the fetched material is the material to be fetched on the order may be determined according to the comparison of the SKU information in the image information, which is captured by the material identification component, of the material to be fetched with the SKU information in the material fetching instruction. If the fetched material is the material to be fetched on the order, the fetched material is placed onto a corresponding order material storage shelf or into a second material box; and if the fetched material is not the material to be fetched on the order, the fetched material is placed onto a corresponding temporary storage shelf or into a third material box. Where the order material storage shelf and the temporary material storage shelf may be located at different heights on the same side of the vertical bracket.

S86, after the material transfer component completes the preset number of the fetching and placing operations of the materials to be fetched of the first material box, instructing the material transfer component to place the material on the temporary material storage shelf or in the third material box back to the first material box, and instructing the material transfer component to place the first material box back to the original position of the first material box or place it in other position.

In this embodiment of the present application, when the material transfer component completes the preset number of the fetching and placing operations for the materials to be fetched in the first material box, that is, when the first material box has no material to be fetched that is on the order and needs to be fetched, the material transfer component is instructed to move to a corresponding height of the temporary material storage shelf. At the same time, the installation platform is instructed to move the first material box to this position, so that the material transfer component may place the material on the temporary material storage shelf or in the third material box back to the first material box. After materials on the temporary material storage shelf or in the third material box are all placed back into the first material box, the installation platform and the material transfer component are instructed to move to the first position, that is, a position at a height corresponding to the original position of the first material box, and the material transfer component is instructed to return the first material box to the original position of the first material box or place it in other position. As for the quantity of the material to be fetched which needs to be fetched out from the first material box, it may be determined by the information carried in the material fetching instruction. For example, the material fetching instruction may include the information of different quantities of materials to be fetched for different orders.

S87, when the position information of the material fetching includes position information of a plurality of first material boxes, and materials to be fetched are stored in the plurality of first material boxes, after the current first material box is returned to its original position or placed at other position, sequentially reaching positions of the materials to be fetched according to position information of other first material boxes, so as to complete the fetching and placing operations of all the materials to be fetched.

In the embodiment of the present application, when the materials to be fetched on an order cannot be accommodated by one material box, multiple material boxes are needed to carry the materials on the order. At this time, the position information of material fetching in the material fetching instruction may include the position information of the multiple first material boxes, and the materials to be fetched on the order may be carried in the first material boxes at the multiple positions. After the material transfer component completes the fetching and placing operations of the material to be fetched in one first material box, the first material box may be returned to its original position, and then the handling robot may sequentially reach the positions to the materials to fetched according to the position information of other first material boxes, so as to complete the fetching and placing operations of all the materials to be fetched. During the material fetching process, since the SKU information in the material box is not completely the same, the material transfer component needs to perform the above-mentioned relevant steps in this embodiment during the material fetching process of each first material box.

In this embodiment of the present application, by receiving the material fetching instruction, and according to the position information of material fetching contained in the material fetching instruction and different SKU information and material information of the materials in the material box in which the materials to be fetched is located, the material transfer component is instructed to perform the fetching and placing operations on the materials, and at the same time, the material information and the SKU information of the fetched material is obtained by the material identification device and the material storage position is determined according to the material information and the SKU information. This effectively solves problem in fetching of materials with different material information, facilitates the material transfer component to fetch material quickly and accurately, improves the efficiency of material fetching, and enhances the degree of automation of material sorting.

It should be noted that for various steps in the above method embodiment, as long as those of ordinary skill in the art can understand the technical solutions formed by different combinations thereof, and as long as they fall within the protection scope of the present application, they can constitute the embodiments of the present application.

An embodiment of the present application also provides a material fetching method, which is applied to a processing terminal that is communicatively connected with a handling robot, where the method includes: sending a material fetching instruction, so that the handling robot executes the material fetching method as described above according to the material fetching instruction.

Figure 17:
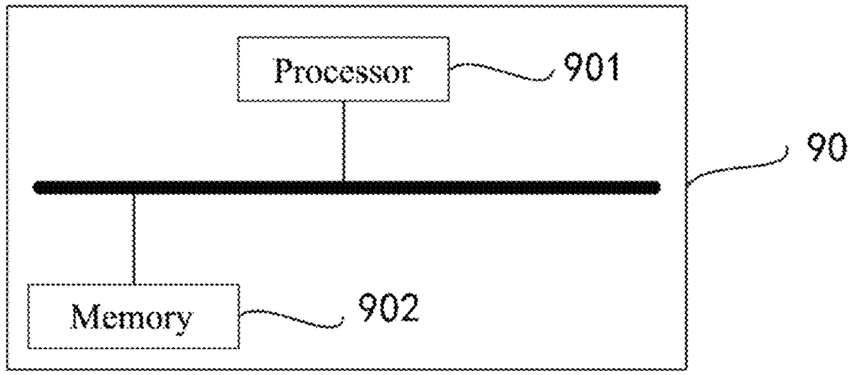
FIG. 17 is a structural block diagram of a handling robot provided by an embodiment of the present application.

FIG. 17 is a structural block diagram of a handling robot provided by an embodiment of the present application. The handling robot 90 may be a robot with processing capability and can execute the material fetching method provided by the corresponding method embodiment described above.

Specifically, referring to FIG. 17, the handling robot 90 includes:

One or more processors 901 and a memory 902 communicatively connected with at least one processor 901. One processor 901 is taken as an example in FIG. 17.

The processor 901 and the memory 902 may be connected by a bus or in other ways. In FIG. 17, the connection by a bus is taken as an example.

As a non-transitory computer-readable storage medium, the memory 902 may be configured to store a non-transitory software program and a non-transitory computer-executable program. The corresponding programs may execute the corresponding steps of the material fetching method (for example, S51 and S53 as shown in FIG. 13; S61-S69 as shown in FIG. 14; S71-S78 as shown in FIG. 15; and S81-S87 as shown in FIG. 16). The processor 901 executes the material fetching method by running the non-transitory software program or instructions stored in the memory 902, that is, implements the material fetching method described in the corresponding method embodiment above.

The memory 902 may include a program storage area and a data storage area, where the program storage area may store an operating system and an application program required by at least one function; and the data storage area may store such as data created for executing the aforementioned material fetching method. In addition, the memory 902 may include a high-speed random access memory, and may also include a non-transitory memory, such as at least one magnetic disk storage device, a flash memory device or other non-transitory solid-state storage devices. In some embodiments, the memory 902 may optionally include memories remotely provided with respect to the processor 901, and these remote memories may be connected to the handling robot 90 through a network. Examples of the aforementioned network include, but are not limited to, Internet, intranet, local area network, mobile communication network, and a combination thereof.

The memory 902 are stored with one or more modules that, when executed by one or more processors 901, execute the material fetching method in the above-mentioned corresponding method embodiment, for example, execute the above-described S51 and S53 as shown in 13, S61-S69 as shown in FIG. 14, S71-S78 as shown in FIG. 15, and S81-S87 as shown in FIG. 16.

The handling robot may execute the material fetching method in the above corresponding method embodiment, and has corresponding devices and beneficial effects for executing the method.

The embodiment of the present application also provides a non-transitory computer-readable storage medium, the non-transitory computer-readable storage medium stores computer-executable instructions, which enable a computer to execute the material fetching method in the above-mentioned method embodiments. For example, the computer-executable instructions are executed by one or more processors, such as one processor 901 shown in FIG. 17, so that the one or more processors may execute the material fetching method in the corresponding method embodiments as described above, for example, executing the above-described S51 and S53 as shown in FIG. 13, S61-S69 as shown in FIG. 14, S71-S78 as shown in FIG. 15 and S81-S87 as shown in FIG. 16, so as to make the above one or more processors to execute the material fetching methods in the above corresponding method embodiments.

The embodiment of the present application also provides a computer program product, the computer program product includes a computer program stored on a non-transitory computer-readable storage medium, and the computer program includes program instructions that, when executed by a computer, enables the computer to execute the material fetching method in the foregoing method embodiments, for example, executing functions such as S51 and S53 as shown in FIG. 13, S61-S69 as shown in FIG. 14, S71-S78 as shown in FIG. 15, and S81-S87 as shown in FIG. 16 as described above.

An embodiment of the present application also provides a processing terminal. The processing terminal may be any type of electronic device. For example, it can be a background server, a computer device with processing capabilities, or a terminal device with computing or scheduling functions, and can execute the material fetching methods provided in the above corresponding method embodiments.

The embodiment of the present application also provides an intelligent warehousing system, including the handling robot and the processing terminal, as described above.

In order to solve the technical problem in the third prior art, the present application provides the following technical solution:

Material replenishment or return refers to a process of transporting a replenishment or return material to a warehouse shelf through a handling robot. In the process of material replenishment or return, the fetching-and-placing efficiency of material is critical to the efficiency of material replenishment or return. The final efficiency of material replenishment or return may be affected by many aspects, such as the way of issuing material replenishment or return instruction, the method of assigning material replenishment or return task to the robot, the way of fetching and placing material of robot, etc. The optimization of the steps involved in the process of fetching and placing material by the robot may all have a beneficial effect on the improvement of the efficiency of material replenishment or return. For convenience of expression, in the description process of the present application, the replenishment or return material on the storage shelf of a handling robot is taken as an example of the target material corresponding to material replenishment or return, but this does not limit other material replenishment or return targets.

In the process of intelligent material fetching and placing, the same material may usually be stored in the same container, such as a material box or a storage shelf Each material box for storing material is placed in a specific position of the warehouse according to a specific storage rule, and the position of the material box or the material of the material in the material box is marked by external features of the material box (such as two-dimensional code, barcode or other identifier).

Continuing to refer to FIG. 9, the application environment includes an intelligent warehousing system composed of a processing terminal 10 and a robot 20, and a warehouse 30 using the intelligent warehousing system and storing different materials, where the warehouse 30 may include a shelf for storing a material box.

The processing terminal 10 may be any type of electronic computing platform or device and is used as a control core of the entire intelligent warehousing system. According to an actual situation, it may have corresponding storage space or computing capabilities to provide one or more application services or functions, such as issuing a material replenishment or return task or controlling the handling robot to perform a material replenishment or return task.

Continuing to refer to FIG. 10*a*, the processing terminal 10 may include: a processor 110 and a memory 120.

A communication connection is established between the processor 110 and the memory 120 through a bus.

The processor 110 may be of any type, and have one or more processing cores. It may perform single-threaded or multi-threaded operations and is configured to parse instructions to perform operations such as obtaining data, performing logical operation functions, and issuing operation processing results.

The memory 120 is a non-volatile computer-readable storage medium, such as at least one magnetic disk storage device, a flash memory device, a distributed storage device remotely provided with respect to the processor 110, or other non-volatile solid-state storage devices.

The memory 120 may have a program storage area for storing non-volatile computer-executable program instructions (in other embodiments, it may also be referred to as "non-volatile software program") that can be called by the processor 110 so that the processor 110 can execute one or more method steps, for example, one or more steps in the material replenishing or returning method provided in the embodiment of the present application. The memory 120 may also have a data storage area for storing the operation processing result issued and outputted by the processor 110.

In order to realize the communication connection between the processing terminal 10 and the robot 20, the processing terminal may further include a communication module 130 and establish a communication connection with a device such as the robot through the communication module 130. The communication connection may be a wired connection or a wireless connection.

The robot 20 is an automated device with a walking mechanism that may move in a warehouse and carry a material box for operations of fetching and placing material, such as a handling robot, an AGV, and the like. The walking mechanism may adopt any suitable type of power system, for example, it may be driven by electric power.

The robot 20 has one or more functional indicators, including but not limited to material loading capacity (that is, the maximum number of material boxes that may be loaded at a time), cruising range, guide method, material box fetching and releasing speed, and operating speed, etc.

Warehouse 30 is an area for storing a material box. In order to facilitate management, the warehouse 30 may be provided with multiple shelves, and multiple identical or different material boxes are placed on each shelf according to a specific placement rule.

As shown in FIG. 9, these shelves are divided at intervals to form a plurality of aisles for the robot 20 to enter. The robot 20 enters the aisles and then fetches out a specific material box or places it back (such as material box 1, material box 2, material box 3, etc.). The robot may enter and exit from the aisles from both ends of the aisles. Here, openings located at the both ends of the aisles are referred to as "aisle openings", which may be used as exits of the robot 20 or entrances of the robot 20.

In some embodiments, directions between some aisles are the same, and the aisle openings between them are opposite so that the robot 20 may directly pass through, such as aisle 1 and aisle 2 shown in FIG. 9. Here, such two aisles are called "adjacent aisles". That is, when the robot 20 walks from the aisle 1 to its adjacent aisle, i.e., aisle 2, or from the aisle 2 to its adjacent aisle, i.e., aisle 1, it may enter directly without turning.

The material stored in the material box in the warehouse 30 is managed by using the stock keeping unit (SKU) as a unit. The stock keeping unit is a basic unit for inventory incoming and outgoing measurement or for control and storage, and may be in unit of piece, tray, or box (depending on specific material). The same material may belong to different SKUs due to differences in production date, size, color, and so on.

In the embodiment of the present application, the processing terminal 10 needs to assign a suitable material replenishment or return task to each robot 20 so that it may move in the warehouse and carry the material box corresponding to the replenishment or return material.

Continuing to refer to FIG. 10*b*, the handling robot 20 is configured for material replenishment or return.

The handling robot 20 includes a mobile component 210, a pallet 220, a material box handling component 230, a material transfer component 240, a material box identification component 250, a material identification component 260 and a storage shelf 270. Where the mobile component 210 supports the pallet 220, the material box handling component 230, the material transfer component 240, the material box identification component 250, the material identification component 260 and the storage shelf 270.

The mobile component 210 is configured to move on the floor of the warehouse so as to drive the pallet 220, the material box handling component 230, the material transfer component 240, the material box identification component 250, the material identification component 260 and the storage shelf 270, which are supported thereby, to move together to approach the warehouse shelf.

The pallet 220 and the storage shelf 270 are each configured to store a material box. The material box identification component 250 is configured to identify a material space where the material box is located after the mobile component 210 approaches the warehouse shelf. The material box handling component 230 is configured to fetch out the material box from the material space identified by the material box identification component 250 and store it onto the pallet 220, or to fetch out the material box from the pallet 220 and store it onto the warehouse shelf or the storage shelf 270. The material identification component 260 is configured to identify the material in the material box stored on the storage shelf 270 or the pallet 220. The material transfer component 240 is configured to fetch out the material identified by the material identification component 260 from the material box stored on the storage shelf 270 or the pallet 220.

By configuring the mobile component 210, the material box handling component 230 may store and fetch a material box on a warehouse shelf far away it. In some other embodiments, the warehouse shelf is kept near the material box handling component 230. For example, the handling robot 20 is fixedly installed to the floor near the warehouse shelf. In this case, the mobile component 210 may be omitted.

By configuring the storage shelf 270, the handling robot may store a large amount of replenishment or return material onto the storage shelf 270. In some other embodiments, a few materials need to be replenished or returned by the handling robot, and thus there is no need to configure the storage shelf 270. In this case, the storage shelf 270 may be omitted, and the material box that needs to perform material replenishment or return may be directly placed onto the pallet 220, and the whole box of the replenishment or return material may be placed in a free position of a fixed shelf for placing a material box.

By configuring the material transfer component 240, after the material box handling component 230 fetches out the material box from the warehouse shelf and the material transfer component 240 places the replenishment or return material into the material box, the material box handling component 230 stores the material box onto the warehouse shelf again, so that the handling robot 20 can complete material replenishment or return, without the need for staff to fetch the material out of the material box, which improves the efficiency of material dispatching. In some other embodiments, when the material is not identified, the material transfer component 240 may also fetch out the material stored in the material box of the storage shelf 270. In this case, the material identification component 260 may be omitted. For example, if materials stored in the material box of storage shelf 270 are all the same kind of material and the materials in the material box have a relatively large area, for example clothes that are spread flat in the material box, then there is basically no any obstacles for the material transfer component 240 to fetch out such kind of material, and the material transfer component 240 may randomly fetch out one of the materials in the material box of the storage shelf 270, to complete material replenishment or return.

In some other embodiments, when the material box is not identified, the material box handling component 230 may also fetch out the material box from the warehouse shelf. In this case, the material box identification component 250 may be omitted, for example, when the warehouse shelf has only one material space for storing the material box.

It is worth noting that after the material box handling component 230 fetches out the material box from the material space and stores it onto the pallet 220, by configuring the material transfer component 240, the material transfer component 240 may fetch out the material stored in the material box of the storage shelf 270 to perform material replenishment or return, without the need for staff to fetch out the material from the material box, which improves the efficiency of fetching out the material.

Some specific implementations of the handling robot 100 are introduced below. It should be noted that the following implementations are only exemplary, and other handling robots that can meet at least one of the above conditions are all within the protection scope of the present application.

Referring to FIG. 10*c*, the mobile component 210 includes a chassis 212, a driven wheel 214, a driving wheel 216, and a guiding device 218. The chassis 212 is formed by welding profiles and plates, is relatively flat as a whole and symmetrical with respect to a vertical symmetrical plane. The interior of chassis 212 is internally equipped with a circuit module for controlling the operation of the mobile component 210. Four driven wheels 214 are installed at the bottom of the chassis 212 and are evenly and symmetrically distributed at both ends of the chassis 212 to jointly support the chassis 212. In this embodiment, the driven wheels 214 are universal wheels. According to an actual situation, the driven wheels 214 may also have other wheel structures with a steering function. Two driving wheels 216 are installed at the bottom of the chassis 212 and are symmetrically distributed at the both ends of the chassis 212. The two driving wheels 216 are respectively driven by two motors. Therefore, rotation speeds of the two driving wheels 216 may be different and thus realize the steering of the mobile component 210. When the two driving wheels 216 have the same rotation speed, the mobile component 210 travels in a straight line. The guiding device 218 is installed at the bottom of the chassis 212 and is configured to guide the mobile component 210 to travel along a preset path. In this embodiment, the guiding device 218 is a camera with a lens facing the ground, and a large number of two-dimensional codes are posted on the ground of the warehouse. Scanning a two-dimensional code by the camera may determine a current position of the mobile component 210, and then in combination with a previous scanned two-dimensional code, an orientation of the mobile component 210 may be determined. According to an actual situation, the two-dimensional codes may also be replaced with barcodes and other identification codes.

Referring to FIG. 10*b* again, the mobile component 210 is equipped with a vertical bracket 219 at the top thereof. As described above, the pallet 220, the material box handling component 230, the material transfer component 240, the material box identification component 250 and the material identification component 260 are all supported by the vertical bracket 219. The vertical bracket 219 includes an upright post 2190 and a cross beam 2192. Two upright posts 2190 are both vertical and symmetrical, and each upright post 2190 is provided with a guideway extending in the vertical direction. Guideways of the two upright posts 2190 are jointly used to install the material box handling component 230 and guide the material box handling component 230 to move in the vertical direction.

The multiple cross beams 2192 are all horizontally distributed in the vertical direction, and the multiple cross beams 2192 are jointly supported by the two upright posts 2190.

Referring to FIG. 10*d* and FIG. 10*f* together, the pallet 220 is a horizontally arranged plate and is fixedly installed to the material box handling component 230.

The material box stored on the storage shelf 270 may be stored by the material box handling component 230 or stored by a staff. In addition, the material box stored on the storage shelf 270 may be empty. In some other embodiments, the material transfer component 240 directly places the replenishment or return material onto the storage shelf 270 without need to pre-store the material box on the storage shelf 270.

The storage shelf 270 is fixedly installed at one side of the vertical bracket 219. The storage shelf 270 includes a layered plate 2701. Multiple layered plates 2701 are distributed in the vertical direction. Each layered plate 2701 is configured to store a material box, and is supported by a corresponding cross beam 192. By configuring multiple layered plates 2701 for storing material boxes, after the material transfer component 240 fetches out the material in the material box stored on one layered plate 2701, the material transfer component 240 may continue to fetch out material from the material box stored on another layered plate 2701. It may be understood that, according to an actual situation, there may be only one layered plate 2701, for example, in the case where there is a few materials or the material is small relative to the material box.

Referring to FIGS. 10*e* and 10*f*, the material box handling component 230 includes a lift driving device 232, an installation base 234, a rotation driving device 236, and a handling assembly 238.

The installation base 234 is movably installed to the vertical bracket 219 and may move in the vertical direction relative to the vertical bracket 219. The lift driving device 232 is configured to drive the handling assembly 238 to move in the vertical direction relative to the vertical bracket 219. The handling assembly 238 is movably installed to the installation base 234 and may be rotated around a vertical direction relative to the installation base 234. The rotation driving device 236 is configured to drive the handling assembly 238 to rotate around a vertical direction relative to the installation base 234. The handling assembly 238 is configured to fetch out the material box from a layered plate 2701 or the material space of the warehouse shelf at specified height and angle and store it onto the pallet 220, or to fetch out the material box from the pallet 220 and store it onto a layered plate 2701 or into the material space of the warehouse shelf at specified height and angle.

The material box handling component 230 fetches out the material box stored on the warehouse shelf or the storage shelf and stores it onto the pallet, which is specifically as follows:

The lift driving device 232 drives the handling assembly 238 to move in the vertical direction so that the handling assembly 238 is at the same height as the material box stored on the warehouse shelf or the layered plate. Meantime, the rotation driving device 236 drives the handling assembly 238 to rotate around the vertical direction so that the handling assembly 238 is aligned with the material box stored on the warehouse shelf or the layered plate. After lifting and rotating of the handling assembly 238 are completed, the handling assembly 238 fetches out the material box stored on the warehouse shelf or the layered plate 2701 and stores it onto the pallet 220.

The material box handling component 230 fetches out the material box stored on the pallet and stores it onto the warehouse shelf or the storage shelf, which is specifically as follows:

The lift driving device 232 drives the handling assembly 238 to move in the vertical direction, so that the handling assembly 238 is at the same height as the empty space of the warehouse shelf or the layered plate. Meantime, the rotation driving device 236 drives the handling assembly 238 to rotate around the vertical direction so that the handling assembly 238 is aligned with the empty space of the warehouse shelf or the layered plate. After lifting and rotating of the handling assembly 238 are completed, the handling assembly 238 fetches out the material box stored on the pallet 220 and stores it onto the warehouse shelf or the storage shelf 270.

By configuring the lift driving device 232, that the lift driving device 232 drives the handling assembly 238 supported by the installation base 234 to move in the vertical direction, so that the handling assembly 238 may store and fetch the material box from the layered plate 2701 or the warehouse shelf at different heights. Therefore, the warehouse shelf may be configured as having multiple layers, thereby improving the utilization rate of the warehouse shelf in the vertical space. Furthermore, the storage shelf 270 may be configured as having multiple layers, which improves the utilization rate of the storage shelf 270 in the vertical space while realizing that the storage shelf 270 may store multiple material boxes. In some other embodiments, the lift driving device 232 may be omitted, such as, in the case where the storage shelf 270 and the warehouse shelf have only one layer as described above.

By configuring the rotation driving device 236, the rotation driving device 236 drives the handling assembly 238 to rotate around the vertical direction, so that the handling assembly 238 may store and fetch the material box from the warehouse shelves at different directions. The material fetching mode of the handling assembly 238 is more flexible and facilitates to store and fetch the material box in a complex warehouse environment. In some other embodiments, the rotation driving device 236 may be omitted, for example, when the empty space of the warehouse shelf or the material box stored on the warehouse shelf is always in the material fetching direction of the handling assembly 238. For example, a dedicated track of the mobile component 210 is arranged on the ground of the warehouse, and after the mobile component 210 approaches the warehouse shelf, the empty space of the warehouse shelf or the material box stored on the warehouse shelf is located in the material fetching direction of the handling assembly 238, and since the layered plate 2701 is part of the handling robot 100, the layered plate 2701 just needs to be configured to be in the material fetching direction of the handling assembly 238.

Some specific implementations of the material box handling component 230 will be introduced below. It should be noted that the following implementations are only exemplary, and other material box handling components that can meet at least one of the above situations are all within the protection scope of the present application.

The installation base 234 and the storage shelf 270 are respectively located at two opposite sides of the vertical bracket 219. The installation base 234 is formed by welding profiles and plates, and the installation base 234 is provided with two sliding members. Each sliding member is installed in a corresponding sliding chute and may move along the sliding chute.

The lift driving device 232 includes two sets of first sprocket mechanisms, a transmission shaft and a lift driving motor. Each set of first sprocket mechanism is installed to a corresponding upright post, two ends of the transmission shaft are fixed coaxially with driving wheels of the two sets of first sprocket mechanisms, respectively, and the installation base is fixedly connected with link chains of the two sets of first sprocket mechanisms, respectively. The lift driving motor is configured to drive a driving shaft to rotate, so as to drive the two sets of sprockets to move synchronously, and thus drive the installation base to move in the vertical direction.

It can be understood that, according to an actual situation, the first sprocket mechanism may also be replaced with a belt pulley mechanism, a gear rack transmission mechanism, and the like.

The rotation driving device 236 includes a second sprocket mechanism and a rotation driving motor. The driving wheel of the second sprocket mechanism is rotatably installed to the handling assembly 238, the transmission wheel of the second sprocket mechanism is fixedly installed to the installation base 234, and the rotation driving motor is configured to drive the driving wheel to rotate, and thus drive the handling assembly 238 to rotate around a vertical direction.

It can be understood that, according to an actual situation, the second sprocket mechanism may also be replaced with a belt pulley mechanism, a gear set, and the like.

The handling assembly 238 includes an installation platform 2380 and a telescopic arm device 2382, and the telescopic arm device 2382 is installed to the installation platform 2380. The installation platform 2380 may be installed at the top of the installation base 234 through slewing bearing, so that the entire handling assembly 238 may rotate relative to the installation base 234 around a vertical direction. The pallet 220 is fixedly installed to the installation platform 2380, and the telescopic arm device 2382 is configured to push the material box stored on the pallet 220 to the empty space of the layered plate 2701 or the warehouse shelf, or to pull the material box stored on the layered plate 2701 or the warehouse shelf onto the pallet 220. In some other embodiments, the telescopic arm device 2382 moves a material box by lifting or gripping.

The two sets of telescopic arm devices 2382 are symmetrically arranged at both sides of the pallet 220, and the two sets of telescopic arm devices 2382 work jointly to push or pull a material. According to an actual situation, there may be only one telescopic arm device 2382.

Each set of telescopic arm device 2382 includes a telescopic arm 23820, an immobile pusher 23822 and a mobile pusher 23824. One end of the telescopic arm 23820 is fixedly installed to the installation platform 2380, and the other end may be extended out or retracted horizontally relative to the installation platform 2380. The telescopic arm 2382 includes an inner section arm, a middle section arm and an outer section arm. The outer section arm is fixedly installed to the installation platform 2380 and located at one side of the pallet 220. The middle section arm is movably installed at a side of the outer section arm close to the pallet 220, the middle section arm may be extended out or retracted relative to the outer section arm, and the middle section arm is driven by the sprocket transmission mechanism. The inner section arm is movably installed at a side of the middle section arm close to the pallet 220. The inner section arm may be extended out or retracted relative to the middle section arm. The inner section arm is driven by a movable pulley mechanism. A pulley of the movable pulley mechanism is installed to the inner section arm. Two ends of strop of the movable pulley are respectively installed to the outer section arm and the middle section arm. When the middle section arm is extended out or retracted relative to the outer section arm, the inner section arm moves in the same direction relative to the outer section arm, and the moving speed of the inner section arm is twice that of the middle section arm.

The immobile pusher 23822 protrudes from the other end of the telescopic arm 23820, and the mobile pusher 23824 is movably installed at the other end of the telescopic arm 23820. When the telescopic arm 23820 is extended out or retracted, the mobile pusher 23824 and immobile pusher 23822 are extended out or retracted together. The mobile pusher 23824 may be received into or protruded from the other end of the telescopic arm 23820, and may be directly driven by a motor. The mobile pusher 23824 and the immobile pusher 23822, which are protruded from the other end of the telescopic arm 23820, are spaced apart from each other, and a distance between the two is used for accommodating a material box. In a protruding direction of the telescopic arm 23820, the mobile pusher 23824 protruded from the other end of the telescopic arm 23820 is located in the front of the immobile pusher 23822. The mobile pusher 23824 and the immobile pusher 23822, which are protruded from the other end of the telescopic arm 23820, are both located at the same side of the telescopic arm 23820 as the pallet 220, and both are higher than a position of the pallet 220.

When the handling assembly 238 fetches a material box out of the pallet 220 and stores it into an empty space of the layered plate 2701 or the warehouse shelf, the mobile pusher 23824 is in the state of being received in the other end of the telescopic arm 23820, and the telescopic arm 23820 is extended out. The immobile pusher 23822 pushes the material box stored on the pallet 220 from the pallet 220 into the empty space of the layered plate 2701 or the warehouse shelf, and after the material box is pushed into the empty space of the layered plate 2701 or the warehouse shelf, the telescopic arm 23820 is retracted.

When the handling assembly 238 fetches a material box out of the layered plate 2701 or the warehouse shelf and stores it onto the pallet 220, the mobile pusher 23824 is in the state of being received into the other end of the telescopic arm 23820, and the telescopic arm 23820 is extended out to make the mobile pusher 23824 pass over the material box. The mobile pusher 23824 protrudes from the other end of the telescopic arm 23820 after passing over the material box, and then the telescopic arm 23820 is retracted, and the mobile pusher 23824 protruded from the telescopic arm 23820 pulls the material box onto the pallet 220. After the material box is pulled onto the pallet 220, the mobile pusher 23824 is received into the other end of the telescopic arm 23820.

Referring to FIG. **10*f* again, the material box identification component 250 includes a material identification device that is installed to the handling assembly 238, and the lens of the material identification device has an orientation that is the same as the protruding direction of the telescopic arm 23820, and is used to acquire the image information of the warehouse shelf or the material box. The material identification device is fixedly installed to the installation platform 2380. In some other embodiments, the material identification device is installed at the other end of the telescopic arm 23820 and may be extended out along with the other end of the telescopic arm 23820**.

By acquiring the image information of the warehouse shelf, it can be determined whether the empty space of the warehouse shelf or the material box stored on the warehouse shelf is at the same height as the handling assembly 238. Since the position of the layered plates is relatively fixed, whether the empty space of the layered plate or the material box stored on the layered plate is at the same height as the handling assembly 238 can be achieved by setting parameters of the lift driving device and the rotation driving device through a program, which is more efficient. Of course, it is also possible to identify the empty space of the layered plate or the material box stored on the layered plate via the material box identification component.

In some embodiments, the warehouse shelf is posted with a two-dimensional code. The handling assembly 238 is initially located at the lowest position, the handling assembly 238 gradually rises, and the material identification device starts to scan starting from a low-layer two-dimensional code. When a specified two-dimensional code is scanned, the handling assembly 238 stops lifting. At this time, the empty space of the warehouse shelf or the material box stored on the warehouse shelf is at the same height as the handling assembly. The material box is also posted with a two-dimensional code. When the material box stored on the warehouse shelf is at the same height as the handling assembly 238, the handling assembly 238 is rotated, and the material identification device scans the two-dimensional code on the material box. When the two-dimensional code on the material box is relatively complete or centered in the visual field of the material identification device, the handling assembly 238 stops rotating. At this time, the handling assembly 38 is aligned with the material box stored on the warehouse shelf.

Referring to FIG. 10*g*, the material transfer component 240 is installed to the installation platform 2380, and may be rotated around the vertical axis or moved in the vertical direction along with the handling assembly 238, so that the material box stored on the layered plate 2701 and the material transfer component 240 are at the same height or the material transfer component 240 is close to the material box stored on the layered plate 2701. The material transfer component 240 includes a multidimensional mechanical joint 2402 and a terminal actuator 2404. One end of the multidimensional mechanical joint 2402 is installed to the installation platform 2380 and is located at the same side of the installation platform 2380 as the pallet 220. The other end of the multidimensional mechanical joint 2402 may rotate in multiple angles and move in multiple directions relative to the installation platform 2380. The multidimensional mechanical joint 2402 includes a rotation base 24020, a first rotation arm 24022, a second rotation arm 24024, and a three-axis platform 24026. The rotation base 24020 has a first rotation axis O1. One end of the first rotation arm 24022 is movably installed to the rotation base 24020. The first rotation arm 24022 may rotate relative to the rotation base 24020 around a second rotation axis O2 that is perpendicular to the first rotation axis O1. One end of the second rotation arm 24024 is movably installed at the other end of the first rotation arm 24022, and the second rotation arm 24024 may rotate relative to the other end of the first rotation arm 24022 around a third rotation axis O3 that is parallel to the second rotation axis O2. The three-axis platform 24026 is installed at the other end of the second rotation arm 24024 and is configured to install the terminal actuator 2404. The rotation base 24020 is installed to the installation platform 2380 and is located at the same side of the installation platform 2380 as the pallet 220. The first rotation axis O1 is in the vertical direction, and the second rotation axis O2 is in the horizontal direction.

The terminal actuator 2404 is configured to fetch or release a material, and is installed at the other end of the multidimensional mechanical joint 2402. In this embodiment, the terminal actuator 2404 is a sucker device for grabbing a material by adsorption. According to an actual situation, the terminal actuator 2404 is not limited to the sucker device. According to different types of materials, the terminal actuator 2404 can be configured to be adaptive to a type of material. For example, the sucker device is suitable for grabbing a solid boxed material with a relatively flat surface, and the mechanical claw is suitable for grabbing a material with an unfixed shape, such as clothes, and so on.

A specific process of the material transfer component 240 fetching out a replenishment or return material from the material box stored on the storage shelf 270 is as follows: after the multidimensional mechanical joint 2402 drives the terminal actuator 2404 to move until it is above the material box stored on the layered plate 2701 of the storage shelf 270, the terminal actuator 2404 grabs the material so that the material is fetched out of the material box stored on the layered plate 2701. After the terminal actuator 2404 grabs the material, the multidimensional mechanical joint 2402 drives the terminal actuator 2404 to return to its original position.

A specific process of the material transfer component 240 placing the fetched replenishment or return material into the material box on the pallet 220 is as follows: after the multidimensional mechanical joint 2402 drives the terminal actuator 2404 to move until it is above the material box stored on the pallet 220, the terminal actuator 2404 releases the material, so that the material falls into the material box stored on the pallet 220. According to an actual situation, for example, when the material is a fragile item, in order to prevent the material from damage due to falling, after the multidimensional mechanical joint 2402 drives the terminal actuator 2404 to move until it is above the material box stored on the pallet 220, the multidimensional mechanical joint 2402 drives the terminal actuator 2404 to protrude into the material box stored on the pallet 220 and then the terminal actuator 2404 releases the material to avoid the damage caused by the falling of material.

Referring to FIGS. 10*d* and 10*g*, the material identification component 260 includes a first material identification device 262, a second material identification device 264, and a third material identification device 266.

The first material identification device 262 is configured to identify the material in the material box stored on the pallet 220.

The first material identification device 262 is fixedly installed to the installation platform 2380. The first material identification device 262 includes a first camera 2620 and a camera holder 2622. The camera holder 2622 is rod-shaped and is located at the same side of the installation platform 2380 as the pallet 220. One end of the camera holder 2622 is fixedly installed to the installation platform 2380, and the other end of the camera holder 2622 is higher than the pallet 220. The first camera 2620 is installed at the other end of the camera holder 2622 and is configured to acquire the image information of the material in the material box stored on the pallet 220, so as to identify the material in the material box stored on the pallet 220.

The second material identification device 264 may be configured to identify the material in the material box stored on the storage shelf 270. Specifically, the second camera moves along with the other end of the multidimensional mechanical joint 2402 to acquire the image information of the material in the material box stored on the layered plate 2701, to identify the material in the material box stored on the layered plate 2701.

The second material identification device 264 may further be configured to acquire the image information of the material in the material box stored on the pallet 220 to identify the material in the material box stored on the pallet 220. Specifically, the second material identification device 264 is fixedly installed at the other end of the multidimensional mechanical joint 2402, and may move along with the other end of the multidimensional mechanical joint 2402. The second material identification device 264 includes a second camera. The second camera is installed at the other end of the multidimensional mechanical joint 2402 and may move along with the other end of the multidimensional mechanical joint 2402.

The third material identification device 266 is configured to identify the material in the material box stored on the storage shelf. The third material identification device 266 includes a third camera 2660. A plurality of third cameras 2660 are distributedly installed to the vertical bracket 219 in the vertical direction, and each third camera 2660 is configured to acquire the image information of material in the material box stored on a corresponding layered plate 2701, so as to identify the material in the material box stored on the corresponding layered plate 2701. Each third camera 2660 may be hung on a corresponding cross beam 2192, and a corresponding layered plate 2701 is located below the cross beam 2192.

Here is a detailed description of how each material identification device (that is, the first, second, and third material identification devices as described above) identifies the material in the material box. The aforementioned image information of the material includes SKU (stock keeping unit) information of material and position information of material. The material is posted with a barcode containing the SKU information. By scanning the barcode in the camera's field of view, a barcode containing specified SKU information is marked, and the material posted with this barcode is a replenishment or return material (in the material box stored on the storage shelf) or a material that has been replenished or returned (in the material box stored on the pallet). Since the position of the material box stored on the pallet or the storage shelf is basically fixed, the position of the replenishment or return material in the material box may be determined according to the position of the marked barcode in the camera's field of view. At this time, the material identification device completes the work of identification of the material in the material box On the basis of the aforementioned principle of material identification by the material identification device, the difference among the first, second, and third material identification devices is further set forth here. The first material identification device is configured to identify the material in the material box stored on the pallet, but the first material identification device is fixed to an upright bracket on the handling assembly. In the case where positions of materials in the material box are scattered, the first camera of the first material identification device can accurately acquire the position information of each material in the material box; however, in the case where the positions of the materials in the material box are relatively dense, the accuracy of the first camera to acquire the position information of each material in the material box will be decreased. The third material identification device is fixed to the storage shelf Similar to the first material identification device, when the positions of the materials in the material box stored on the layered plate are relatively scattered, the third camera of the third material identification device can accurately acquire the image information of the materials in the material box; and when the positions of the materials in the material box stored on the layered plate are relatively dense, the accuracy of the third camera of the third material identification device to acquire the position information of each material in the material box will be decreased. Therefore, by installing the second material identification device to the other end of the material transfer component, the second material identification device moves along with the other end of the material transfer component and the material transfer component may drive the second material identification device to move and approach each material in the material box, so as to improve the accuracy of the second camera of the second material identification device to acquire the image information of each material in the material box. Therefore, in some other embodiments, the second material identification device may be omitted when the positions of the materials in the material box are scattered as described above.

Since both the third material identification device and the second material identification device are configured to identify the material in the material box stored on the storage shelf, in order to improve the identification efficiency, the third material identification device performs the identification of the material in the material box prior to the second material identification device. If the third material identification device has identified the position information and the SKU information of the material in the material box (as in the case where the positions of the materials are relatively scattered as described above), the second material identification device only needs to identify the SKU information of the material in the material box according to the position information and the SKU information provided by the third material identification device, and find the matching SKU information, and then the position information of the material can be determined, without need to identify the position information of the material again. If the third material identification device does not identify the position information of the material, the second material identification device needs to identify the position information and the SKU information of the material.

The second material identification device is further configured to identify the SKU information of the material grabbed by the terminal actuator to match the specified SKU information, so as to determine whether the terminal actuator grabs a wrong material.

Continue to refer to FIG. 11*a*, in this embodiment of the present application, the various components and elements of the handling robot 20 in the foregoing embodiments may correspond to specific physical devices. For example, the material handling component 230 may include the handling assembly, and the material transfer component 240 may include the mechanical arm. The storage shelf 270 may be configured to pre-place various material-holding containers, such as a material box or a basket. The vertical bracket 219 may be used for supporting the handling assembly, the material transfer component, and the storage shelf. The handling assembly, the material transfer component, and the storage shelf may all be installed to the vertical bracket. Referring to FIG. 11*a*, the handling robot 20 includes a material transfer component 201, a storage shelf 202, a vertical bracket 203 and a handling assembly 204. Among them, the material transfer component 201 may be installed to the handling assembly 204, the handling assembly 204 may be slidably connected to the vertical bracket 203, and the material transfer component 201 may follow the handling assembly 204 to move up and down on the vertical bracket. The material transfer component 201 may also be slidably connected to the vertical bracket 203, which may include upright posts on two sides. When the material transfer component 201 is slidably connected to the vertical bracket 203, the material transfer component 201 may be one or two, which are slidably connected to the upright posts of the vertical bracket 203 respectively. The material transfer component 201 may move up and down on the upright posts. FIG. 11*b* shows a schematic diagram of the material transfer component 203 slidably connected to the vertical bracket 203. The storage shelf 202 is installed to the vertical bracket 203. The storage shelf 202 may be multiple and arranged in layers on one side of the vertical bracket 203, and the handling assembly 204 is arranged on the other side of the vertical bracket 203.

Referring to FIG. 12, which is a schematic structural diagram of another handling robot 20 provided by an embodiment of the present application. In this embodiment of the present application, various components and elements of the handling robot 20 in the foregoing embodiments may correspond to specific physical devices. For example, the material handling component 230 may include the installation platform, and the material transfer component 240 may be the mechanical arm. The storage shelf 270 may be configured to pre-place various material-holding containers, such as a material box or a basket. The vertical bracket 219 may be used for supporting the installation platform, the material transfer component and the storage shelf. The installation platform, the material transfer component and the storage shelf may all be installed to the vertical bracket. Referring to FIG. 12, the handling robot 20 includes the material transfer component 201, the storage shelf 202, the vertical bracket 203 and the installation platform 205. Among them, the material transfer component 201 may be installed to the installation platform 205, which may be slidably connected to the vertical bracket 203. The material transfer component 201 may follow the installation platform 205 to move up and down on the vertical bracket, the material transfer component 201 may also be slidably connected to the vertical bracket 203, which may include upright posts on two sides. When the material transfer component 201 is slidably connected to the vertical bracket 203, the material transfer component 201 may be one or two, which are slidably connected to the upright posts of the vertical bracket 203, respectively. The material transfer component 201 may move up and down on the upright posts. The storage shelf 202 is installed to the vertical bracket 203. The storage shelf 202 may be multiple and arranged in layers on one side of the vertical bracket 203, and the installation platform 205 is arranged on the other side of the vertical bracket 203.

For a situation where there are multiple storage shelves 202, the storage shelf may be divided into a replenishment or return material storage shelf and a temporary material storage shelf. Among them, the replenishment or return material storage shelf is configured to store the replenishment or return material, and the temporary material storage shelf is configured to store the replenishment or return material that does not correspond to the material box, that is, the material fetched and placed by the material transfer component does not belong to the replenishment or return material that needs to be placed in the material box.

In the implementation of the present application, compared with the handling assembly 204, the installation platform 205 cannot move the material box, and the material transfer component 201 can be used to move the material box to the installation platform. The sliding mechanism may move the installation platform up and down in the vertical direction so as to move the material box on the installation platform to a height corresponding to the storage shelf, so that the material transfer component fetches out the material to be fetched from the material box and places it onto the storage shelf. In addition, the installation platform 205 may be rotated so that the installation platform may be aligned with the material box on the shelf so as to move the material box.

In the embodiment of the present application, the material transfer component 201 may be provide with a sucker or a mechanical claw, and a material may be sucked out through the sucker or grabbed through the mechanical claw. The sucker or the mechanical claw may be provided at the end of the material transfer component, and may be replaced according to different materials.

In the embodiment of the present application, in order to identify the position of the material in the material box, the material in the material box may be captured by the material identification device. At the same time, in order to confirm the accuracy of the material fetched and placed by the material transfer component, the material information of the material may be captured by the material identification device. The material identification device may be installed to the material transfer component, the handling assembly and/or the installation platform. The material identification device may capture the image information of the replenishment or return material in the material box, and the image information includes: the position information of replenishment or return material in the material box, the stock keeping unit information of replenishment or return material, the shape of replenishment or return material, and the image feature point of replenishment or return material, and the color information of replenishment or return material and/or volume information of replenishment or return material.

In the embodiment of the present application, the handling robot 20 further includes a mobile chassis for moving the handling robot 20 according to a planned path. The planned path may be a path for replenishing or returning the material. The path may be planned by the processing terminal 10 and sent to the handling robot in the form of instructions. For example, the processing terminal 10 sends a material replenishment or return instruction to the handling robot and thus correspondingly moves the handling robot to realize material replenishment or return.

In the application scenario and related devices shown in FIGS. 9-12, the material replenishing or returning methods provided in the embodiments of the present application may be used to perform a material fetching operation through the material transfer component, improving the efficiency of material replenishment or return and increasing the flexibility of material replenishment or return.

Figure 18:
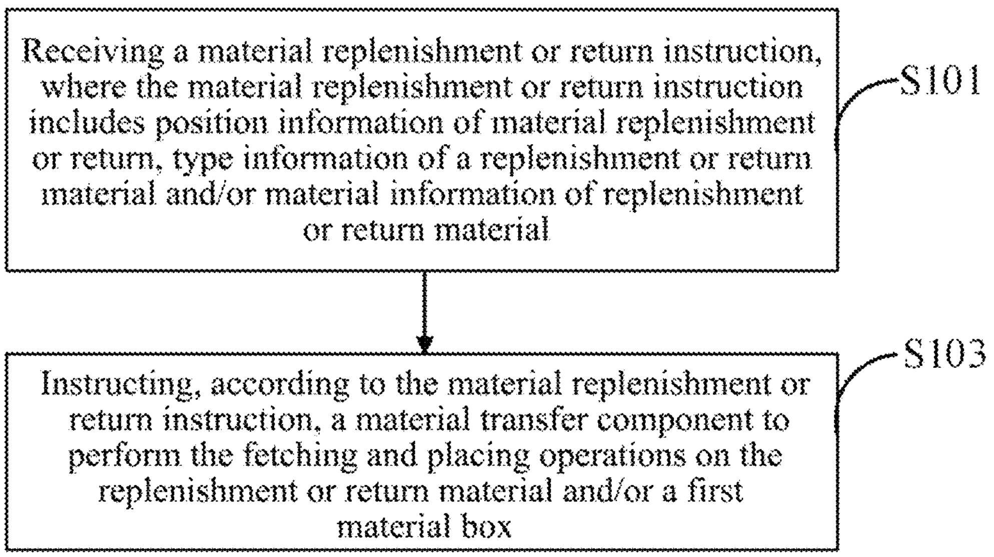
FIG. 18 is a schematic flowchart of a material replenishing or returning method provided by an embodiment of the present application.

FIG. 18 is a flowchart of a material replenishing or returning method provided by an embodiment of the present application. As shown in FIG. 18, the material replenishing or returning method is applied to the handling robot described above, and the material replenishing or returning method includes:

S101, receiving a material replenishment or return instruction, where the material replenishment or return instruction includes position information of material replenishment or return, type information of a replenishment or return material and/or material information of a replenishment or return material.

In the embodiment of the present application, the material replenishment or return instruction may be sent from the processing terminal to the handling robot, and the handling robot receives the material replenishment or return instruction and parses the material replenishment or return instruction to identify the information included in the instruction, such as the position information of the material replenishment or return, the type information of the replenishment or return material, and/or the material information of the replenishment or return material. Among them, the position information of the material replenishment or return may include a position of a material box for carrying the replenishment or return material. The position of the material box may be different positions on the shelf in the warehouse and the position information may be three-dimensional space coordinates, or may be determined by the code information on the material box, such as two-dimensional code information. The type information of the replenishment or return material may include the stock keeping unit information (SKU information). Through the SKU information, the name, quantity, model and so on of the replenishment or return material may be determined. For different material boxes, the SKU information of materials in the material boxes may be the same or different. The SKU information may be presented in the form of barcode. The material information of the replenishment or return material may include shape, volume, image feature point, color and/or weight information of the replenishment or return material, and the material information may be presented in the form of word, number or image.

In the embodiment of the present application, for different types of handling robots, due to individual differences in structure, different method steps may be executed after the material replenishment or return instruction is received. For example, for a handling robot that includes a vertical bracket and a handling assembly to which a material transfer component is installed, the method further includes:

instructing the handling assembly to move to a first position according to the position information of material replenishment or return, and instructing the handling assembly or the material transfer component to move the second material box for carrying the replenishment or return material from a second position to the first position.

For a handling robot that includes a handling assembly and a vertical bracket to which at least one material transfer component is slidably connected, the method further includes:

instructing the handling assembly to move to a first position according to the position information of material replenishment or return, instructing the handling assembly to move the second material box for carrying the replenishment or return material from a second position to the first position, or instructing the material transfer component to move to the first position, and moving the second material box for carrying the replenishment or return material from the second position to the first position.

For a handling robot that includes a vertical bracket and an installation platform to which the material transfer component is installed, the method further includes:

instructing the installation platform to move to a first position according to the position information of material replenishment or return, and instructing the material transfer component to move the second material box for carrying the replenishment or return material from a second position to the first position.

For a handling robot that includes an installation platform and a vertical bracket to which at least one material transfer component is slidably connected, the method further includes:

instructing the installation platform to move to a first position according to the position information of material replenishment or return, instructing the material transfer component to move to the first position, and moving the second material box for carrying the replenishment or return material from a second position to the first position.

In the embodiment of the present application, the above various types of handling robots may further include at least one storage shelf. When the handling robot includes one storage shelf, the method further includes:

instructing, according to the material replenishment or return instruction, the material transfer component to perform the fetching and placing operations on the replenishment or return material, comprising:

instructing the material transfer component to fetch out the material on the storage shelf or in the first material box pre-placed on the storage shelf and place it into the second material box;

when the handling robot includes multiple storage shelves, the handling robot further includes a rotation driving device, and the rotation driving device is configured to drive the handling assembly or the installation platform to rotate around a vertical direction, the multiple storage shelves are arranged in layers on the vertical bracket, and the storage shelves include a temporary material storage shelf and a replenishment-or-return material storage shelf, and the method further includes:

instructing the handling assembly or the material transfer component to move the second material box from the first position to the temporary material storage shelf; instructing the handling assembly or the material transfer component to move the first material box to the original position of the second material box, or instructing the material transfer component to fetch out the material on the storage shelf or in the first material box pre-placed on the storage shelf and place it onto the second material box.

In the embodiment of the present application, the handling assembly or the installation platform further includes a rotation driving device, and the rotation driving device is configured to drive the handling assembly or the installation platform to rotate around a vertical direction. When the handling robot includes multiple storage shelves that are arranged in layers on the vertical bracket and the storage shelves include a temporary material storage shelf and a replenishment or return material storage shelf, the method further includes:

instructing the handling assembly or the material transfer component to move the second material box from the first position to the temporary material storage shelf, and instructing the handling assembly, the installation platform or the material transfer component to move the first material box to the third position corresponding to the temporary material storage shelf;

or before the handling assembly or the material transfer component moves to the first position, instructing the handling assembly, the installation platform or the material transfer component first to move the first material box to the temporary material storage shelf at the topmost position; and after the handling assembly or the material transfer component moves the second material box from the second position to the first position, instructing again the handling assembly or the installation platform and the material transfer component to move the second material box from the first position to the third position corresponding to the temporary material storage shelf.

In the embodiment of the present application, the handling robot may move, according to the position information of material replenishment or return, to the position of the corresponding second material box for carrying the replenishment or return material through ground two-dimensional code map navigation or other navigation mode, so that the replenishment or return material is fetched out from the first material box of the storage shelf and placed it into the second material box. At the same time, in order to be able to fetch out the material box from the shelf, it is necessary to move the handling assembly or the installation platform to the first position. The first position is usually at the same height as the material box carrying the replenishment or return material. The position at which the second material box is located is the second position, where the second material box for carrying the replenishment or return material may be moved from the second position to the first position by movement of the telescopic arm of the handling assembly or the material transfer component. After the handling assembly or the installation platform moves to the first position, the telescopic arm of the handling assembly may be extended out to hold the second material box, or the second material box may be grabbed by the material transfer component. When the handling assembly or the installation platform is not aligned with the second material box, the posture of the handling robot may be adjusted by scanning the two-dimensional code on the shelf so as to be aligned with the second material box. After the second material box for carrying the replenishment or return material is moved from the second position to the first position, the material transfer component may fetch out the replenishment or return material from the material box of the storage shelf and place it into the second material box. Where the storage shelf may be located at the same height as the first position and within the fetching-and-placing range of the material transfer component. For example, the first position is on one side of the vertical bracket and the position of the storage shelf is on the other side of the vertical bracket. When there are two or more storage shelves, the second material box may be moved from the first position to the third position corresponding to the storage shelf by the handling assembly or the installation platform, so that the material transfer component fetches out the replenishment or return material from the first material box corresponding to the storage shelf and place it into the second material box. Since there are multiple storage shelves, the third position may be determined according to the storage shelf. The third position and the position of the storage shelf are at the same height, for example, at both sides of the vertical bracket.

S103, instructing, according to the material replenishment or return instruction, the material transfer component to perform the fetching and placing operations on the replenishment or return material and/or the first material box.

In this embodiment of the present application, the information included in the material replenishment or return instruction may be different. For example, the type information of the replenishment or return material and/or the material information of the replenishment or return material may be not exactly the same; the information in the material replenishment or return instruction is different, which indicates that the ways of the material transfer component to perform fetching and placing operations on the replenishment or return material are also not exactly the same. For example, if the material replenishment or return instruction includes the information of replenishing material in the form of whole box, the handling assembly or the material transfer component may be instructed to place the first material box into a free space for placing the material box on the fixed shelf or move the second material box stored on the fixed shelf to the temporary material storage shelf of the handling robot, and then the handling assembly or the material transfer component is instructed to place the first material box to the position vacated by the second material box on the fixed shelf.

If the stock keeping unit information in the first material box of the storage shelf on which the replenishment or return material is located is the same, the material transfer component may be instructed to fetch out the replenishment or return material from the first material box of the storage shelf and place it into the second material box. If the stock keeping unit information in the first material box of the storage shelf on which the replenishment or return material is located is different, it is possible to acquire the image information of the replenishment or return material in the first material box, and determine the material that is consistent with the stock keeping unit information in the material replenishment or return instruction according to the image information of the replenishment or return material in the first material box, instruct the material transfer component to fetch out the material from the first material box, and place it into the second material box.

In the embodiment of the present application, the image information includes: the position information of the replenishment or return material in the first material box, the stock keeping unit information of the replenishment or return material, the shape of the replenishment or return material, the image feature point of the replenishment or return material, and the color information and/or volume information of the replenishment or return material.

In this embodiment of the present application, the image information of the replenishment or return material in the first material box may be obtained through the material identification device, where the material identification device may be installed to the material transfer component, or the material identification device may be installed to the handling assembly, or the material identification device may be installed to the installation platform, or the material identification device may be installed to both the material transfer component and the handling assembly, or the material identification device may be installed to both the material transfer component and the installation platform. The material identification device may be a camera, etc.

The obtaining the image information of the replenishment or return material in the first material box includes:

acquiring the image information, which is captured by the material identification device of the material-transfer component, the handling assembly or the installation platform, respectively, of the replenishment or return material in the first material box;

or acquiring the image information, captured by the material identification devices of the handling assembly and the material transfer component, of the replenishment or return material in the first material box, or acquiring the image information, which is captured by the material identification devices of the installation platform and the material transfer component, of the replenishment or return material in the first material box.

In the embodiment of the present application, the material information includes shape, volume, image feature point, color, and/or weight information of the replenishment or return material, and the storage shelf includes a replenishment-or-return material storage shelf and a temporary material storage shelf, and the temporary material storage shelf is pre-placed with a third material box, and the method further includes:

when a material that is consistent with the stock keeping unit information and/or the material information in the material replenishment or return instruction cannot be determined by the image information acquired through the material identification device that is installed to the material transfer component, the installation platform or the handling assembly respectively, instructing the material transfer component to obtain the material from the first material box;

continuing to acquire the image information through the material identification device located in the material transfer component, the material identification device located in the handling assembly, or the material identification device located in the installation platform; and when it is determined through the image information that the material obtained by the material transfer component is inconsistent with the stock keeping unit information and/or the material information in the material replenishment or return instruction, placing the material obtained by the material transfer component onto the temporary material storage shelf or the third material box pre-placed on the temporary material storage shelf, and otherwise, placing it into the corresponding second material box.

In the embodiment of the present application, it is possible to instruct the material transfer component to perform the fetching and placing operations on the first material box according to the material replenishment or return instruction. For example, the first material box is placed on a fixed shelf to achieve the material replenishment or return operation in the form of whole-box material. When the replenishing or returning operations of the whole-box material is performed, the first material box may be placed onto an empty position for storing a material box on the fixed shelf, or the first material box may be placed to the position for storing the second material box on the fixed shelf. Before placing onto the position for storing the second material box on the fixed shelf, it is necessary to move the second material box to the temporary material storage shelf of the handling robot. Where, the handling robot includes a rotation driving device, and the rotation driving device is configured to drive the handling assembly or the installation platform to rotate around a vertical direction.

In the embodiments of the present application, the material replenishment or return instruction may include one or more of the position information of material replenishment or return, the type information of a replenishment or return material, or the material information of a replenishment or return material. The handling robot may instruct the material transfer component to perform the fetching and placing operations on replenishment or return material and/or the first material box, according to the specific information in the material replenishment or return instruction, such as material information or type information of material to be fetched.

In the embodiment of the present application, the handling robot receives a material replenishment or return instruction, which includes the position information of material replenishment or return, and the type information and/or material information of replenishment or return material; and according to the material replenishment or return instruction, the material transfer component is instructed to perform the fetching and placing operations on the replenishment or return material and/or the first material box. In the technical solution of the present application, the fetching and placing operations of the replenishment or return material and/or the first material box are performed through the material transfer component, which improves the flexibility of material replenishment or return, and enhances the efficiency of material replenishment or return.

In order to further illustrate the embodiments of the present application, a specific embodiment based on specific information contained in the material replenishment or return instruction is provided below.

Figure 19:
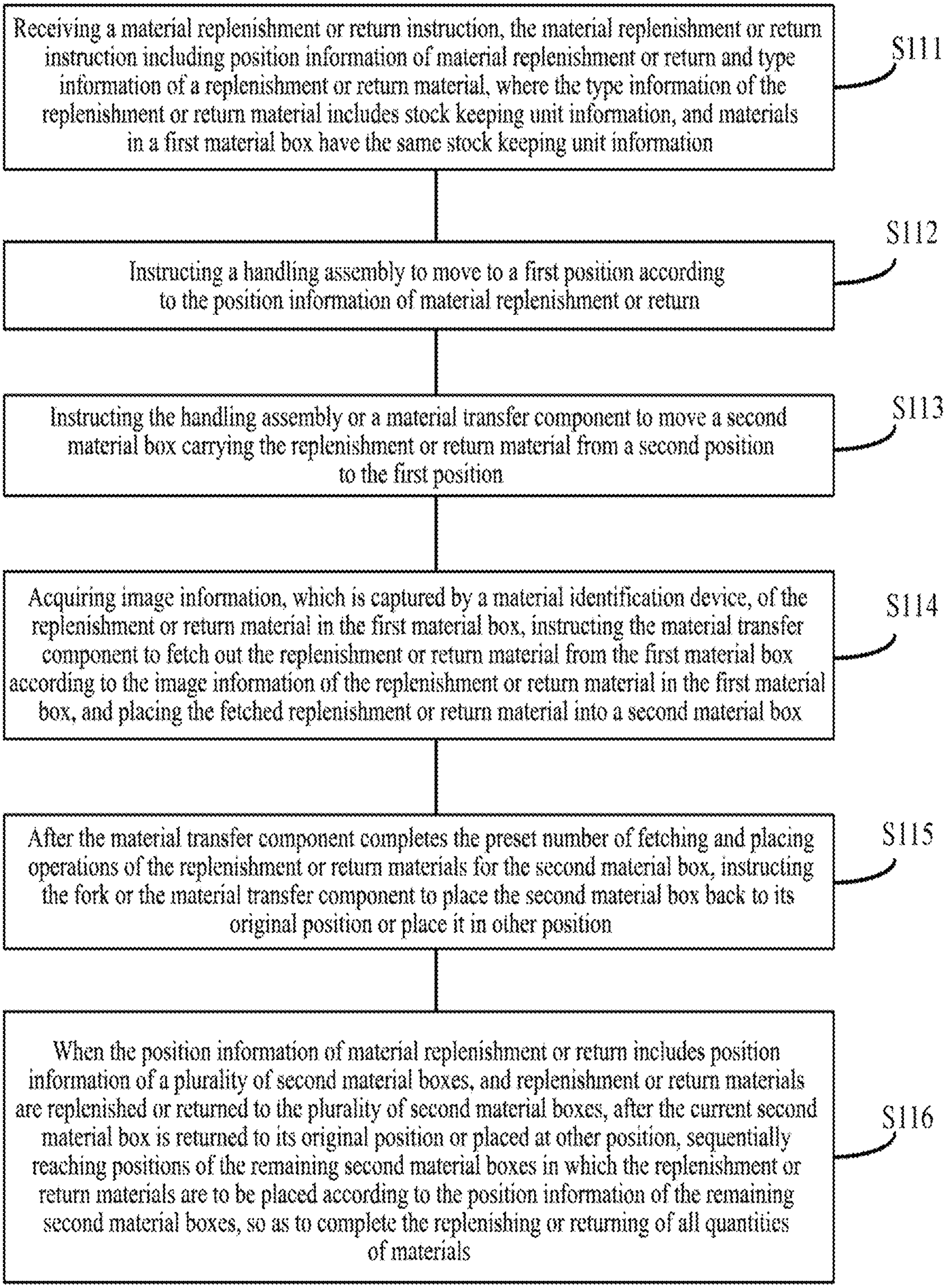
FIG. 19 is a flowchart of a material replenishing or returning method for replenishment or return materials that have the same inventory information in a first material box provided by an embodiment of the present application.

FIG. 19 is a flowchart of a replenishing or returning method of the replenishment or return material with the same inventory information in the first material box provided by an embodiment of the present application. As shown in FIG. 19, the material replenishing or returning method is applied to the above handling robots, where in this embodiment, the handling robot with a material transfer component fixed on a handling assembly and a material identification device installed to the material transfer component is taken as an example for description, and the method includes:

S111, receiving a material replenishment or return instruction, the material replenishment or return instruction including the position information of the material replenishment or return and the type information of the replenishment or return material, where the type information of the replenishment or return material includes the stock keeping unit information, and materials in the first material box have the same stock keeping unit information. In the embodiment of the present application, the SKU information in the first material box in which the replenishment or return material is located is the same, and the material transfer component does not need to perform distinguishing in the process of fetching and placing a material. For a single piece of material with a large volume, the material transfer component material may be directly used for fetching the material; and for a single piece of material with a small volume, in order to facilitate the material transfer component to grab the material, it is possible to capture the image information of the material in the first material box via the material identification device on the material transfer component. The image information may include the position of the replenishment or return material in the first material box, and the material is grabbed according to the captured position.

In the embodiment of the present application, after the handling robot receives a material replenishment or return instruction, it parses the material replenishment or return instruction; and according to the parsed instruction information, the handling robot is instructed to perform corresponding processing. These processing include: instructing the handling robot to move according to the position of material replenishment or return, instructing the handling assembly and the material transfer component to perform associated operations such as moving material box and grabbing material, etc.

S112, instructing the handling assembly to move to the first position according to the position information of material replenishment or return.

In the embodiment of the present application, the position information of material replenishment or return includes a position of the second material box for carrying the replenishment or return material, for example, such as three-dimensional information of the position of the second material box. Before the handling assembly moves to the first position, the handling robot may move to the vicinity of the second material box for carrying the replenishment or return material, based on the position information of material replenishment or return. Then according to the information located on the second material box, such as the code on the second material box, the accuracy of the position of the second material box is further verified through information of the code on the second material box; and also according to the information of the code on the second material box such as information of two-dimensional code, the posture of the robot may be adjusted so that the handling assembly may be aligned with the second material box.

In the embodiment of the present application, the first position is usually at the same height as the second material box for carrying the replenishment or return material, and the horizontal distance between the first position and the second material box is within the telescopic range of the telescopic arm on the handling assembly, so that the handling assembly may protrude from the telescopic arm and then move the second material box to the first position.

S113, instructing the handling assembly or the material transfer component to move the second material box for carrying the replenishment or return material from the second position to the first position.

In the embodiment of the present application, after the handling assembly is moved to the first position, the second material box for carrying the replenishment or return material may be moved from the second position to the first position by the telescopic arm on the handling assembly; or the second material box for carrying the replenishment or return material may be moved from the second position to the first position by the material transfer component. Where, the second position is a position at which the second material box is located, and this position is usually located on the shelf in the warehouse and may be determined by three-dimensional space coordinates.

S114, acquiring the image information, which is captured by the material identification device, of the replenishment or return material in the first material box, instructing the material transfer component to fetch out the replenishment or return material from the first material box according to the image information of the replenishment or return material in the first material box, and placing the fetched replenishment or return material into the second material box.

In the embodiment of the present application, since replenishment or return materials have the same SKU information, the image information of the replenishment or return material in the first material box may be captured by the material identification device on the material transfer component so as to avoid the material transfer component to be unable to grab the material during the material fetching by the material transfer component. The image information contains the position of the replenishment or return material in the first material box. The material transfer component is instructed to fetch out the replenishment or return material from the first material box. The material fetching manner may be using the sucker on the material transfer component to suck out the material or mechanical claw to grab the material. After the material is fetched out, the fetched material may be placed onto the second material box. Where, the first material box on the storage shelf may be at the same height as the first position, and the first material box and the handling assembly may be located on both sides of the vertical bracket respectively. The first material box on the storage shelf may be at a different height from the first position, and it is necessary to move, by the handling assembly, the second material box to the same height as the first material box on the storage shelf, so that the material transfer component fetches out the replenishment or return material from the material box and places it into the second material box.

S115, after the material transfer component completes the preset number of fetching and placing operations of the replenishment or return materials for the second material box, instructing the handling assembly or the material transfer component to place the second material box back to its original position or place it in other position.

In this embodiment of the present application, after the material transfer component completes the preset number of fetching and placing operations of the replenishment or return materials for the second material box, that is, after the fetching and placing operations of all materials that need to be replenished or returned to the second material box have been completed, the handling assembly is instructed to move to the first position, that is, the height position corresponding to the original position of the second material box. Then the handling assembly or the material transfer component is instructed to place the material box back to the original position of the material box or place it in other position. As for the quantity of the replenishment or return material that needs to be fetched out from the first material box, it may be determined by the information included in the material replenishment or return instruction. For example, the material replenishment or return instruction may include the information on different quantities of replenishment or return materials of different second material boxes.

S116, when the position information of material replenishment or return includes position information of a plurality of second material boxes, and replenishment or return materials are replenished or returned to the plurality of second material boxes, after the current second material box is returned to its original position or placed at other position, sequentially reaching positions of the remaining second material boxes in which the replenishment or return materials are to be placed according to the position information of the remaining second material boxes, so as to complete the replenishing or returning of all quantities of materials.

In the embodiment of the present application, when the replenishment or return materials in the first material box cannot be accommodated by one second material box, a plurality of second material boxes are needed to accommodate the replenishment or return material materials. At this time, the position information of the material replenishment or return in the material replenishment or return instruction may include position information of the plurality of second material boxes, and the replenishment or return materials in the first material box may be fetched and placed into the second material boxes at multiple positions. After the material transfer component completes the fetching and placing operations of the replenishment or return material in one second material box, this second material box may be returned to its original position, and then the handling robot may sequentially reach the positions of the remaining second material boxes in which the replenishment or return materials need to be placed according to position information of the remaining second material boxes, so as to complete the replenishing or returning of all quantities of materials.

In the embodiment of the present application, by receiving the material replenishment or return instruction, and based on the position information of material replenishment or return contained in the material replenishment or return instruction and the same SKU information of the replenishment or return materials, the material transfer component is instructed to perform the fetching and placing operations on the replenishment or return materials. At the same time, the material identification device is used to obtain the image information of the replenishment or return materials in the first material box, and the material transfer component is instructed to fetch out the replenishment or return material from the first material box, and place the fetched replenishment or return material into the second material box. Since replenishment or return materials in the first material box have the same SKU information, there is no need to identify the material information during the material fetching process by the material transfer component, which is conducive to fast and accurate material replenishment or return by the material transfer component, and improves the efficiency of material replenishment or return.

Figure 20:
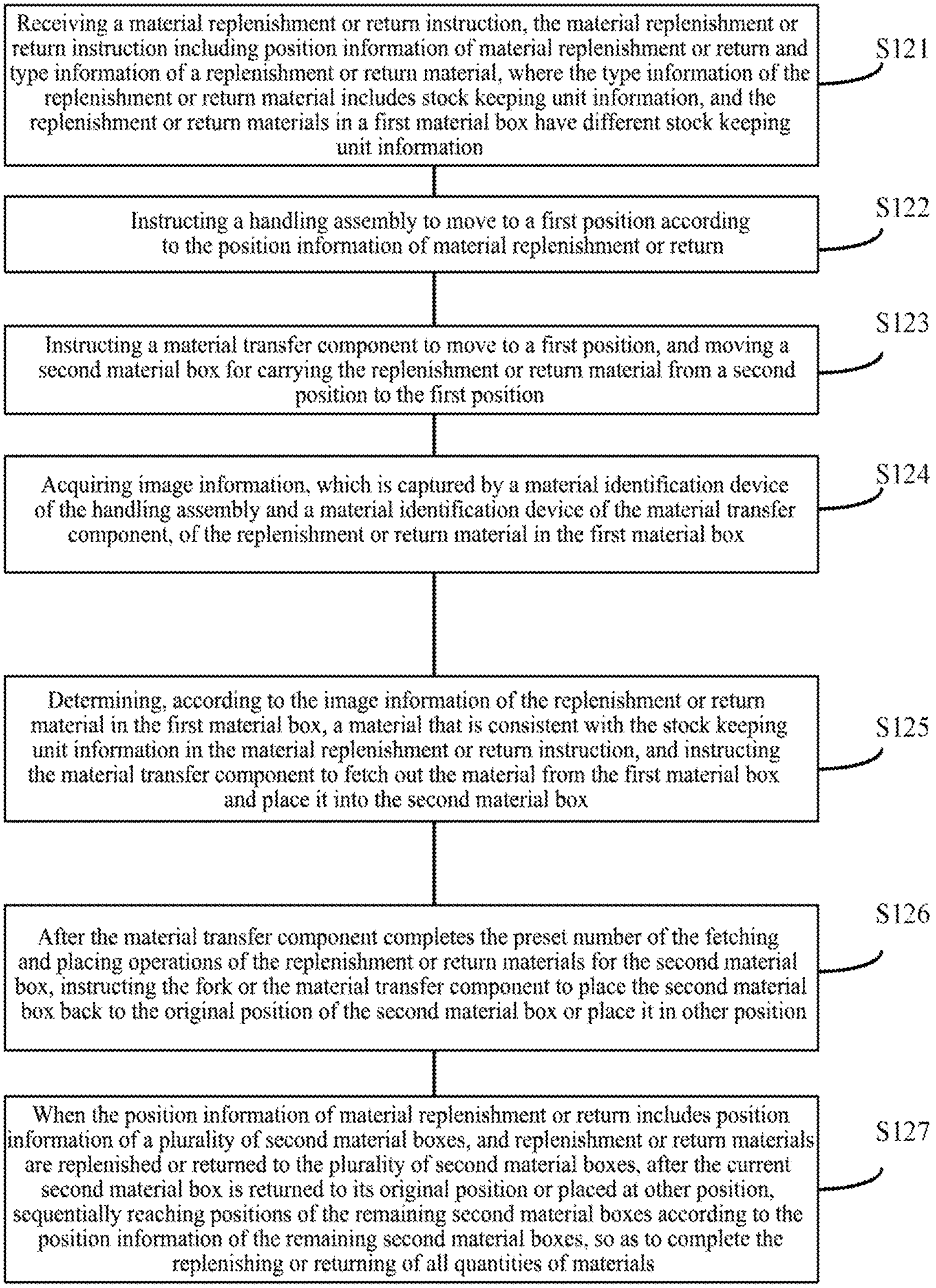
FIG. 20 is a flowchart of a material replenishing or returning method for materials having different inventory information in the first material box provided by an embodiment of the present application.

FIG. 20 is a flowchart of a material replenishing or returning method of the materials with different inventory information in the first material box provided by an embodiment of the present application. As shown in FIG. 20, the material replenishing or returning method is applied to the above handling robots. The handling robot described in the following embodiments includes at least one material transfer component that is slidably connected to the vertical bracket of the handling robot, and the material identification device is installed to both the material transfer component and the handling assembly. At the same time, the handling robot includes multiple storage shelves, and the multiple storage shelves include a replenishment or return material storage shelf and a temporary material storage shelf. The temporary material storage shelf is pre-placed with a third material box. The method includes:

S121, receiving a material replenishment or return instruction, the material replenishment or return instruction including position information of material replenishment or return and type information of a replenishment or return material, where the type information of the replenishment or return material includes the stock keeping unit information, and the replenishment or return materials in the first material box have different stock keeping unit information.

In this embodiment of the present application, materials in the first material box in which the replenishment or return material is located have different SKU information. The material transfer component may enhance the identification on SKU information during the material fetching process so as to decide the storage place of the fetched material, for example, whether to place it into the second material box, or place it onto the temporary material storage shelf or into the third material box of the temporary material storage shelf. In the process of identifying SKU information, the image information may be captured through the material identification device provided on the material transfer component, and the image information may contain the SKU information of the material. By the comparison of the SKU information in the material replenishment or return instruction with the SKU information captured by the material identification device, it is determined whether it is necessary to place the fetched material into the second material box.

S122, instructing the handling assembly to move to the first position according to the position information of material replenishment or return.

In the embodiment of the present application, the position information of material replenishment or return includes position of the second material box for carrying the replenishment or return material, for example, such as three-dimensional information of the position of the second material box. Before the handling assembly moves to the first position, the handling robot may move to the vicinity of the second material box for carrying the replenishment or return material based on the position information of material replenishment or return. Then according to the information located on the second material box, such as the code on the second material box, the accuracy of the position of the second material box is further verified through information of the code on the second material box; and also according to the information of the code on the second material box such as information of two-dimensional code, the posture of the robot may be adjusted so that the handling assembly may be aligned with the second material box.

In the embodiment of the present application, the first position is usually at the same height as the second material box for carrying the replenishment or return material, and the horizontal distance between the first position and the second material box is within the telescopic range of the telescopic arm on the handling assembly, so that the handling assembly may protrude from the telescopic arm device and then move the second material box to the first position.

S123, instructing the material transfer component to move to the first position, and moving the second material box for carrying the replenishment or return material from the second position to the first position.

In this embodiment of the present application, since the material transfer component is slidably connected to the vertical bracket, when the material transfer component needs to move the second material box for carrying the replenishment or return material from the second position to the first position, it is necessary to instruct the material transfer component to move to the first position first. Of course, the handling assembly may also be used to move the second material box for carrying the replenishment or return material from the second position to the first position. Where the second position is a position at which the second material box is located, and this position is usually located on the shelf in the warehouse and may be determined by three-dimensional space coordinates.

S124, acquiring the image information, which is captured by the material identification device of the handling assembly and the material identification device of the material transfer component, of the replenishment or return material in the first material box.

In the embodiment of the present application, since the materials in the first material box have different SKU information, that is, the replenishment or return materials containing different SKU information, it is possible to determine whether the fetched replenishment or return material is a replenishment or return material that should be placed into the second material box through the SKU information of material in order to avoid fetching a wrong material, and the SKU information of the replenishment or return material can be obtained by capturing using the material identification device on the material transfer component. During the material fetching by the material transfer component, the position space information of the replenishment or return material in the first material box may be captured by the camera device on the handling assembly so as to avoid the material transfer component to be unable to grab the replenishment or return material. It is also possible to capture the position space information of the material in the first material box by the camera device on the material transfer component.

In the embodiment of the present application, the image information captured by the material identification device may include the SKU information of the above material and the position space information of the material in the material box, as well as the shape of material to be fetched, the image feature point of material to be fetched, the color information of a material to be fetched and/or volume information of a material to be fetched.

In the embodiment of the present application, the material identification device may be installed separately to the installation platform, the handling assembly or the material transfer component, or may be installed to both the installation platform and the material transfer component. When the material's image information is to be captured, it can be the captured by material identification devices at different locations respectively. Where the image information captured by the material identification devices on the installation platform and the handling assembly may mainly include relevant information that is convenient for determining the material to be fetched, such as position space, shape, and volume of the material in the material box. The image information captured by the material identification device on the material transfer component may mainly include relevant information that is convenient for determining a position where the fetched material is stored. Of course, the image information captured by the material identification devices at different locations may also include any one or more of the above information.

S125, determining, according to the image information of the replenishment or return material in the first material box, a material that is consistent with the stock keeping unit information in the material replenishment or return instruction, and instructing the material transfer component to fetch out the material from the first material box and place it into the second material box.

In the embodiment of the present application, the image information of the replenishment or return material in the first material box, for example, the SKU information in an image, may be used to determine whether it is consistent with the SKU information in the material replenishment or return instruction. When the two pieces of SKU information is consistent, the material transfer component is instructed to fetch the material from the first material box and place it into the second material box. When the two pieces of SKU information is inconsistent, the fetched material is placed onto the temporary material storage shelf or into the third material box, where the material transfer component moves between corresponding positions of the replenishment or return material storage shelf and the temporary material storage shelf along the vertical bracket.

In this embodiment of the present application, the material transfer component is instructed to fetch out the material from a position space, according to information of the position space of the replenishment or return material in the material box in the image information captured by the material identification device. For example, it is possible to use a sucker on the material transfer component to suck out the material or a mechanical claw to grab the material. After the material is fetched out, it is possible to determine whether the fetched material is the replenishment or return material according to the SKU information in the image information captured by the material identification device. If the fetched material is the replenishment or return material, the fetched material is placed into the second material box. If the fetched material is not the replenishment or return material, the fetched material is placed onto the temporary material storage shelf or into the third material box. Since the material transfer component is needed to place the fetched material into material boxes of the replenishment or return material storage shelf and the temporary material storage shelf, the material transfer component may move between corresponding positions of the replenishment or return material storage shelf and the temporary material storage shelf along the vertical bracket. The replenishment or return material storage shelf and the temporary material storage shelf may be located at different height positions on the same side of the vertical bracket.

S126, after the material transfer component completes the preset number of the fetching and placing operations of the replenishment or return materials for the second material box, instructing the handling assembly or the material transfer component to place the second material box back to the original position of the second material box or place it in other position.

In this embodiment of the present application, after the material transfer component completes the preset number of fetching and placing operations of the replenishment or return materials for the second material box, that is, after the fetching and placing operations of all materials that need to be replenished or returned to the second material box have been completed, the handling assembly is instructed to move to the first position, that is, the height position corresponding to the original position of the second material box. Furthermore, the handling assembly or the material transfer component is instructed to place the second material box back to the original position of the second material box. As for the quantity of the replenishment or return material that needs to be fetched out from the first material box, it may be determined by the information included in the material replenishment or return instruction. For example, the material replenishment or return instruction may include information on different quantities of replenishment or return material of different second material boxes.

In the embodiment of the present application, after the material transfer component completes the preset number of fetching and placing operations of the replenishment or return materials for the second material box, the material transfer component may also be instructed to place the material of the temporary material storage shelf or the third material box back to the corresponding first material box, and the handling assembly or the installation platform and the material transfer component may be instructed to place the second material box back to its original location or place it in other position.

Before or after the second material box is returned to its original location or placed in other position, the handling assembly or the installation platform and the material transfer component may also be instructed to place the first material box back to its original location or place it in other position.

S127, when the position information of material replenishment or return includes position information of a plurality of second material boxes, and replenishment or return materials are replenished or returned to the plurality of second material boxes, after the current second material box is returned to its original position or placed at other position, sequentially reaching positions of the remaining second material boxes according to the position information of the remaining second material boxes, so as to complete the replenishing or returning of all quantities of materials.

In the embodiment of the present application, when replenishment or return materials in the first material box cannot be accommodated by one second material box, a plurality of second material boxes are needed to accommodate the replenishment or return materials. At this time, the position information of the material replenishment or return in the material replenishment or return instruction may include the position information of multiple material boxes, and the replenishment or return materials in the first material box may be fetched and placed into the second material boxes at multiple positions. After the material transfer component completes the fetching and placing operations of the replenishment or return material in one second material box, this second material box may be returned to its original position, and then the handling robot may sequentially reach the positions of the remaining second material boxes according to the position information of the remaining second material boxes, so as to complete the replenishing or returning of all quantities of materials. In the material replenishment or return process, since the SKU information of the replenishment or return materials in the first material box is not exactly the same, the material transfer component needs to perform the above-mentioned related steps of this embodiment in the material fetching process for each second material box.

In the embodiment of the present application, by receiving the material replenishment or return instruction, and based on the position information of material replenishment or return contained in the material replenishment or return instruction and different SKU information of the materials in the first material box, the material transfer component is instructed to perform the fetching and placing operations on the replenishment or return materials and/or the first material box. At the same time, the image information of the replenishment or return material that is to be fetched out is obtained by the material identification device, the storage position of the replenishment or return material is determined based on the image information, which effectively solves the replenishing or returning problem of materials with different SKU information in the material box, facilitates to the fast and accurate material replenishment or return by the material transfer component, and improves the efficiency of material replenishment or return.

Figure 21:
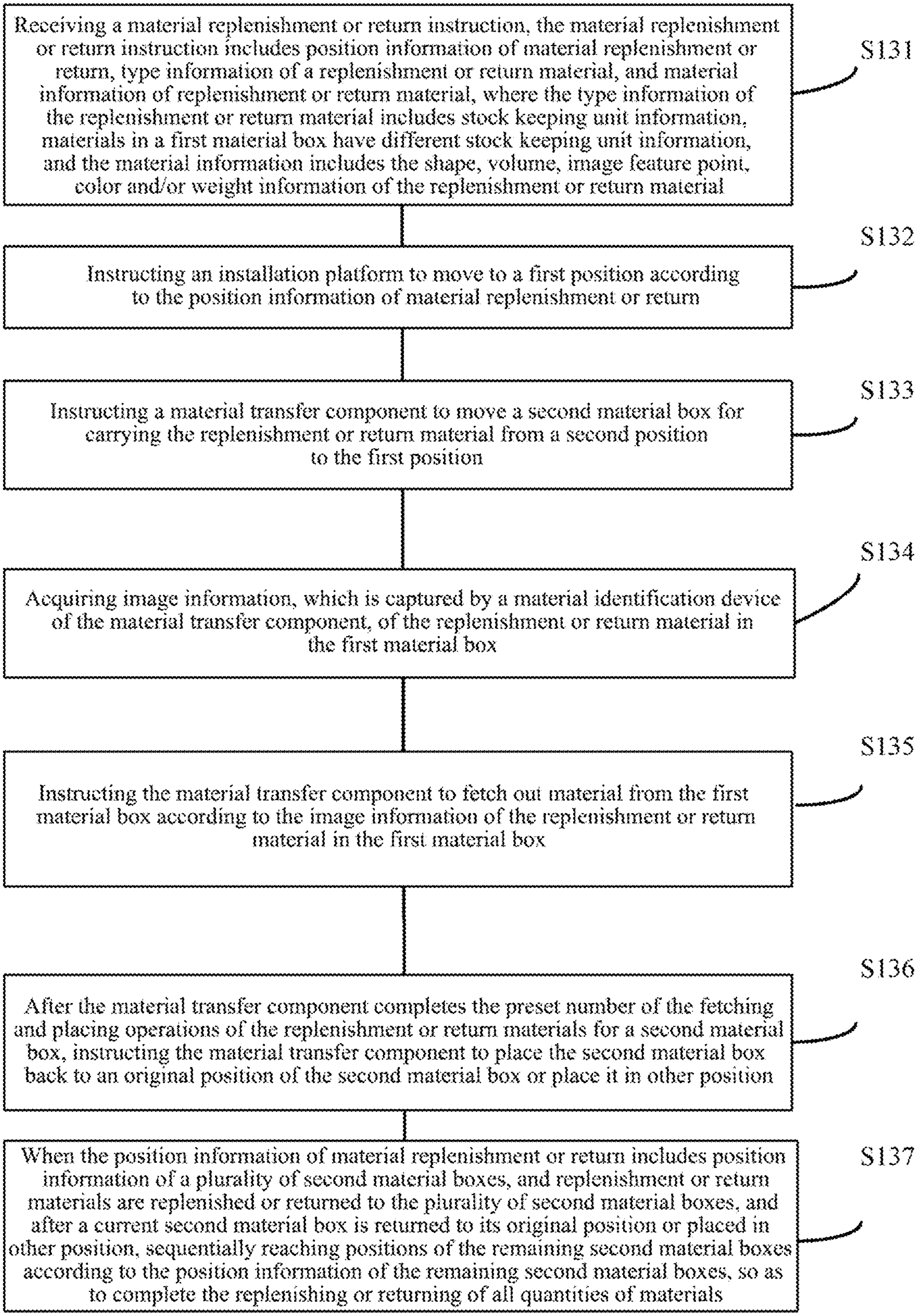
FIG. 21 is a schematic flowchart of a material replenishing or returning method provided by another embodiment of the present application.

FIG. 21 is a flowchart of a material replenishing or returning method according to another embodiment of the present application. As shown in FIG. 21, the material replenishing or returning method is applied to the handling robots described above, where the handling robot described in the following embodiment includes at least one material transfer component fixed on the installation platform, and a material identification device is installed to the material transfer component. At the same time, the handling robot includes multiple storage shelves, and the multiple storage shelves include a replenishment or return material storage shelf and a temporary material storage shelf. The replenishment or return material storage shelf is pre-placed with the first material box, and the temporary material storage shelf is pre-placed with the third material box. The method includes:

S131, receiving a material replenishment or return instruction, the material replenishment or return instruction includes the position information of material replenishment or return, the type information of a replenishment or return material, and the material information of replenishment or return material, where the type information of the replenishment or return material includes stock keeping unit information, and materials in the first material box have different stock keeping unit information. The material information includes the shape, volume, image feature point, color, and/or weight information of the replenishment or return material.

In this embodiment of the present application, the type information of the replenishment or return material includes the stock keeping unit information. The materials in the first material box have different SKU information. The material transfer component may enhance the identification on the material information during the material fetching process so as to decide the replenishment or return material that is to be fetched out. For example, it is possible to capture the image information through the material identification device provided on the material transfer component, where the image information may include information related to the material information, such as actual shape, volume, image feature point, color and/or weight information of the material. By comparison of the material information in the material replenishment or return instruction with the material information captured by the material identification device, the replenishment or return material that needs to be fetched out is determined. At the same time, the image information may also include material's SKU information. By comparison of the SKU information of the replenishment or return material in the material replenishment or return instruction with the material's SKU information in the image information captured by the material identification device, whether to fetch out the material is determined. After the material is fetched out, it is also possible to determine whether the fetched material is placed into the second material box, or onto the temporary material storage shelf or into the third material box, by the image information captured by the material identification device provided on the material transfer component, such as SKU information. In addition, in the process of grabbing a material, the replenishment or return material may be grabbed according to the image information, which is captured by the material identification device, of the replenishment or return material in the first material box. The image information may include the position space information of the replenishment or return material in the first material box, and/or image feature point, color, shape, volume of the replenishment or return material, etc., such as volume information or color information of the replenishment or return material.

S132, instructing the installation platform to move to the first position according to the position information of material replenishment or return.

In the embodiment of the present application, the position information of material replenishment or return includes a position of the second material box for carrying the replenishment or return material, for example, the three-dimensional information of the position of the second material box. Before the installation platform moves to the first position, the handling robot may move to the vicinity of the second material box for carrying the replenishment or return material, based on the position information of material replenishment or return. Then according to the information located on the second material box, such as the code on the second material box, the accuracy of the position of the second material box is further verified through the information of the code on the second material box; and also according to the information of the code on the second material box such as information of two-dimensional code, the posture of the robot may be adjusted so that the installation platform may be aligned with the second material box.

In the embodiment of the present application, the first position is usually at the same height as the second material box for carrying the replenishment or return material, and the horizontal distance between the first position and the second material box is within the material fetching range of the material transfer component, so that the material transfer component may move the second material box to the first position.

S133, instructing the material transfer component to move the second material box for carrying the replenishment or return material from the second position to the first position.

In the embodiment of the present application, since the installation platform cannot grab the material box, and the material transfer component is installed to the installation platform, it is possible to instruct the material transfer component to move the second material box carrying the material to be fetched from the second position to the first position, where the second position is a position at which the second material box is located, and this position is usually located on the shelf in the warehouse, and may be determined by three-dimensional space coordinates.

S134, acquiring image information, which is captured by the material identification device of the material transfer component, of the replenishment or return material in the first material box.

In the embodiment of the present application, since the materials in the first material box have different SKU information or have different material information, such as different volume, color or weight information, in order to avoid fetching a wrong material, whether the fetched material is a replenishment or return material corresponding to the second material box can be determined by the material information of the material. The material information of the material to be fetched can be captured by the material identification device on the material transfer component. In the material fetching process by the material transfer component, the position space information of the replenishment or return material in the first material box can be captured by the material identification device on the material transfer component, so as to avoid the material transfer component to be unable to grab the material. Of course, the position space information of the replenishment or return material in the first material box can also be captured by the material identification device on the installation platform.

In the embodiment of the present application, the image information captured by the material identification device may include the material information and the SKU information of the above material, and the position space information of the material in the material box. The material information may include shape of the replenishment or return material, image feature point of replenishment or return material, and color information and/or volume information of replenishment or return material.

In the embodiment of the present application, the material identification device may also be installed separately to the installation platform, or may be installed to both the installation platform and the material transfer component. When the material's image information is to be captured, it can be captured by using the material identification devices at different locations respectively. Where the image information captured by the material identification device on the installation platform may mainly include relevant information that is convenient for determining the material to be fetched, such as position space, shape, and volume of the material in the material box. The image information captured by the material identification device on the material transfer component may mainly include relevant information that is convenient for determining the storage position of the fetched material, such as stock keeping unit. Of course, the image information captured by the material identification devices at different positions may also include any one or more of the above information.

S135, instructing the material transfer component to fetch out material from the first material box according to the image information of the replenishment or return material in the first material box.

In the embodiment of the present application, when a material that is consistent with the stock keeping unit information and/or the material information in the material replenishment or return instruction cannot be determined through the image information, the material transfer component is instructed to obtain a material from the first material box and image information of the obtained material is continuously captured. When it is determined through the image information that the material obtained by the material the material transfer component is inconsistent with the stock keeping unit information and/or the material information in the material replenishment or return instruction, then the material obtained by the material transfer component is placed onto the temporary material storage shelf or into the third material box pre-placed on the temporary material storage shelf, and otherwise, it is placed into a second material box.

In this embodiment of the present application, according to information of a position space of the replenishment or return material in the first material box in the image information, which is captured by the material identification device, of the replenishment or return material in the first material box, the material transfer component is instructed to fetch out the material from the position space. Or, according to the material information in the image information, which is captured by the material identification device, of the replenishment or return material, such as the volume or color of the replenishment or return material, the material may be sucked out by the sucker on the material transfer component or grabbed by the mechanical claw. After the material is fetched out, whether the fetched material is the replenishment or return material may be determined according to the comparison of the SKU information in the image information, which is captured by the material identification component, of the replenishment or return material with the SKU information in the material replenishment or return instruction. If the fetched material is the replenishment or return material, the fetched material is placed into a second material box. If the fetched material is not the replenishment or return material, the fetched material is placed onto a corresponding temporary material storage shelf or a third material box. Where the replenishment-or-return material storage shelf and temporary material storage shelf may be located at different heights on the same side of the vertical bracket.

S136, after the material transfer component completes the preset number of the fetching and placing operations of the replenishment or return materials for a second material box, instructing the material transfer component to place the second material box back to an original position of the second material box or place it in other position.

In this embodiment of the present application, after the material transfer component completes the preset number of fetching and placing operations of the replenishment or return materials for the second material box, that is, after the fetching and placing operations of all materials that need to be replenished or returned to the second material box have been completed, the installation platform and the material transfer component are instructed to move to the first position, that is, a height position corresponding to the original position of the second material box. Then the material transfer component is instructed to place the second material box back to the original position of the second material box or place it on other position.

S137, when the position information of material replenishment or return includes position information of a plurality of second material boxes, and replenishment or return materials are replenished or returned to the plurality of second material boxes, and after a current second material box is returned to its original position or placed in other position, sequentially reaching positions of the remaining second material boxes according to the position information of the remaining second material boxes, so as to complete the replenishing or returning of all quantities of materials.

In the embodiment of the present application, when the replenishment or return materials in the first material box cannot be accommodated by one second material box, a plurality of second material boxes are needed to accommodate the replenishment or return materials. At this time, the position information of the material replenishment or return in the material replenishment or return instruction may include the position information of the plurality of second material boxes, and the replenishment or return materials in the first material box may be fetched and placed into the second material boxes at multiple positions. After the material transfer component completes the fetching and placing operations of replenishment or return material in one second material box, the second material box may be returned to its original position, and then the handling robot may sequentially reach the positions of the remaining second material boxes according to the position information of the remaining second material boxes, so as to complete the replenishing or returning of all quantities of materials. In the process of material replenishment or return, the SKU information of the replenishment or return materials in the first material box are not exactly the same, therefore, in the material fetching process by the material transfer component for each second material box, it is necessary to perform the above-mentioned related steps in this embodiment.

In this embodiment of the present application, by receiving the material replenishment or return instruction, according to the position information of material fetching contained in the material replenishment or return instruction and different SKU information and material information of the materials in the first material box, the material transfer component is instructed to perform the fetching and placing operation on replenishment or return material and/or the first material box. At the same time, the material information and SKU information of the fetched material is obtained by the material identification device and the material storage location is determined according to the material information and SKU information. This effectively solves the material replenishment or return problem of different material information, facilitates the material transfer component to replenish or return material quickly and accurately, and improves the efficiency of material replenishment or return.

The embodiment of the present application also provides a material replenishing or returning method that is applied to a processing terminal, and the processing terminal is communicatively connected with a handling robot. The method includes: sending a material replenishment or return instruction, so that the handling robot executes the material replenishing or returning method as described above according to the material replenishment or return instruction.

Figure 22:
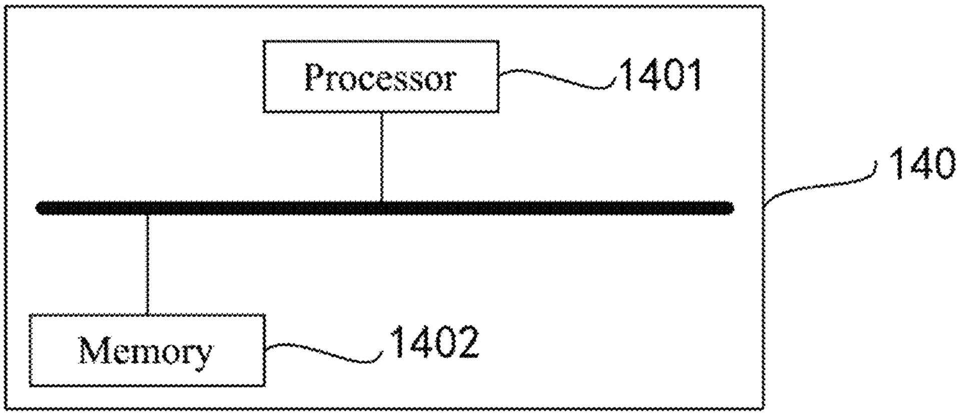
FIG. 22 is a structural block diagram of a handling robot provided by an embodiment of the present application.

FIG. 22 is a structural block diagram of a handling robot provided by an embodiment of the present application. The handling robot 140 may be a robot with processing capability and can execute the material replenishing or returning methods provided by corresponding method embodiments described above.

Specifically, referring to FIG. 22, the handling robot 140 includes:

One or more processors 1401 and a memory 1402 communicatively connected with at least one processor 1401. One processor 1401 is taken as an example in FIG. 23.

The processor 1401 and the memory 1402 may be connected by a bus or in other ways. In FIG. 23, the connection by a bus is taken as an example.

The memory 1402 is a non-transitory computer-readable storage medium, may be configured to store a non-transitory software program and a non-transitory computer-executable program. The corresponding programs may execute corresponding steps of the material replenishing or returning method (for example, S101 and S103 shown in FIG. 18; S111-S116 shown in FIG. 19; S121-S127 shown in FIG. 20; S131-S137 shown in FIG. 21). The processor 1401 executes the material replenishing or returning method by running the non-transitory software program or instructions stored in the memory 1402, thereby implementing the material replenishing or returning methods described in the corresponding method embodiments above.

The memory 1402 may include a program storage area and a data storage area, where the program storage area may store an operating system and an application program required by at least one function; and the data storage area may store data created for executing the aforementioned material replenishing or returning method, etc. In addition, the memory 1402 may include a high-speed random access memory, and may also include a non-transitory memory, such as at least one magnetic disk storage device, a flash memory device or other non-transitory solid-state storage device. In some embodiments, the memory 1402 may optionally include memories remotely provided with respect to the processor 1401, and the remote memories may be connected to the handling robot 140 through a network. Examples of the aforementioned network include, but are not limited to, Internet, intranet, local area network, mobile communication network, and a combination thereof.

One or more modules are stored in the memory 1402, and can execute, when executed by the one or more processors 1401, the material replenishing or returning methods in the above corresponding method embodiments, for example, the above-described S101 and S103 shown in FIG. 18, S111-S116 shown in FIG. 19, S121-S127 shown in FIG. 20, and S131-S137 shown in FIG. 21.

The handling robot may execute the material replenishing or returning methods in the above corresponding method embodiments, and has corresponding devices and beneficial effects for executing the method.

An embodiment of the present application also provides a non-transitory computer-readable storage medium, the non-transitory computer-readable storage medium stores computer-executable instructions, which enable a computer to execute the material replenishing or returning methods in the above-mentioned method embodiments. For example, the computer-executable instructions are executed by one or more processors, such as being executed by a processor 1401 in FIG. 22, so that the one or more processors may execute the material replenishing or returning methods in the corresponding method embodiments, for example, the above-described S101 and S103 shown in FIG. 18, S111-S116 shown in FIG. 19, S121-S127 shown in FIG. 20 and S131-S137 shown in FIG. 21, so as to enable the above one or more processors to execute the material replenishing or returning methods in the above corresponding method embodiments.

An embodiment of the present application also provides a computer program product, the computer program product includes a computer program stored on a non-transitory computer-readable storage medium, and the computer program includes program instructions that, when executed by a computer, enable the computer to execute the material replenishing or returning methods in the foregoing method embodiments, for example, executing S101 and S103 shown in FIG. 18, S111-S116 shown in FIG. 19, S121-S127 shown in FIG. 20 and S131-S137 shown in FIG. 21, as described above, and other functions.

An embodiment of the present application also provides a processing terminal. The processing terminal may be any type of electronic device that can execute the material replenishing or returning methods provided in the above corresponding method embodiments, such as a background server, a computer device with processing capabilities, or a terminal device with computing or scheduling functions.

An embodiment of the present application also provides an intelligent warehousing system, including the handling robot and the processing terminal, as above described.

Finally, it should be noted that the foregoing embodiments are merely intended for describing the technical solutions of the present application other than limiting the present application. Although the present application is described in detail with reference to the foregoing embodiments, persons of ordinary skill in the art should understand that they may still make modifications to the technical solutions described in the foregoing embodiments or make equivalent substitutions to some or all technical features therein, without departing from the spirit and scope of the technical solutions of embodiments of the present application.

What is claimed is:

1. A handling robot, comprising:

a chassis configured to travel along a preset path;

a vertical bracket arranged on the chassis;

a handling assembly slidably connected to the vertical bracket, the handling assembly being configured to retrieve a first container from a warehouse shelf, or place the first container to the warehouse shelf;

a holder connected to the vertical bracket, the holder being configured to hold a second container; and a transfer component connected to the vertical bracket, the transfer component being configured to transfer an item between the first container on the handling assembly and the second container held by the holder;

wherein the vertical bracket is arranged between the handling assembly and the holder;

wherein when the chassis travels, the vertical bracket, the handling assembly, the holder and the transfer component travel with the chassis.

2. The handling robot according to claim 1, wherein the handling assembly is arranged in one of a front side and a rear side of the vertical bracket along a traveling direction of the chassis, the holder is arranged in the other one of the front side and the rear side of the vertical bracket.

3. The handling robot according to claim 1, wherein the transfer component is rotatably connected to the vertical bracket;

wherein the transfer component is configured to pick the item from the first container on the handling assembly, rotate toward the second container held by the holder, and place the item to the second container.

4. The handling robot according to claim 1, wherein the transfer component is rotatably connected to the vertical bracket;

wherein the transfer component is configured to pick the item from the second container held by the holder, rotate toward the first container on the handling assembly, and place the item to the first container.

5. The handling robot according to claim 1, wherein the transfer component comprises:

a multidimensional mechanical joint connected to the vertical bracket; and a terminal actuator installed to the multidimensional mechanical joint;

wherein the multidimensional mechanical joint is configured to drive the terminal actuator to rotate in multiple angles, and the terminal actuator is configured to grasp the item in the first container or the second container.

6. The handling robot according to claim 5, wherein the terminal actuator is a sucker device for adsorbing the item.

7. The handling robot according to claim 1, wherein the handling assembly comprises:

an installation platform slidably connected to the vertical bracket;

a pallet installed to the installation platform, the pallet being configured to temporarily store the first container; and a sucker device movably connected to the installation platform, the sucker device being configured to adsorb the first container stored on the warehouse shelf and place the first container to the pallet, or move the first container from the pallet to the warehouse shelf.

8. The handling robot according to claim 1, further comprises an identification device installed to the vertical bracket, wherein the identification device is configured to acquire image information of the item in the second container held by the holder.

9. The handling robot according to claim 8, wherein the image information comprises at least one of:

position information of the item;

stock keeping unit information of the item to be transferred;

shape of the item to be transferred;

image feature point of the item to be transferred;

color information of the item to be transferred; and volume information of the item to be transferred.

10. A handling robot, comprising:

a chassis configured to travel along a preset path;

a vertical bracket arranged on the chassis;

a handling assembly slidably connected to the vertical bracket, the handling assembly being configured to retrieve a first container from a warehouse shelf, or place the first container to the warehouse shelf;

a holder connected to the vertical bracket, the holder being configured to hold a second container;

a transfer component connected to the vertical bracket, the transfer component being configured to transfer an item between the first container on handling assembly and the second container held by the holder; and an identification device installed to the vertical bracket, wherein the identification device is configured to acquire image information of the item in the second container held by the holder;

wherein when the chassis travels, the vertical bracket, the handling assembly, the holder the transfer component and the identification device travel with the chassis.

11. The handling robot according to claim 10, wherein the image information comprises at least one of:

position information of the item;

stock keeping unit information of the item to be transferred;

shape of an item to be transferred;

image feature point of an item to be transferred;

color information of an item to be transferred; and volume information of an item to be transferred.

12. The handling robot according to claim 10, wherein the handling assembly is arranged in one of a front side and a rear side of the vertical bracket along a traveling direction of the chassis, the holder is arranged in the other one of the front side and the rear side of the vertical bracket.

13. The handling robot according to claim 10, wherein the transfer component is rotatably connected to the vertical bracket;

wherein the transfer component is configured to pick the item from the first container on the handling assembly, rotate toward the second container held by the holder, and place the item to the second container.

14. The handling robot according to claim 10, wherein the transfer component is rotatably connected to the vertical bracket;

wherein the transfer component is configured to pick the item from the second container held by the holder, rotate toward the first container on the handling assembly, and place the item to the first container.

15. The handling robot according to claim 10, wherein the transfer component comprises:

a multidimensional mechanical joint connected to the vertical bracket; and a terminal actuator installed to the multidimensional mechanical joint;

wherein the multidimensional mechanical joint is configured to drive the terminal actuator to rotate in multiple angles, and the terminal actuator is configured to grasp the item in the first container or the second container.

16. The handling robot according to claim 15, wherein the terminal actuator is a sucker device for adsorbing the item.

17. The handling robot according to claim 10, wherein the handling assembly comprises:

an installation platform slidably connected to the vertical bracket;

a pallet installed to the installation platform, the pallet being configured to temporarily store the first container; and a sucker device movably connected to the installation platform, the sucker device being configured to adsorb the first container stored on the warehouse shelf and place the first container to the pallet, or move the first container from the pallet to the warehouse shelf.

18. A handling robot, comprising:

a chassis configured to travel along a preset path;

a vertical bracket arranged on the chassis;

a handling assembly slidably connected to the vertical bracket, the handling assembly being configured to retrieve a first container from a warehouse shelf, or place the first container to the warehouse shelf;

a holder connected to the vertical bracket, the holder being configured to hold a second container; and a transfer component connected to the vertical bracket, the transfer component being configured to transfer an item between the first container on the handling assembly and the second container held by the holder;

wherein the vertical bracket is arranged between the handling assembly and the holder;

wherein the handling assembly comprises:

an installation platform slidably connected to the vertical bracket;

a pallet installed to the installation platform, the pallet being configured to temporarily store the first container; and a sucker device movably connected to the installation platform, the sucker device being configured to adsorb the first container stored on the warehouse shelf and place the first container to the pallet, or move the first container from the pallet to the warehouse shelf.

19. The handling robot according to claim 18, wherein the transfer component comprises:

a multidimensional mechanical joint connected to the vertical bracket; and a terminal actuator installed to the multidimensional mechanical joint;

wherein the multidimensional mechanical joint is configured to drive the terminal actuator to rotate in multiple angles, and the terminal actuator is configured to grasp the item in the first container or the second container.

20. The handling robot according to claim 19, wherein the terminal actuator is a sucker device for adsorbing the item.

* * * * *